United States Patent [19]

Hegarty et al.

[11] Patent Number: 5,732,924
[45] Date of Patent: *Mar. 31, 1998

[54] UNIVERSAL DOCUMENT SUPPORT STAND

[75] Inventors: David Hegarty, 36 Wyatt Rd., Garden City, N.Y. 11530; Michael Terc, Wantagh, N.Y.

[73] Assignee: David Hegarty, Garden City, N.Y.

[*] Notice: The term of this patent shall not extend beyond the expiration date of Pat. No. 5,385,327.

[21] Appl. No.: 257,384

[22] Filed: Jun. 9, 1994

Related U.S. Application Data

[63] Continuation of Ser. No. 748,790, Aug. 21, 1991, abandoned.

[51] Int. Cl.⁶ .................................................. B41J 11/02
[52] U.S. Cl. ........................................ 248/442.2; 248/918
[58] Field of Search ............................ 248/442.2, 454, 248/444.1, 447, 450, 298.1, 918, 917, 919, 920, 921, 922, 923, 123.2, 331, 162.1

[56] References Cited

U.S. PATENT DOCUMENTS

| | | |
|---|---|---|
| 436,717 | 9/1890 | Moore . |
| 598,689 | 2/1898 | Wilson . |
| 2,459,873 | 1/1949 | Curtis . |
| 3,799,488 | 3/1974 | Sena . |
| 4,475,705 | 10/1984 | Henneberg et al. . |
| 4,767,093 | 8/1988 | Jones . |
| 4,902,078 | 2/1990 | Judd . |
| 4,958,907 | 9/1990 | Davis . |
| 4,960,257 | 10/1990 | Waters . |
| 5,020,763 | 6/1991 | Hegarty . |
| 5,074,512 | 12/1991 | Gianforcaro et al. . |
| 5,078,358 | 1/1992 | Egly et al. . |
| 5,082,235 | 1/1992 | Crowther et al. . |
| 5,122,941 | 6/1992 | Gross et al. ............... 248/442.2 X |
| 5,125,612 | 6/1992 | McNeal . |
| 5,154,391 | 10/1992 | Hegarty . |
| 5,292,099 | 3/1994 | Isham et al. ............... 248/442.2 |
| 5,385,327 | 1/1995 | Hegarty et al. ........... 248/442.2 |
| 5,618,020 | 4/1997 | Hegarty et al. ........... 248/442.2 |

Primary Examiner—David M. Purol

[57] ABSTRACT

A document support stand may be located at a computer workstation and positioned to either side of a monitor to support a projected document or document holder. The stand combines a first support apparatus, a support stand, and a second support apparatus, a document holder. The support stand can support articles at various spatial locations without the use of mechanical balancing devices and includes a main support body, an arm, and a bracket which can be adapted to function alone or in combination with a second support apparatus, a document holder. The viewing side of the document holder can position a mounted document or document holder in rotation and inclination about three axes of rotation. The viewing side is fitted with rotatable first and second sections. The rotatable sections provide for displacing the spring clip and/or the support ledge from the viewing side to provide an unobstructed planar surface to allow a document holder engaging means to cooperate in the mounting and positioning of a modified document holder.

36 Claims, 49 Drawing Sheets

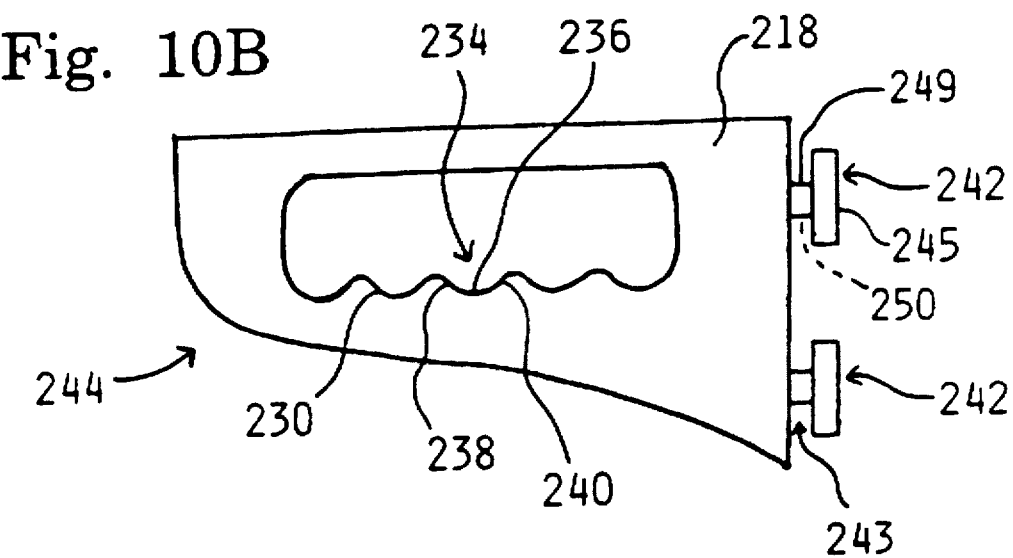
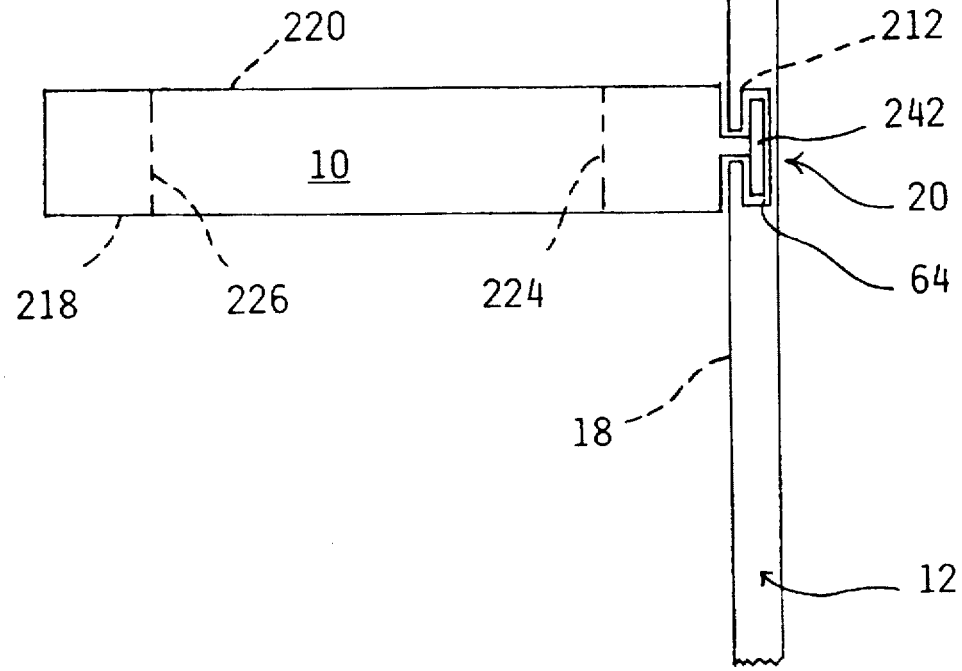

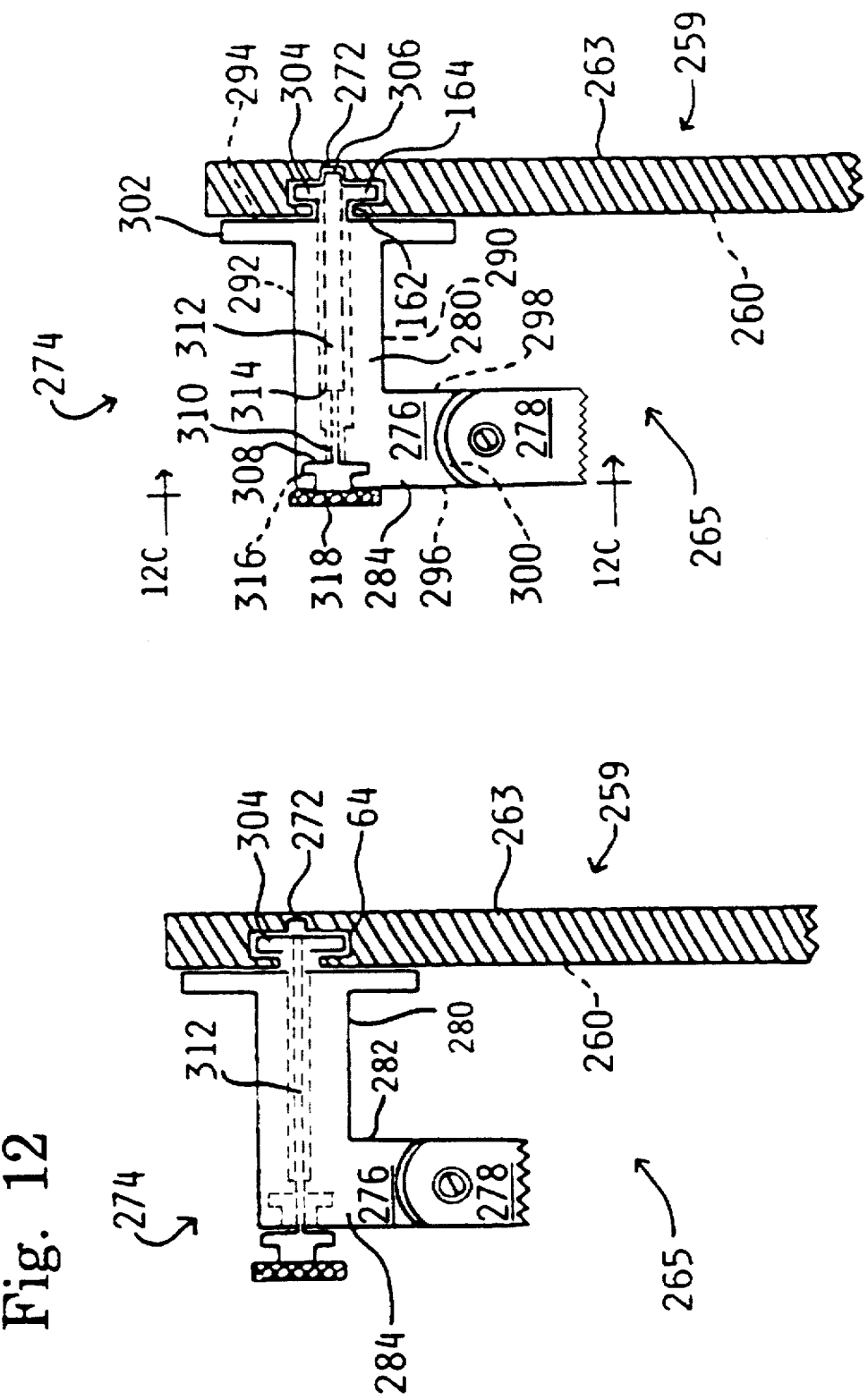

Fig. 21
Fig. 21A
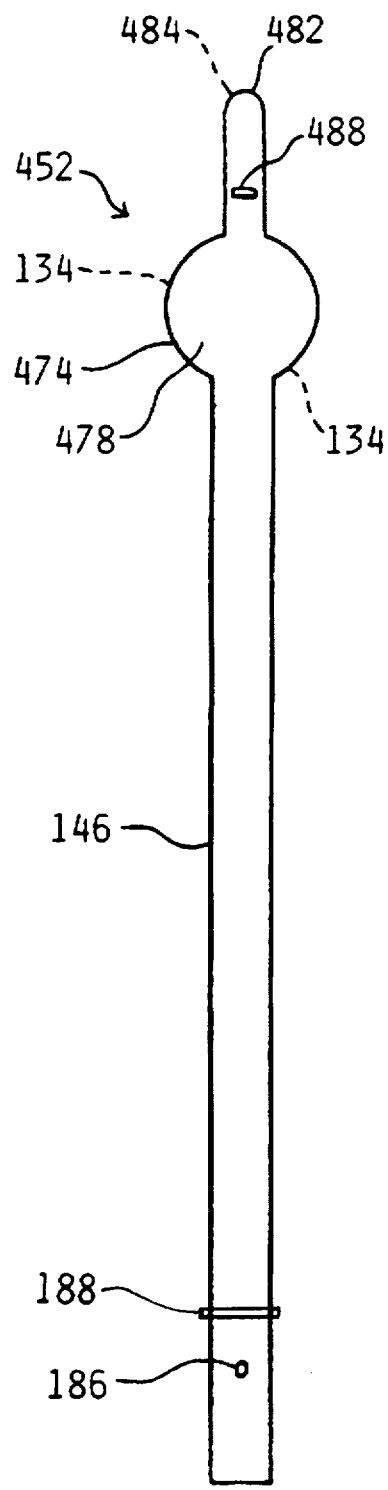
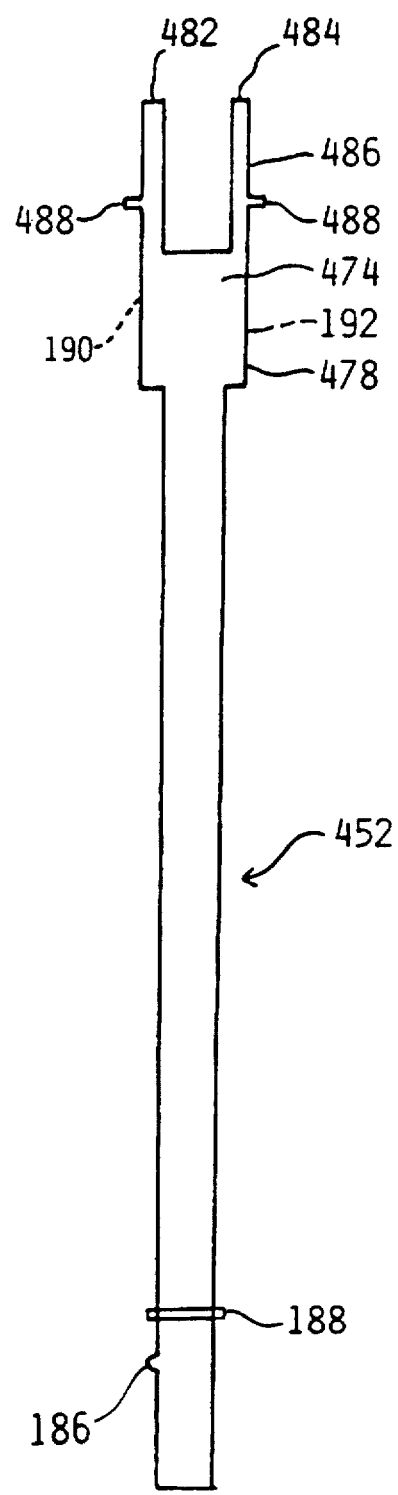

Fig. 21B
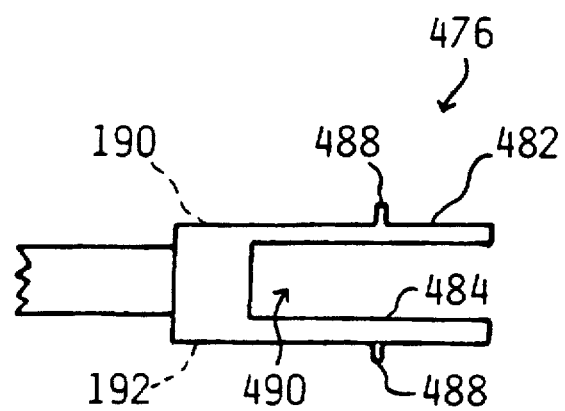
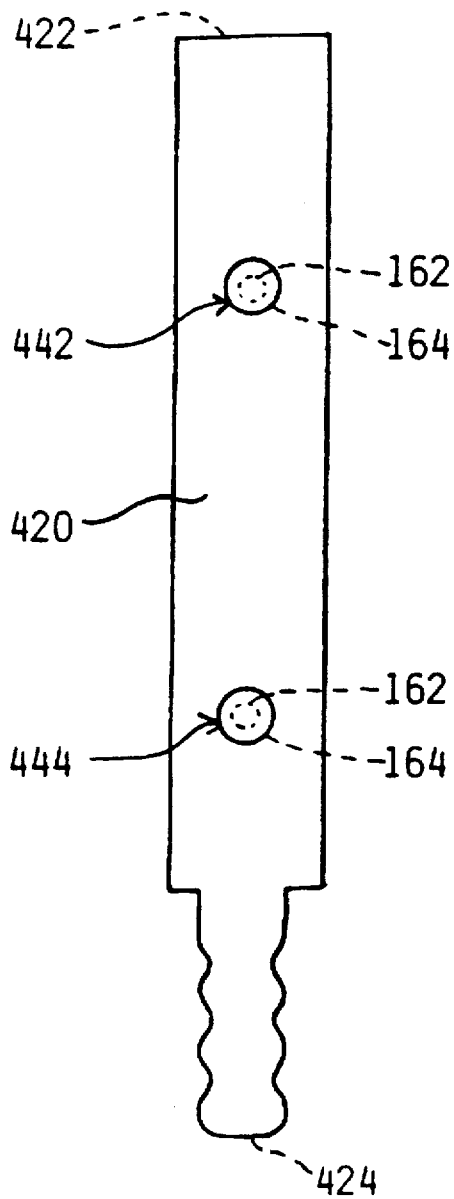
Fig. 22

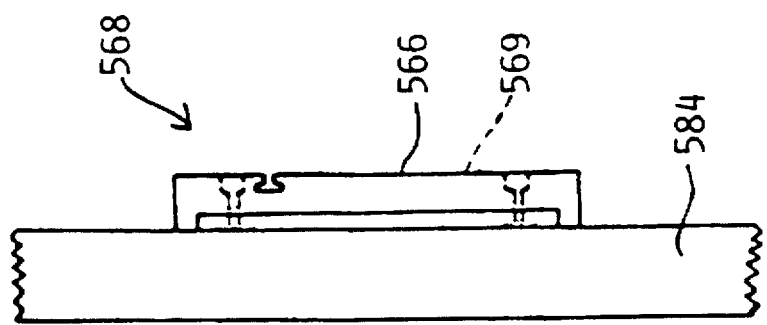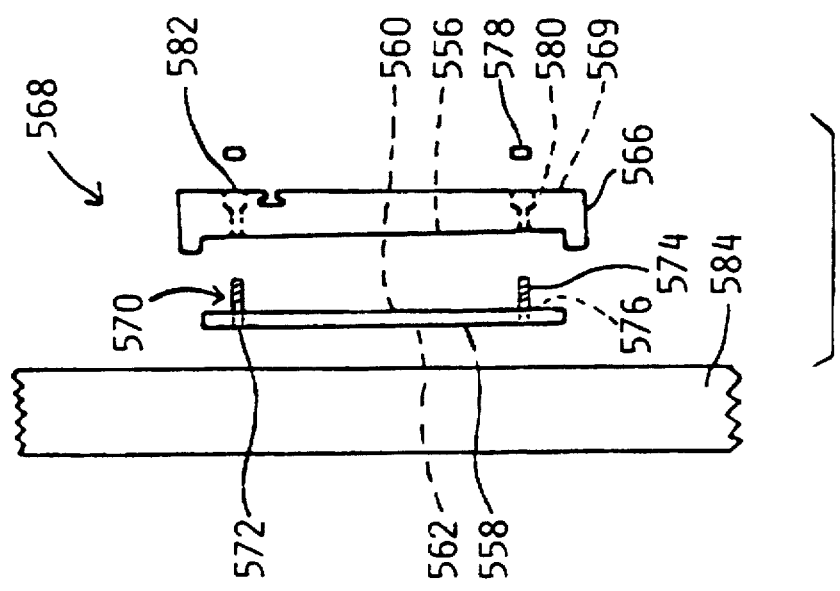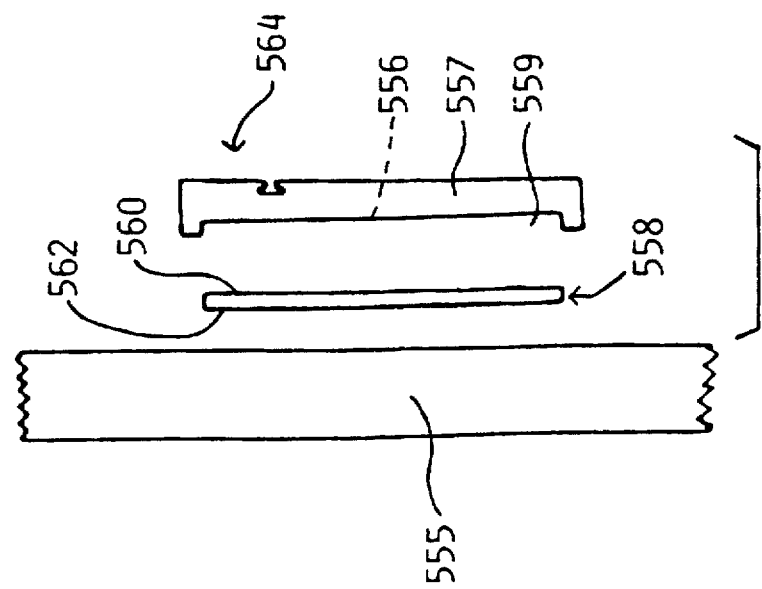

UNIVERSAL DOCUMENT SUPPORT STAND

CROSS-REFERENCE TO RELATED APPLICATIONS

This is a continuation of application Ser. No. 07/748,790 filed on Aug. 21, 1991, which is now abandoned. The following applications have been filed in the United States Patent and Trademark Office by applicant Hegarty, contain information related to the present application (the priority of which is claimed) and are herein incorporated by reference: Ser. No. 07/734,231, filed Jul. 22, 1991, now U.S. Pat. No. 5,167,394, (a continuation of Ser. No. 07/465,916, filed Jan. 12, 1990, now U.S. Pat. No. 5,044,594, {a continuation of U.S. Pat. No. 4,925,146 [Hegarty], parent application of PCT/US88/04201}); Ser. No. 07/700,186, filed May 25, 1991, abandoned (as elected office for PCT/US89/05333, filed Nov. 25, 1989); Ser. No. 07/642/676, filed Jan. 17, 1991, now U.S. Pat. No. 5,154,391; Ser. No. 07/571,765, filed Aug. 23, 1990, now U.S. Pat. No. 5,060,904 (a continuation of U.S. Pat. No. 5,020,763 [Hegarty], filed Feb.26, 1990).

BACKGROUND OF THE INVENTION

1. Field of the Invention

This invention relates to document support apparatus, and more particularly relates to a universal document support stand for selectively and fixedly positioning a document holder for viewing at a computer workstation and other visual reference situations.

2. Description of the Prior Art

The term "document" hereinafter refers to a single page or a multiple number of pages.

The term "document holder" hereinafter refers to that type of device which is adapted to secure a document, such as in the form of a book, spiral bound manual, loose-leaf binder, conventional copyholder stands or the like, as well as those devices which have been modified by a present applicant (Hegarty) in a previously filed application, having issued to U.S. Pat. No. 4,925,146, which is herein incorporated by reference.

The term "multi-positionable" hereinafter refers to the ability to pivot about one or more axes of rotation.

The term "relocating side" hereinafter refers to a side of a main support body of the present invention which provides for the slidable engagement of a cooperating member to any one of a plurality of fixed supportive locations.

The term "relocatable" hereinafter refers to the ability to be engagably moved from one fixed supportive location to another.

The term "fixed supportive location" hereinafter refers to the placement of an engageable member of a stand of the present invention at a pre-determined, specific and fixed location on the relocating side of the main support body of the stand, with that location providing the structure necessary for fixedly supporting the engageable member.

The term "symmetrically functional" hereinafter refers to the ability of a device to support an article, such as an arm or document, in the same direction whenever the article is mounted on the device in one of a first or second support positions, with the second position being in mirror image to the first position.

Document support stands for supporting a document or document holder in space are well known in the art and are generally referred to as "suspended copyholder stands".

Many conventional stands are designed to be supported by a bracket clamped to the edge of a desk and to suspend the document holder in space through the cooperation of various types of mechanical structures utilizing an assortment of joints, springs and/or adjusting knobs.

Such structures are attempting to "fixedly suspend" the copy holder in space and, at the same time, to allow its repositioning. Such a combination of purposes results in compromise. If the structure is easily repositionable, without any adjustment being required, it is either dedicated to light duty or, if it is capable of supporting heavy workloads, is mechanically complex. For the most part, if an apparatus does provide for fixedly supporting a suspended workload of significant weight the apparatus will be fitted with a variety of complex mechanical balancing devices such as that disclosed in U.S. Pat. No. 4,768,744 entitled "Apparatus For Supporting a Load in a Dynamically Balanced Position". Consequently, "heavy duty" suspended document holder stands are mechanically complicated and thus expensive to manufacture and purchase. Accordingly, one of the primary disadvantages of many conventional suspended document holder stands is that they are not capable, with few mechanical parts, of fixedly supporting heavy document holders in space.

Another significant disadvantage of conventional suspended document holder stands is that they are limited in their ability to adequately and accurately position a mounted document for viewing while suspended in space. Often, the conventional document holders offer a limited number of locations in space due to the need to balance the workload. For example, the parallelogram type of support device is limited in its spatial positioning ability by the restraints imposed by the very nature of the parallelogram structure itself. Very often the operator must reposition the entire device, swinging the arm assembly in a trial and error fashion in an attempt to locate the best balanced viewing position. If the structure does provide adjustments in order to fixedly position a suspended heavy workload, the positions are difficult to duplicate causing the user to use a "trial-and-error" method in an attempt to relocate a previously used viewing position.

A further disadvantage with conventional suspended document holders is that they require a considerable amount of desk and air space in order to position a document for viewing. Many suspended document holders require the edge of a desk in order to be supported. Additionally, these type of document holders require that the space throughout which the suspended arm moves be free of any obstructions such as walls, shelving or lighting fixtures. Consequently, not only must the desk surface be free of barriers but the arm, being boom-like in movement requires considerable open space, both vertically and horizontally, in order to freely move the boom-like arm when positioning a document for viewing.

When considering symmetrically formed and functional "heavy duty" document holder stands (those stands capable of being operationally positioned to the left or to the right of a support device such as a video display monitor) a fundamental disadvantage is noted. These "symmetrically functioning" stands are extremely limited in function. No prior art document holder stand discloses a symmetrically formed and functional base which cooperates with other members of the stand to selectively position and support heavy workloads: a) at varying eye levels, b) at the end of a multipositionable and fixed projecting arm, c) without the use of springs, adjustment knobs or other similar types of mechanical balancing devices, d) and on both sides of a contributing support device such as a video display monitor.

Currently, however, there are stands which are fitted with an L-shaped base member which are symmetrically functional. Such a stand is disclosed in U.S. Pat. No. 4,582,285 (Bello). The stand includes an L-shaped base member and provides for the shorter leg of the L member to be inserted between the desk surface and a support device such as a typewriter or video display monitor. The Bello patent, like many others however, does not provide for fixedly projecting and positioning a variety of heavy workloads at varying eye levels. Another type of symmetrically functional device is designed to adhere to the top of a video display monitor and to support a one page document on either side of the monitor. Such a device is disclosed in U.S. Pat. No. 4,902,078 (Judd) and is entitled "Document Holder Clip". Obviously this device, although useful for its intended purpose, is not capable of fixedly supporting a weighted document holder such as a loose-leaf binder.

Currently available suspended document holder stands do not maximize the potential supportive capabilities of vertically oriented structural support surfaces. The workplace environment is surrounded with vertically oriented structural members such as the sides of: walls, room dividers, desks, shelving, file cabinets and video display monitors. The possible contributive capabilities of these vertical surfaces for mounting, positioning and supporting documents has been poorly appreciated. Consequently, the prior art of video display monitors does not provide for the exterior casing of the monitor to be modified in a manner that will allow it to cooperate with other members for supporting and spatially repositioning heavy document holders. A recently published patent, however, having U.S. Pat. No. 5,020,763 (Hegarty), the disclosure of which is herein incorporated by reference, does present structure related to the mounting and positioning of a support arm at different fixed supportive locations on a vertical surface.

Another further disadvantage with currently available document holder stands of the "copyholder" type is that they are limited in purpose. The viewing sides disclosed in the copyholder art to date are quite limited in purpose and are usually dedicated to holding a document, or document holder, using a clip, line guide and/or ledge to provide support. A recent improvement in providing a multi-purpose capability to the viewing side of document holder stands has been disclosed in a previously filed U.S. patent application, having Ser. No. 07/642,676 (Hegarty), filed Jan. 17, 1991, now U.S. Pat. No. 5,154,391 the disclosure of which is herein incorporated by reference.

An even further disadvantage in the copyholder art to date is that the positioning ability of these holders has been rather limited when considering the fact that the purpose of such devices should be to quickly and easily position the viewing side at the optimum location for viewing. Repositioning the viewing side of a copyholder is easier and more efficient if the first axis of rotation, which is mounted on the main-support member of the copyholder (such as the base), pivots about a vertical axis. A copyholder so constructed uses gravity to its advantage in maintaining the position of the suspended pivoting member in its initial adjustment position about a vertical axis. Additionally, a copyholder is more easily positionable if the member, or members, which allow it to rotate about its axes are fitted very close to the viewing side, namely, to the back of the viewing side's support member. A copyholder so constructed does not require extending and pivoting arms to change the position of its viewing side. Many copyholders, however, such as the Workstation Plus TM copyholder, Model No. 21115 (manufactured by the Fellows Manufacturing Company of Itasca, Ill.), use an extending arm which initially pivots about a horizontal axis thereby requiring frequent manipulation of its adjustment knobs in first requiring the fixating of the horizontal and then the vertical position of the copyholder's viewing side. Consequently, no present day copyholder is fitted with: a) a vertical axis pivoting support member which is mounted in the direct vicinity of the viewing side; and which further allows the viewing side to rotate about three axes of rotation with each axis being fixedly positionable with respect to its rotation.

As a result of the aforementioned disadvantages, the current state of the art in the modern, technologically advanced, office environment is for the computer operator to often lay a heavy document, such as a loose-leaf binder or a computer spreadsheet file, either on the desk surface or in the operator's lap when referring to it while working at a video display monitor. Consequently, the operator is continuously refocusing from one viewing plane to another thereby experiencing eye strain, fatigue and inadequate working conditions.

OBJECTS AND SUMMARY OF THE INVENTION

It is an object of the present invention to provide a document support stand, having few mechanical parts, which is adapted to fixedly support a heavy workload in space.

It is another object of the present invention to provide a document support stand which accurately positions an article at a desired location in space and to allow for that location to be easily relocated by the operator.

It is yet another object of the present invention to provide a document support stand which reduces the amount of unobstructed desk and air space required for spatially positioning and viewing a document.

It is a further object of the present invention to provide a document support stand wherein the stand includes a symmetrically formed and functional base member, which cooperates with other stand members, to position and fixedly project a heavy workload on either or both sides of a video display monitor.

It is a still further object of the present invention to utilize the surfaces of vertical structural members for supporting document support stands which are capable of mounting and spatially positioning documents for viewing.

It is yet a further object of the present invention to provide for a document support stand which modifies the casing of a video display monitor to function as a stand member which cooperates with additional stand members for supporting and adjusting the spatial position and location of a document It is still another object of the present invention to provide an inexpensive document support stand which is capable of spatially supporting heavy workloads.

It is yet a further object of the present invention to provide three statically formed members which function together to create a dynamically and symmetrically functionable multi-positionable document support stand.

It is an even further object of the present invention to provide a support stand which allows for the spatial positioning of the distal end of a projecting arm in the absence of any tensioning control devices.

It is yet an even further object of the present invention to provide a document support stand, having an adjustable viewing side, with a tri-axial positioning fitting directly attached to the viewing side support structure, which allows the viewing side to rotate about three axes of rotation with each axis being fixedly positionable with respect to its rotation.

In accordance with a first aspect of the present invention, the universal document support stand includes a projecting, multi-positionable article support stand which works in combination with an attachable multi-purpose and multi-positionable document holder for fixedly projecting a document, or document holder, at a multiplicity of locations in space.

Accordingly, the projecting, multi-positionable article support stand includes a main support body, a relocatable multi-positionable arm and a relocatable support bracket.

The main support body may be formed in the shape of a right angled stationary support member. The body has a horizontal member integrally formed with a vertical member. The horizontal member is provided to be positioned on a workstation surface and to allow a video display monitor to rest atop it thereby securing the vertical member in a stable upright position on either side of the monitor. The vertical member includes a front member relocating side, constituting the mounting side of the stand. Consequently, the member relocating side includes a mounting device for removably mounting the relocatable and multi-positionable arm and the relocatable support bracket on the main body of the stand.

In a preferred form of the invention, the mounting device is located in the surface of the front member relocating side and is formed as a slot having a symmetrical pattern. The slot is C-shaped in cross section, and defines a T-slot having an exposed open end. The exposed open end of the T-slot provides for access to a symmetrical mounting device which provides for the ability to mount and selectively position and relocate both the multi-positionable arm and the support bracket. The symmetrical pattern provides support, both vertically and horizontally, when positioning and relocating the mounted arm and bracket members.

According to the present invention, the relocatable multi-positionable arm includes a multi-positionable fitting and a cooperating elongated cylinder. The multi-positionable fitting includes a socket housing and a member for mounting the socket housing on the body. Additionally, the cooperating elongated member includes as one integral unit: a disk, an elongated cylinder, and a fitting, at the distal end of the member, for receiving attachable article holders. The cooperating elongated cylinder is removably mountable on the socket housing member and provides for the pivoting of the elongated cylinder.

Additionally, pursuant to the present invention the relocatable support bracket includes a solid body formed in the shape of a corbel bracket having three sides. The body includes: a window-like cutout, within its structure, which creates a bounded lower horizontal support surface; and a member for mounting the relocatable support bracket on the main body.

The member for mounting the socket housing on the body in its preferred form is circular, T-shaped in cross-section, and fitted to a side of the socket housing member. The T-shaped member of the socket housing is slidably received by the C-bracket of the body through the C-bracket's exposed open end, so that the multi-positionable arm may be rotatably positioned, with its housing member supported, at a plurality of locations on the body.

The member for mounting the relocatable support bracket on the body in its preferred form is square, T-shaped in cross-section, and fitted to a side of the bracket member. Prior to mounting the bracket on the body the distal end of the multi-positionable arm is passed through the cutout formed in the bracket. The T-shaped member of the bracket body is also slidably received by the C-bracket of the body through the C-bracket's open end so that the relocatable support bracket may be fixedly positioned and supported at a plurality of locations on the body.

Being selectively positioned thusly on the body, the relocatable and multi-positionable arm cooperates with the relocatable bracket, which supports a section of the arm member, in positioning and supporting the distal end of the arm member, thereby positioning an attached document holder in a plurality of spatial positions.

In accordance with a second aspect of the present invention the main body of the projecting, multi-positionable support stand is integrally formed in the casing of a video display monitor and is provided with a pair of oppositely disposed member relocating sides. Such an embodiment provides for the creation of a symmetrically functional main support monitor. The main support monitor cooperates with a joined projecting arm and bracket member in positioning the distal end of the joined member at a multiplicity of fixed support locations.

Either of the just described stands are capable of working in combination with the next member of the universal document support stand, namely, the multi-purpose and multi-positionable document holder. The multi-purpose and multi-positionable document holder is initially provided with two distinct features.

The first feature allows the viewing side of the holder to function as a multi-purpose document holder. The multi-purpose feature is provided by the presence of a rotational means on the viewing side's lateral ends which allows the conventional holding means, namely, a biased clip and/or a support ledge to be rotational displaced by the opposite (back) side of the viewing side. Such a feature allows the front viewing side to be converted to a an unobstructed planar surface simply by rotationally displacing the conventional holding means. The present feature does not require the removal of the conventional holders from the stand, i.e., biased clip and ledge. Once converted the viewing side is capable of engaging various other types of holders having different mounting requirements because of size or different cooperating engaging means such as Velcro (TM) or a T-rail.

The second initial feature present in the attachable multi-purpose and multi-positionable stand allows the device to function as a multi-positionable document holder having means to position a document or document holder, mounted on its viewing side, in any one of a multiplicity of positions about three axes of rotation which are mutually supported from a nearby location. Additionally, the device provides for the fixed positioning about each axes through the application of gravity, detents and protrusions and rack/pinion cooperation.

Consequently, it can be appreciated that the combined support and positioning capabilities of the universal document support stand of the present invention provides great assistance to an operator working at a computer workstation and other visual reference situations.

These and other objects, features and advantages of this invention will be apparent from the following detailed description of illustrative embodiments thereof, which is to be read in connection with the accompanying drawings.

BRIEF DESCRIPTION OF THE DRAWINGS

FIG. 10B is a front elevational view of a relocatable support bracket having a pair of similarly formed T-rail members, constructed in accordance with a second form of the present invention.

FIG. 10C is a fragmentary top view of the document support stand shown in FIG. 2, illustrating the relocatable support bracket in its initial mounted position.

FIG. 12 is a fragmentary top view, partially in section, of the member relocating side shown in FIG. 11, taken along line 12—12 of FIG. 11, with a retractable and multi-positionable support arm mounted thereon in a relocatable, retracted position, in accordance with a second form of the arm member of the present invention.

FIG. 12A is a view similar to that of FIG. 12, with the retractable and multi-positionable support arm mounted thereon in a located, extended and engaged position.

FIG. 21 is a top elevational view of the releasable pivoting elongated cylinder member illustrated in FIG. 20A.

FIG. 21A is a side elevational view of the releasable pivoting elongated cylinder shown in FIG. 21.

FIG. 21B is a fragmented, side elevational view of a modified releasable pivoting elongated cylinder formed in accordance with another embodiment of the present invention.

FIG. 22 is a rear elevational view of the base member cooperating side of the joined and multi-positionable support arm shown in FIG. 19.

FIG. 32 is an exploded side elevational view of an adhering main support body, constructed in accordance with an additional alternative form of the present invention.

FIG. 32A is an exploded, side elevational view of a disengagable adhering main support body, constructed in accordance with an alternative embodiment to that of FIG. 32.

FIG. 32B is a side elevational view of the embodiment shown in FIG. 32A, showing its form when assembled and mounted to a supporting member.

Figure 1:
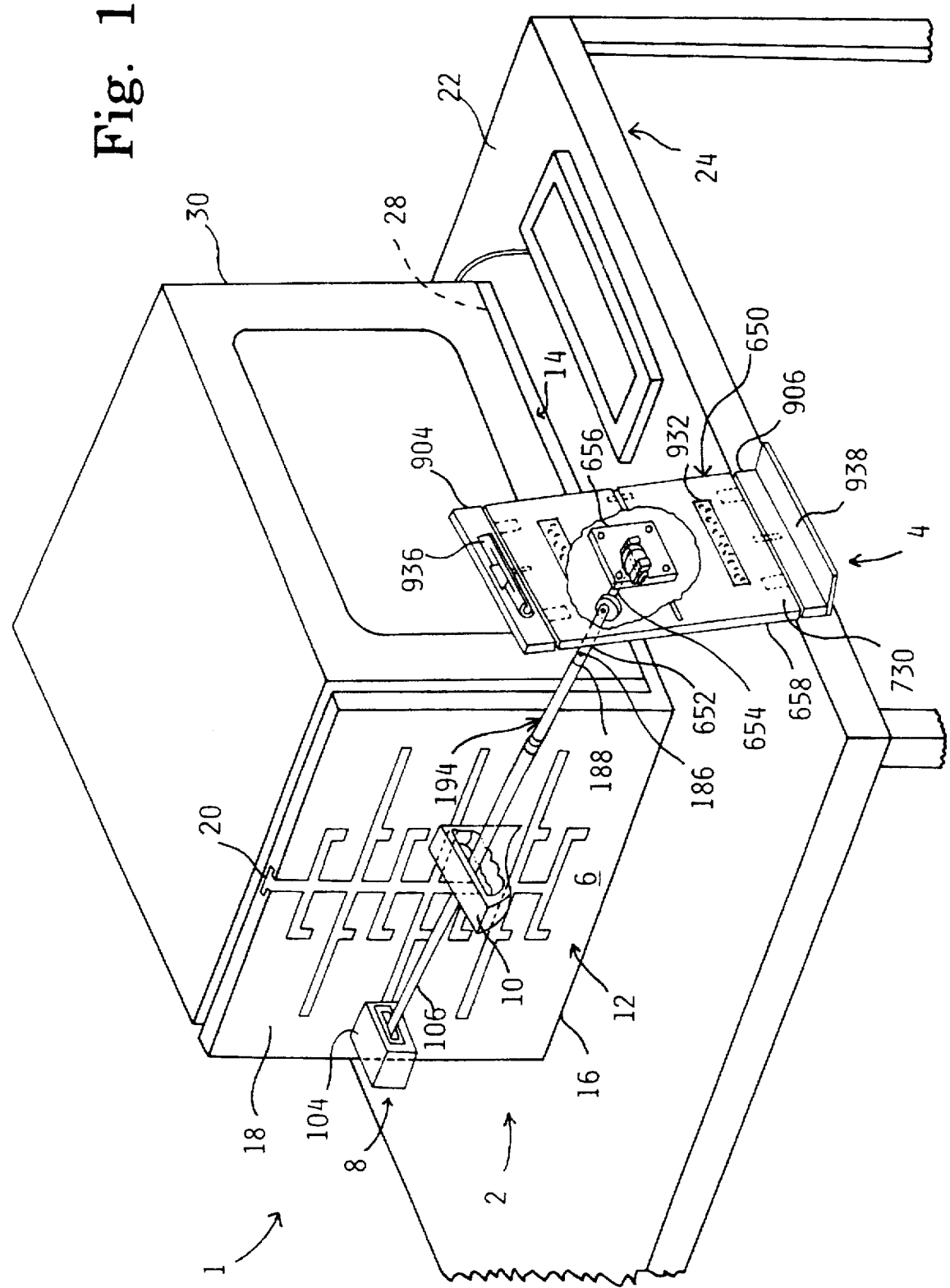
FIG. 1 is a front perspective view of a computer workstation having a universal document support stand constructed in accordance with one form of the present invention.
Figure 2:
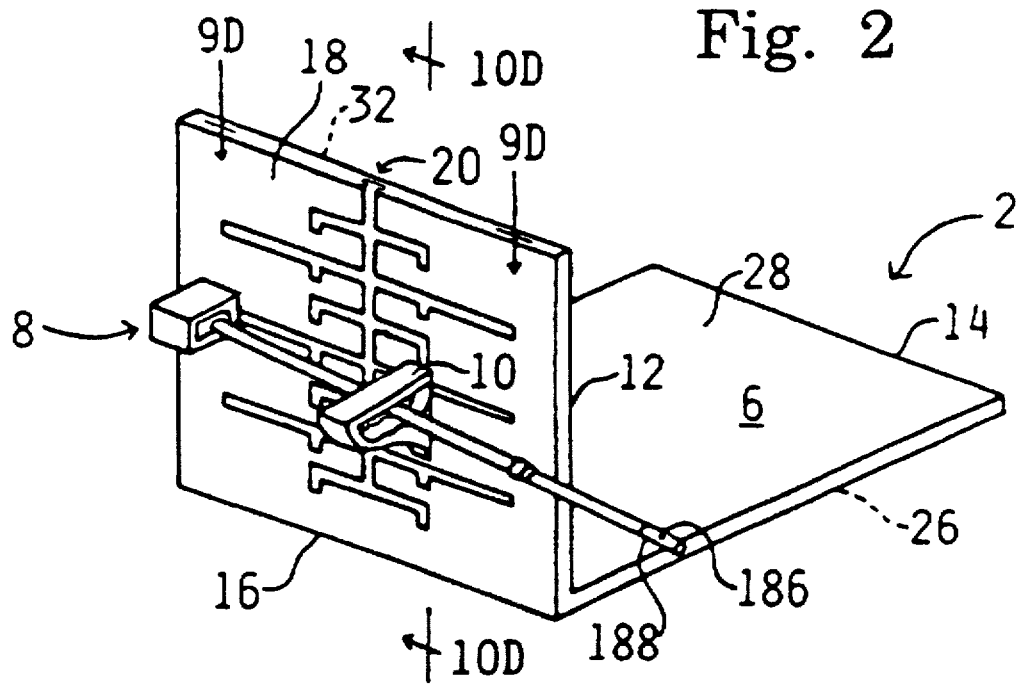
FIG. 2 is a front perspective view of a document support stand incorporated within the universal support stand shown in FIG. 1.

DRAWING REFERENCE NUMERALS 1 universal document support stand of FIG. 1
2 projecting, multi-positionable article support stand (FIG. 2)
4 attachable multi-purpose and multi-positionable document holder of 1 (FIG. 48)
6 main support body of 2
8 relocatable and multi-positionahle projecting arm of
10 relocatable support bracket of 2
12 vertically disposed solid of 6

Figure 2A:
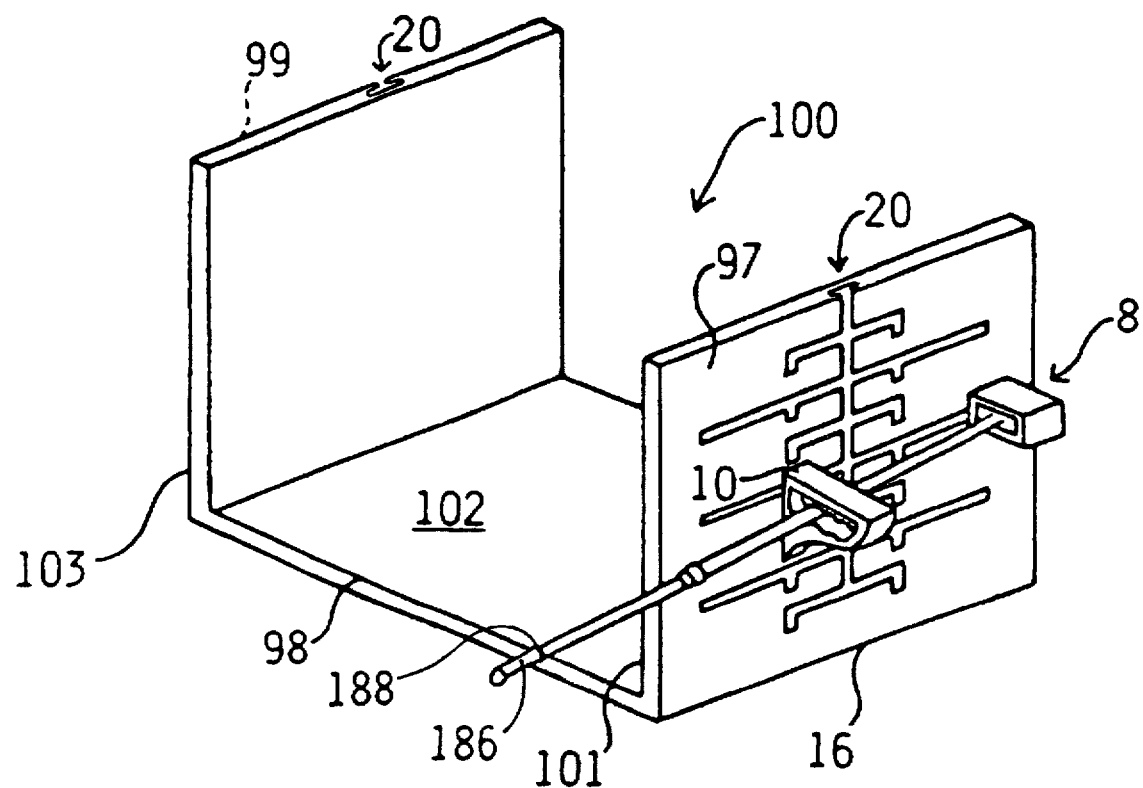
FIG. 2A is a front perspective view of a document support stand, constructed in accordance with a second form of the stand shown in FIG. 2.
Figure 11:
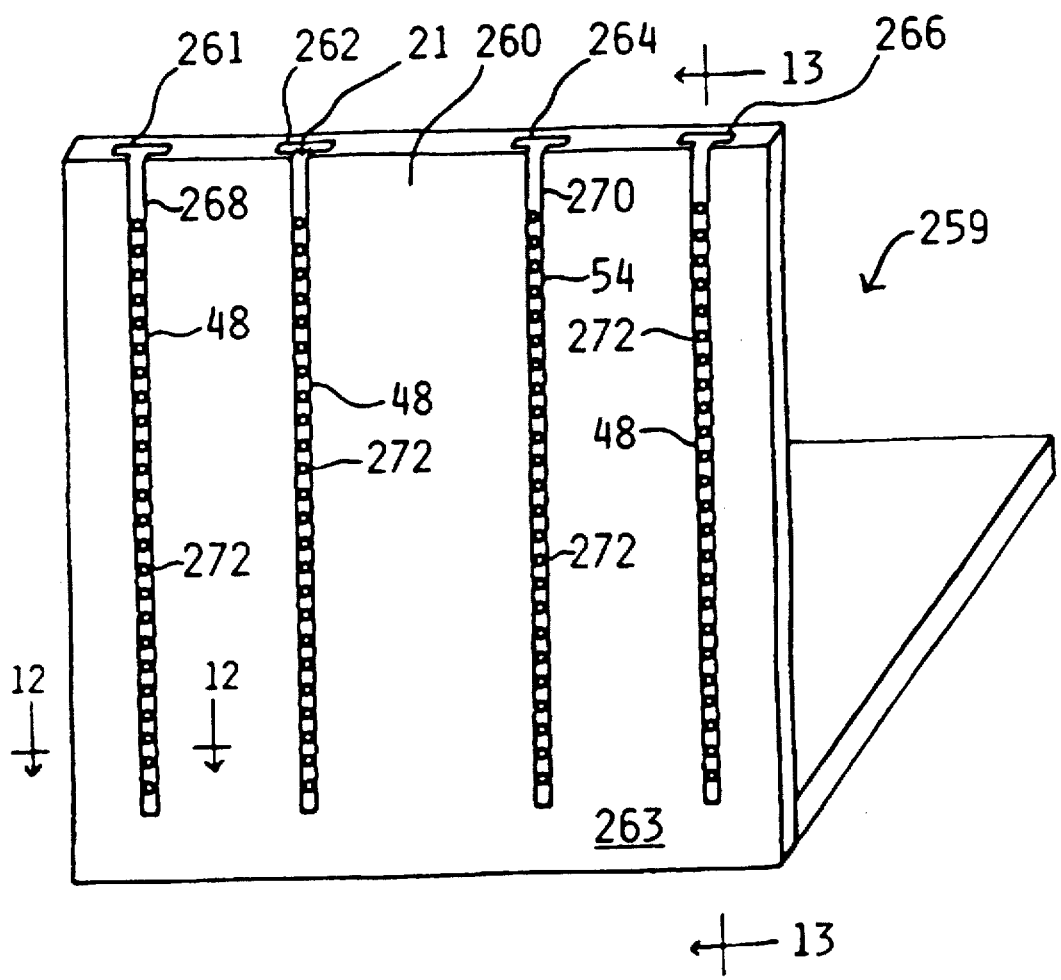
FIG. 11 is a view, like that of FIG. 3, illustrating a second form of member relocating side, constructed in accordance with the present invention.
Figure 17:
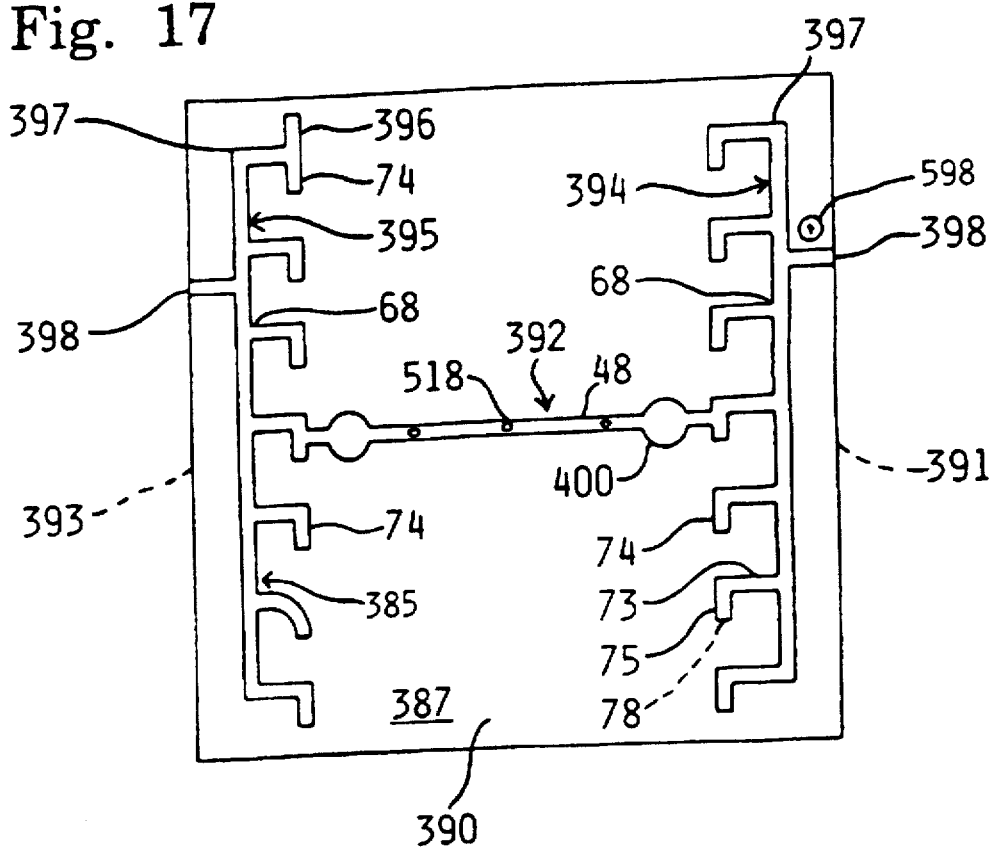
FIG. 17 is a view, like that of FIG. 3A, illustrating a member relocating side, constructed in accordance with a fourth form of the present invention.

14 horizontal disposed solid of 6
16 bottom transverse edge of 6
18 front member relocating side of 12
20 T-slot of 18
21 T-slot of FIG. 11
22 horizontal surface of 24
24 workstation
26 bottom planar side of 14
28 top planar side of of 14
30 video display monitor of 24
32 rear side of 12
34 top edge of 12
36 first vertical edge of 12
38 second vertical edge of 12
40 trunk section of 18
42 branch sections of 18
44 segmented C-Bracket of 20
46 recess in 18
48 back plate of 20
50 side plates of 20
52 inwardly facing arms of 20
54 narrowed portion of 20
56 widened portion of 20
58 first portion of 12
60 second portion of 12
62 terminating edge of 40
64 open end of 20
68 longitudinal side wall opening in vertical T-slots
70 left bracket support branch of 18
72 right bracket support branch of 18
73 horizontal leg of 74 as in FIG. 17
74 stop slot of 70 and 72
75 vertical leg of 74 as in FIG. 17
76 lateral side wall opening of 70 and 72
77 lower wall of 70 and 72
78 stepped stop section of 74
80 terminating widened edge of 78
82 terminating narrowed edge of 78
84 front side of 52
86 back side of 52
88 left arm/bracket support branch of 18
90 right arm/bracket support branch of 18
92 vertically disposed terminating edge of 88 and 90
94 first protrusion of 88 and 90
96 second protrusion of 88 and 90
97 member relocating side of 101
98 horizontal panel of 102
99 member relocating side of 103
100 stand of FIG. 2A
101 vertical panel of 102
102 body of 100
103 vertical panel of 102
104 multi-positionable base of 8
106 pivoting elongated cylinder of 8
108 box-like socket housing member of 104
110 cooperating circular T-rail member of 104
112 inner proximate cooperating engagement side of 108
114 outer distal side of 108
116 front side of 108
118 rear side of 108
120 top side of 108
122 bottom side of 108
126 socket of 108
128 disk of 106
130 top wall-of 126
132 bottom wall-of 126
134 cylindrical surface of 128

Figure 10:
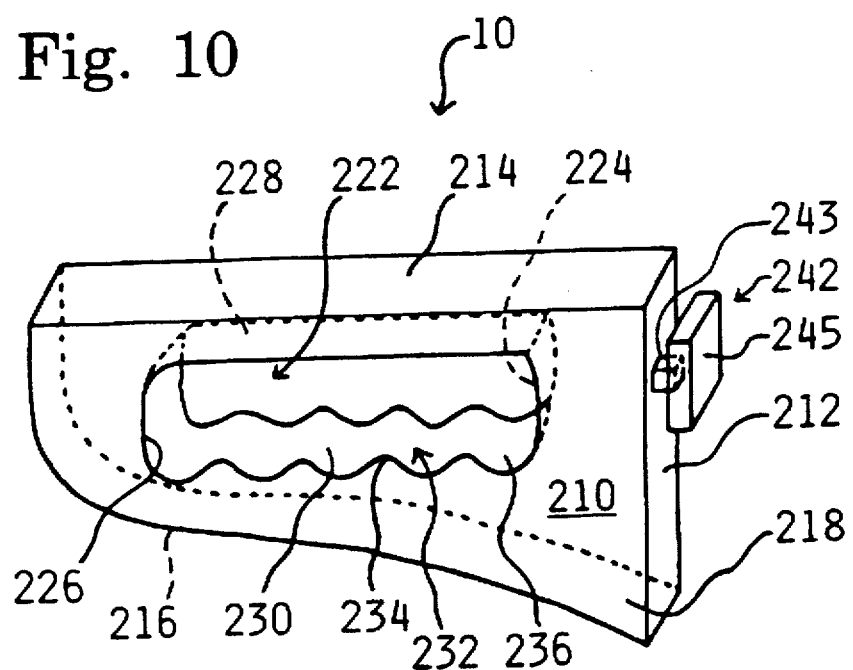
FIG. 10 is a front perspective view of the relocatable support bracket shown in the document support stand of FIG. 2, constructed in accordance with one form of the present invention.
Figure 10A:
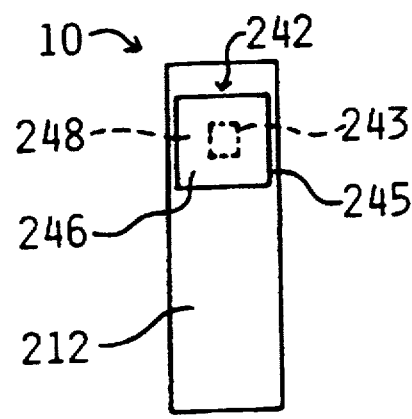
FIG. 10A is a side elevational view of the relocatable support bracket shown in FIG. 10.
Figure 10D:
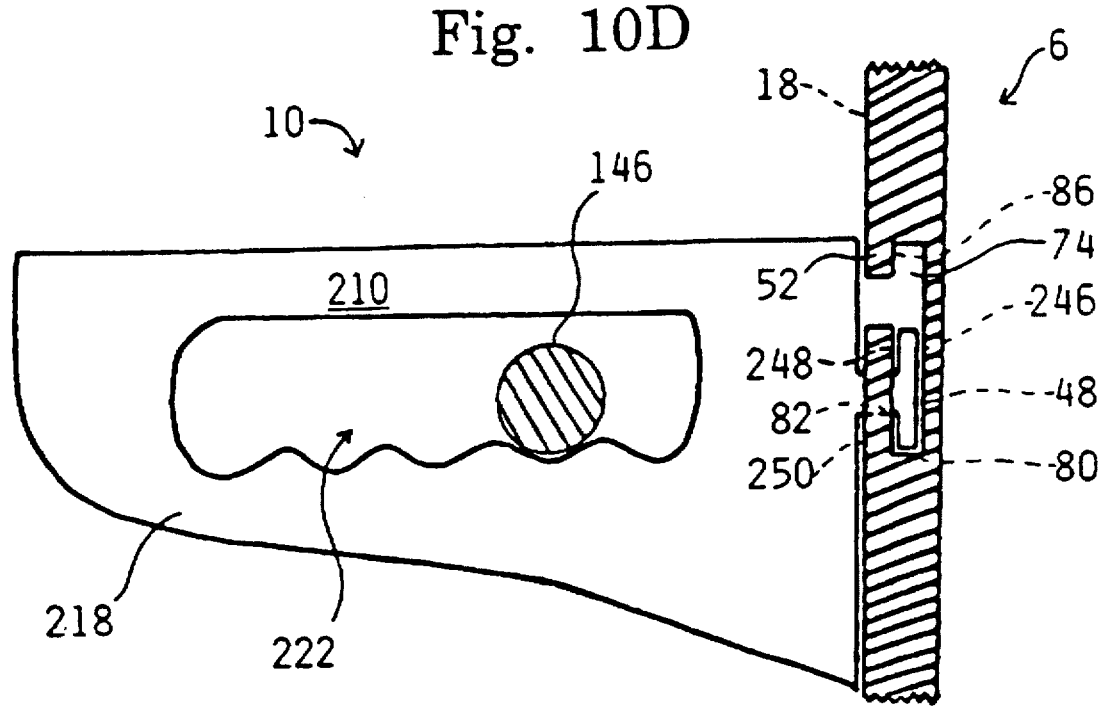
FIG. 10D is a fragmentary side view, partially in section, of the document support stand shown in FIG. 2, taken along line 10D—10D of FIG. 2, illustrating the relocatable support bracket of FIG. 10 engaging a stop slot, constructed in accordance with the present invention.
Figure 10E:
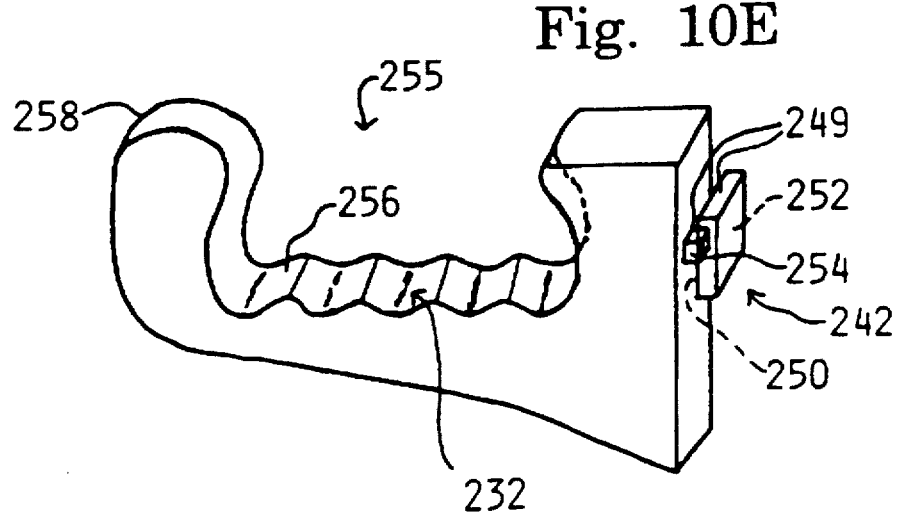
FIG. 10E is a front perspective view of a relocatable support bracket, constructed in accordance with a third form of relocatable support bracket of the present invention.

136 contoured proximate side wall of 126
138 contoured distal side wall of 126
140 front window opening of 108
142 rear opening of 108
146 elongated cylinder of 106
148 sliding door of 108
150 upper track of 108
152 lower track of 108
154 protrusion/detent retaining fitting of 108
156 projecting handle stop member of 148
158 outer surface of 148
160 distal corner of 142
162 narrowed portion of 110
164 widened portion of 110, 514
166 back plate of 110 formed in 108
167 top surface of 110
168 grooved engagement pattern in 167
169 bottom surface of 164
172 grooved diameter section of 168
174 far engagement arc section of 168
176 near engagement arc section of 168
178 open diametrical end of 168
180 near engagement point of 168
182 closed diametrical end of 168
184 far engagement point of 168
186 protruding snap fastener of 106
188 circumferential ridge of 106
190 upper closed circular region of 128
192 lower closed circular region of 128
194 telescopic pivoting cylinder for 8
196 modified elongated cylinder of 194
198 modified extension tube of 194
200 external thread of 194
202 collar of 194
204 split compression washer of 194
206 elongated convex protrusion of 194
208 elongated concave depression of 194
210 body of support bracket 10
212 vertical cooperating engagement side of 210
214 upper horizontal support side of 210
216 lower sloping support side of 210
218 front side of 210
220 rear side of 210
222 internal window like cutout of 210
224 bounded proximate side of 222
226 bounded distal side of 222
228 bounded upper horizontal side of 210
230 bounded lower horizontal support surface of 222
232 cradle support section of 230
234 wave-like contour of 232
236 bottom depression of 234
238 left side wall of 236
240 right side wall of 236
242 T-rail of 210, 522, 549
243 narrowed portion of 242
244 bracket alternative to support bracket 10
245 widened portion of 242
246 top surface of 245
248 bottom surface of 245
249 upper engagement section of 10, 244, 255
250 lower engagement support section 10, 244, 255
252 left engagement section 10, 244, 255
254 right engagement section 10, 244, 255
255 open bracket of FIG. 10E
256 exposed support surface of 255
258 curved distal end of 255
259 main support body of FIG. 11

Figure 12B:
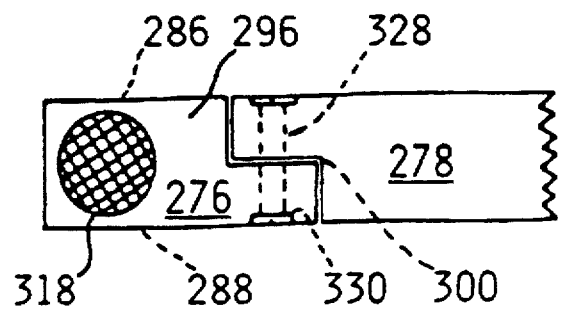
FIG. 12B is a fragmentary side elevational view of the arm shown in FIG. 12A illustrating the cooperative engagement of the base and pivoting elongated cylinder members, constructed in accordance with a third form of the present invention.
Figure 12C:
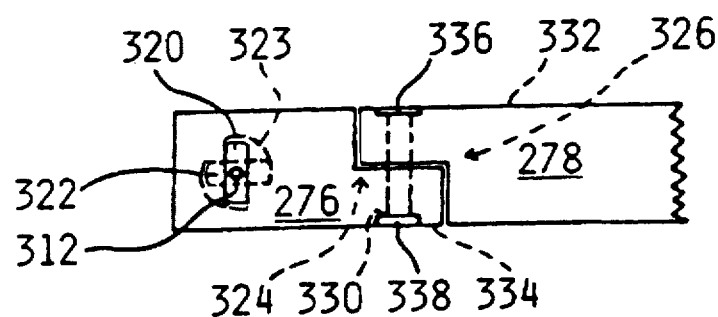
FIG. 12C is a fragmentary side elevational view of the retractable and multipositionable arm shown in FIG. 12A, taken on line 12C—12C of FIG. 12A, illustrating the control rod securing members.
Figure 13:
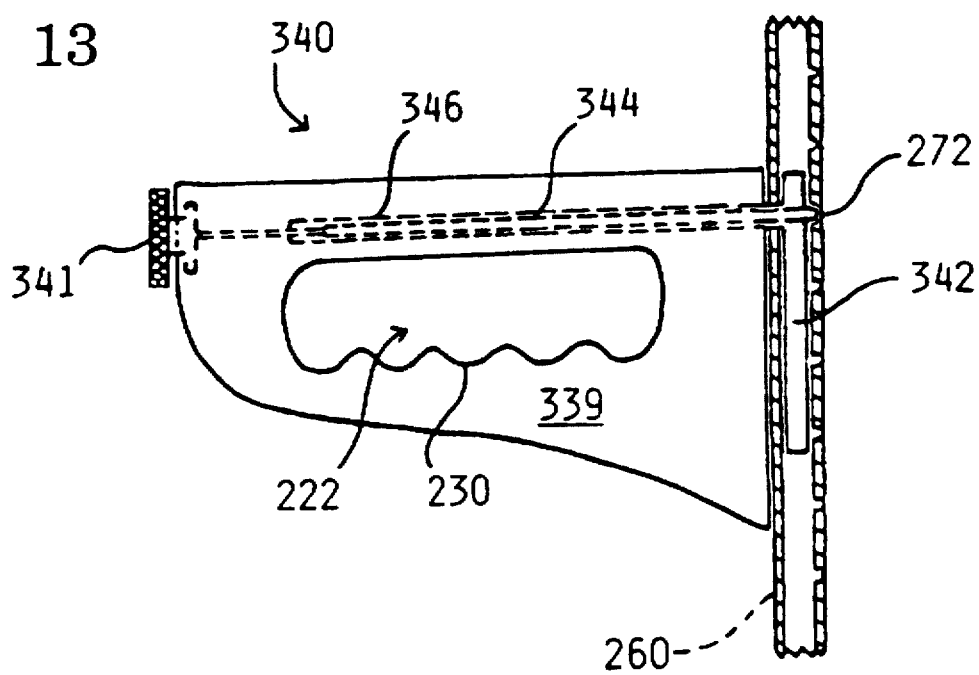
FIG. 13 is a fragmentary side elevational view, partially in section of FIG. 11, taken along line 13—13 of FIG. 11, and having a relocatable support bracket in a mounted and engaged position.
Figure 15:
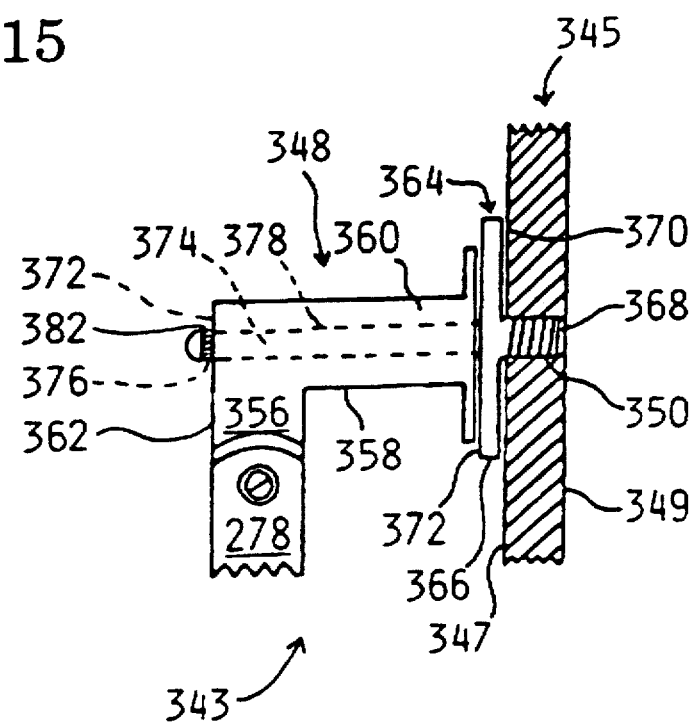
FIG. 15 is a fragmentary top view of the member relocating side shown in FIG. 14, taken along line 15—15 of FIG. 14, and having a locatably fixed multi-positionable support arm additionally mounted thereon, constructed in accordance with a third form of the arm member of the present invention.
Figure 16:
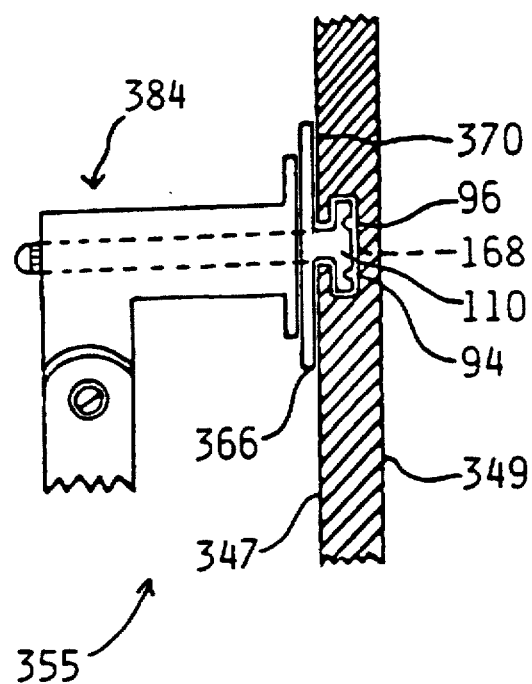
FIG. 16 is a fragmentary top view of the member relocating side shown in FIG. 14, taken along line 16—16 of FIG. 14, and having a relocatably semi-fixed multi-positionable support arm additionally mounted thereon, constructed in accordance with a fourth form of the arm member of the present invention.

260 relocating side of 263
261 distal arm T-slot of 260
262 distal bracket T-slot of 260
263 panel of 259
264 proximate bracket T-slot of 260
265 stand of FIGS. 12 and 12A
266 proximate arm T-slot of 260
268 distal arm/bracket T-slot of 260
270 proximate arm/bracket T-slot of 260
272 openings of 260
274 relocatable, retractable and multi-positionable arm of 265
276 base of 274
278 pivoting elongated cylinder of 274, 388
280 elongated rectangular of 276
282 shortened stepped rectangular of 276
284 L-shaped solid of 276, 388
286 top side of 276
288 bottom side of 276
290 front side of 276
292 back side of 276
294 proximate cooperating engagement side of 276
296 outer stepped distal side of 276
298 inner stepped distal side of 276
300 stepped pivot side of 276
302 circular flange of 276
304 T-rail of 276
306 aperture of 304
308 bore of 276
310 opening of 276
312 control rod of 276
314 stop section of 276
316 recessed wall of 276
318 knob of 312
320 protrusions of 318
322 niches of 276
322 recess of 276
324 stepped section of 276
326 stepped section of 278
328 hole in 324, 326
330 recessed shoulder in 276
332 top side of 326
334 bottom side of 324
336 screw for 338
338 coupling sleeve 274
339 body of 340
340 relocatable and retractable support bracket of FIG. 13
341 knob of 340
342 elongated T-rail of 340
343 stand of FIG. 15
344 control rod of 340
345 main support body of 343 or 355
346 bore of 340
347 member relocating side of 345
348 locatably fixed multi-positionable arm of 343
349 panel of 345
350 bores of 347
351 first vertical edge of 345
352 vertical T-slot of 347
353 second vertical edge of 345
354 branched T-slot of 347
355 stand of FIG. 16
356 base of 348
358 L-shaped solid of 356
360 long leg of 358
362 short leg 358
364 support fitting of 348

Figure 19:
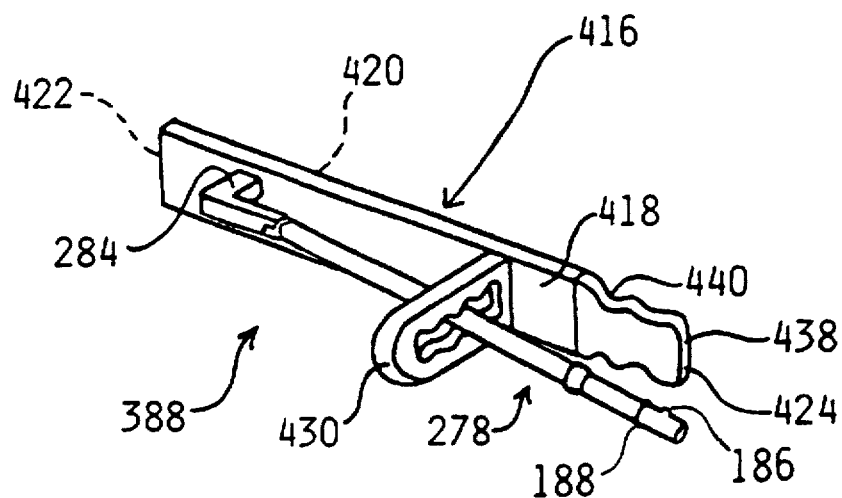
FIG. 19 is a front perspective view of a joined multi-positionable support arm, constructed in accordance with a first combined arm form of the present invention.
Figure 19A:
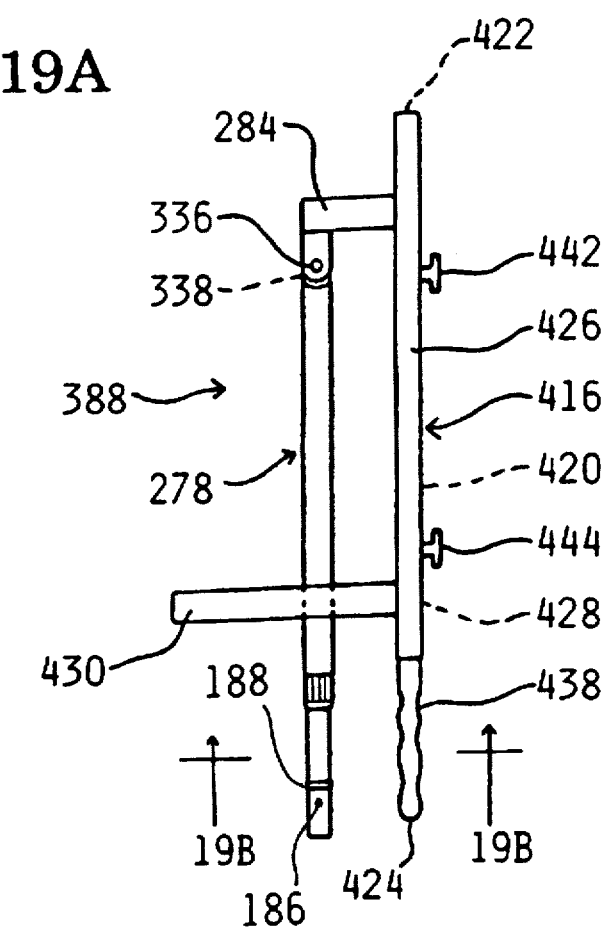
FIG. 19A is a top elevational view of the joined multi-positionable support arm shown in FIG. 19.
Figure 19B:
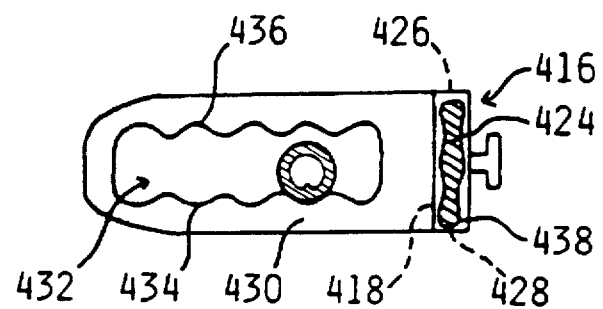
FIG. 19B is a front elevational view, partially in section, of the joined arm member shown in FIG. 19A, taken on line 19B—19B of FIG. 19A.
Figure 19C:
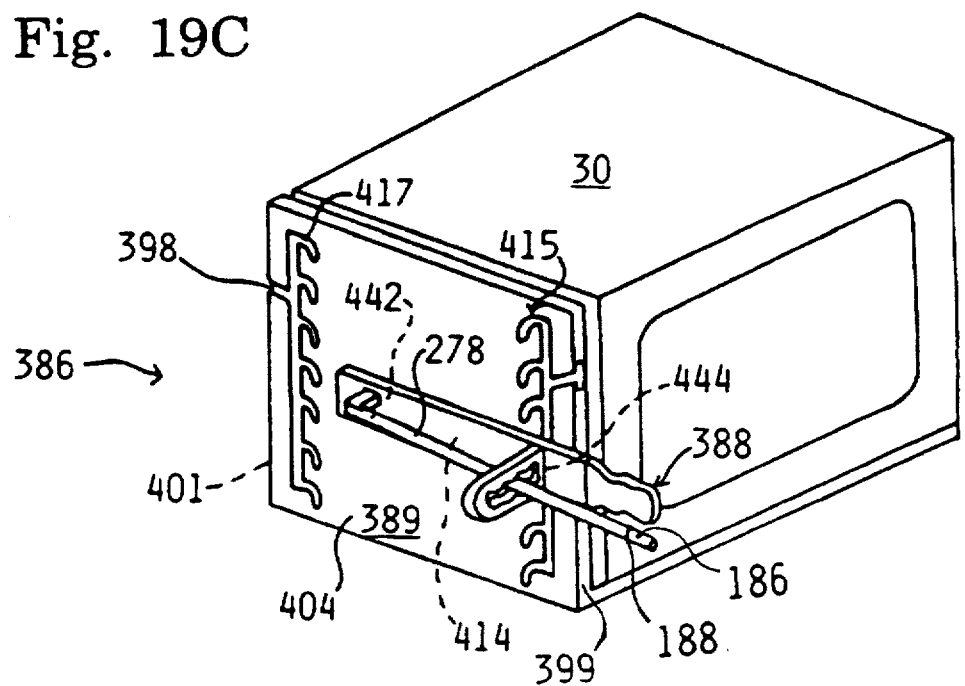
FIG. 19C is a front perspective view of the joined multi-positionable support arm shown in FIG. 19, illustrating the arm as a member of a symmetrically functioning document support stand, formed in accordance with the present invention.
Figure 20:
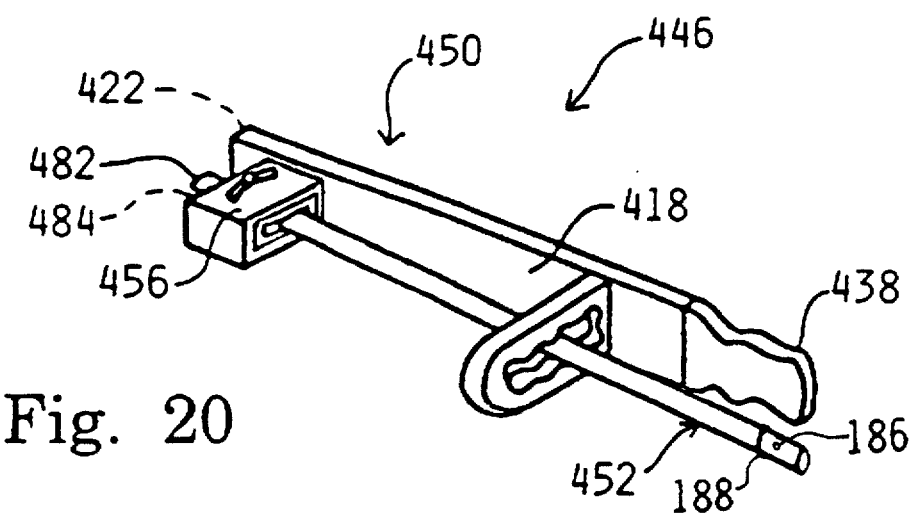
FIG. 20 is a front perspective view of a joined and partially releasable multi-positionable support arm, constructed in accordance with a second combined arm form of the present invention.
Figure 23:
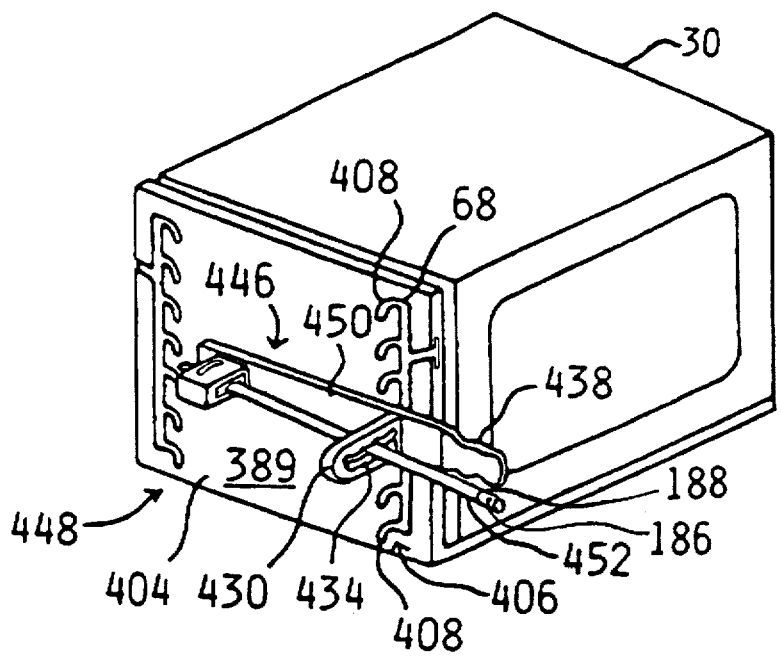
FIG. 23 is a front perspective view of the joined arm shown in FIG. 20, illustrating the arm as a member of a symmetrically functioning document support stand and having the arm positioned to the left side of a video display monitor in accordance with the second combined arm form of the present invention.
Figure 24:
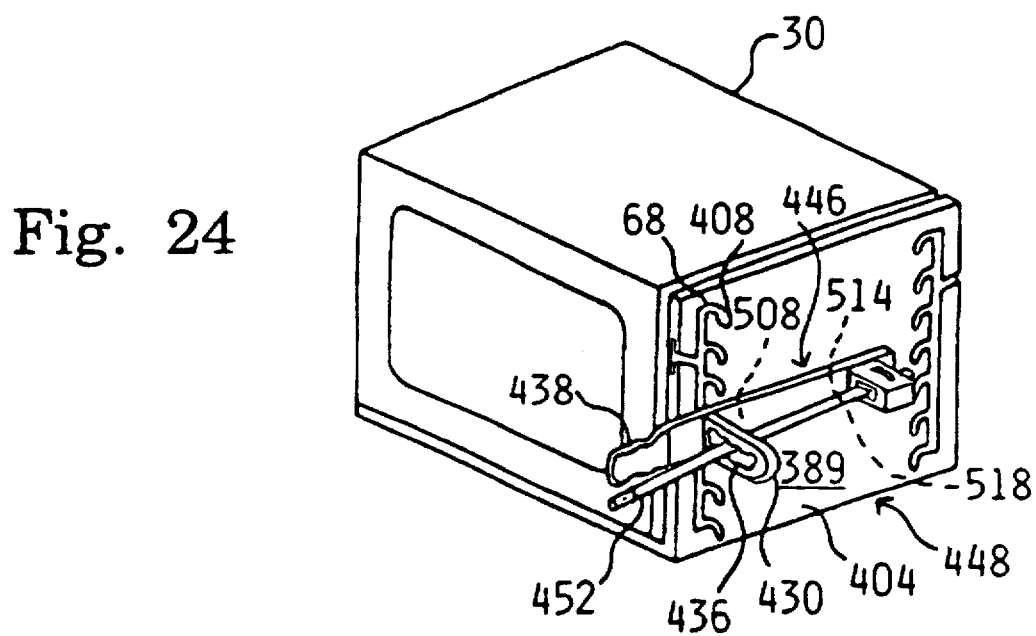
FIG. 24 is an alternative perspective view, to that of FIG. 23, having the arm positioned to the right side of a video display monitor in accordance with the symmetrical form and function of the present invention.

366 circular plate-like flange of 364
368 stud of 366
370 inner facing side of 366
372 outer facing side of 366
374 smooth shaft of 364
376 groove at end of 374
378 through aperture 356
382 reinforced e-ring at 374
384 relocatable semi-fixed multi-positionable arm of 355
385 T-slot form of 390
386 stand of FIG. 19C
387 main support body of FIG. 17
388 joined and multi-positionable support arm of 386
389 main support body of 386, 448
390 front member relocating side of 387
391 first vertical edge of 387
392 horizontal-first T-slot section of 390
393 second vertical edge of 387
394 1st vertical-second T-slot section of 390
395 2nd vertical-second T-slot section of 390
396 upper stop slot of 390
397 terminating edge of 385
398 longitudinal outer side wall channel opening of 394, 395, 415, 417
399 first vertical edge of 389
400 enlarged opening of 390, 404
401 second vertical edge of body 389
402 terminated end of 414
404 member relocating side of 389
406 arced stop slot of 389
408 arced stepped stop section of 406
410 arced terminating narrowed edge of 408
412 arced terminating widened edge of 408
414 horizontal-first T-slot section of 389
415 1st vertical-second T-slot section of 389
416 joining base of 388
417 2nd vertical-second T-slot section of 389
418 front side of 416, 450
420 cooperating engagement side of 416, 450
422 back edge of 416, 450
424 front edge of 416, 450
426 top edge of 416, 450
428 bottom edge of 416, 450
430 symmetrically formed bracket of 416, 450
432 enlarged bounded cutout of 430
434 horizontal left arm support surface of 432
436 horizontal right arm support surface of 432
438 contoured symmetrical handle of 416, 450
440 grip-like contours of 438
442 first circular T-rail of 416, 450
444 second circular T-rail of 416, 450
446 joined and partially releasable multi-positionable support arm of FIG. 20
448 static stand of FIGS. 23 and 24
450 joining base of 446
452 releasable pivoting elongated cylinder of 446
456 engagable housing of 450
458 socket of 456
459 inner top wall of 458
460 outer top side of 456
461 inner bottom wall of 458
462 outer bottom side of 456
463 inner contoured proximate side wall of 458
464 outer distal side of 456
465 inner contoured distal side wall of 458
466 outer proximate side 456
467 front window opening 456

Figure 25:
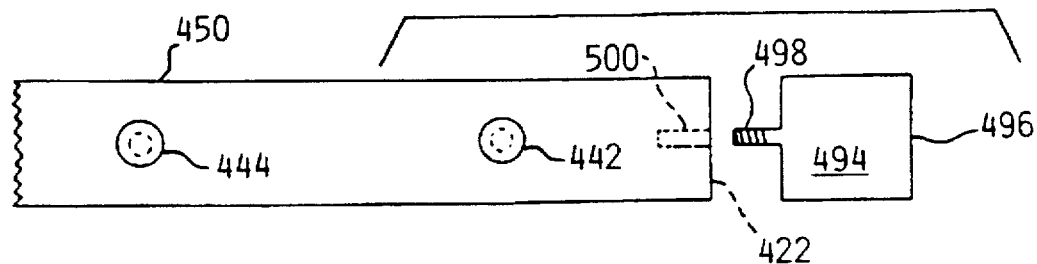
FIG. 25 is a partially exploded and fragmented side elevational view of the base member cooperating side of a joined multi-positionable support arm similar in many respects to that shown in FIG. 19 but adapted to receive a removable counterweight.
Figure 25A:
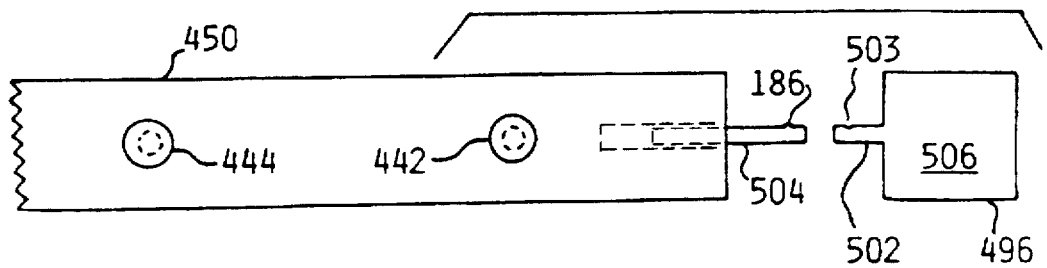
FIG. 25A is a view, similar to that of FIG. 25, showing the base member adapted further to telescopically project a removable counterweight.
Figure 26:
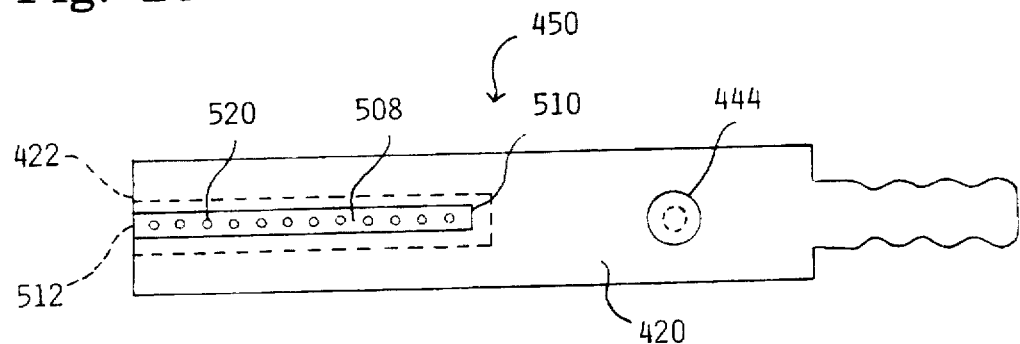
FIG. 26 is a view, like that of FIG. 22, illustrating the base member cooperating side, constructed in accordance with an alternative form of the present invention.
Figure 27:
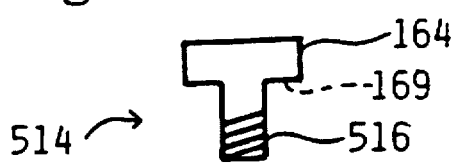
FIG. 27 is a side elevational view of a threaded circular T-rail member adapted to be used in alternative forms of the joined arm base member of the present invention.
Figure 28:
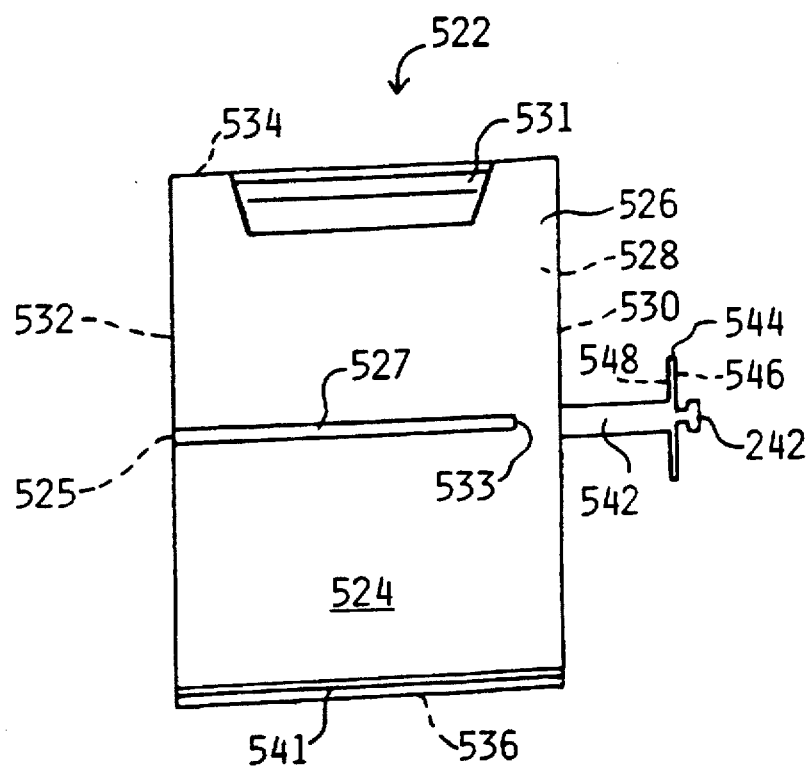
FIG. 28 is a front elevational view of a relocatable copyholder, constructed in accordance with an alternative joined form of the present invention.
Figure 28A:
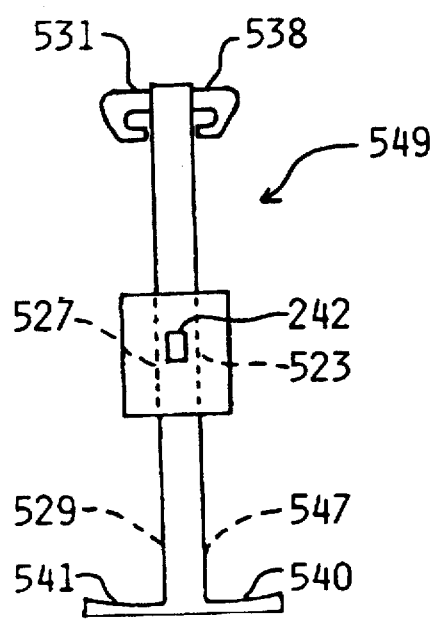
FIG. 28A is a side elevational view of a symmetrical copyholder, illustrating the additional structure and duality of its opposite mounting sides in relation to the relocatable copyholder shown in FIG. 28, constructed in accordance with the present invention.
Figure 29:
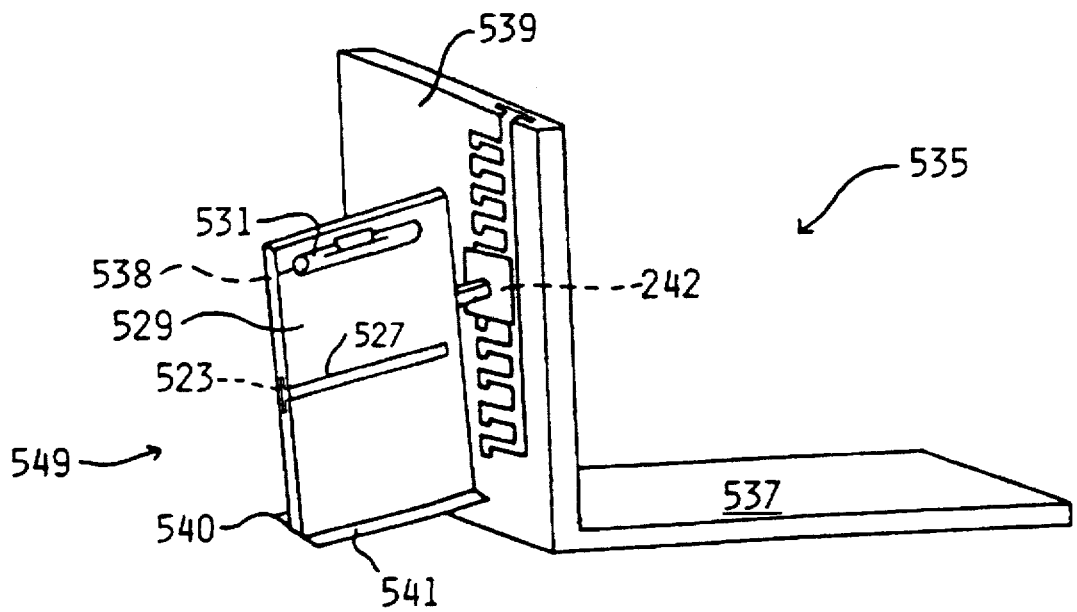
FIG. 29 is a front perspective view of a main support body with a relocatable copyholder mounted thereon in accordance with an alternative form of the present invention.
Figure 30:
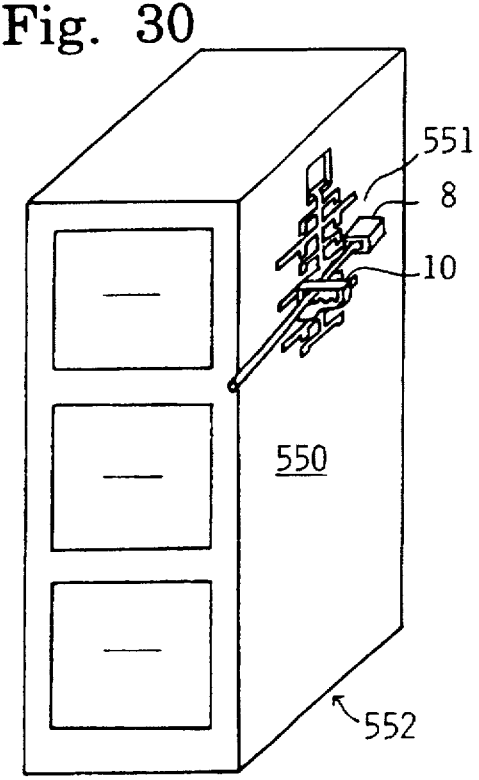
FIG. 30 is a front perspective view of a filing cabinet having a member relocating side integrally formed therein in accordance with a modified form of the present invention.
Figure 31:
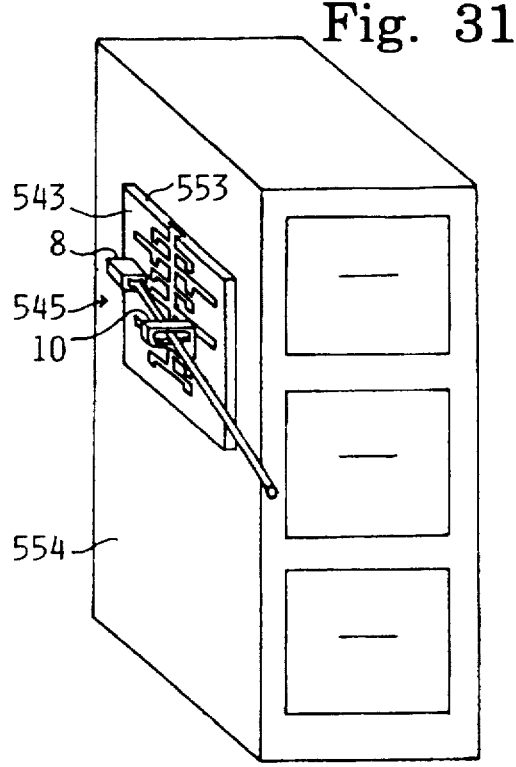
FIG. 31 is front perspective view of a conventional filing cabinet having a main support body attached to its side through the use of an economical attachment means in accordance with an alternative form of the present invention.

468 outer front side 456
469 rear opening of 456
470 curved slots in 460
472 curved terminated ends of 470
474 protruding modified disk of 452
476 modified releasable pivoting elongated cylinder of FIG. 21B
478 disk-like section of 452
482 upper handle of 452
484 lower handle of 452
486 exterior surface of 482, 484
488 protruding ear of 482, 484
490 cutout section of 476
494 removable counterweight of FIG. 25
496 weight of 494, 506
498 threaded rod of 494
500 longitudinally threaded hole of FIG. 25
502 projecting tube of 596
503 snap opening of 502
504 telescopic member of FIG. 25A
506 attachable counterweight of FIG. 25A
508 axial T-slot of FIG. 26
510 terminated end of 508
512 access opening of 508
514 threaded circular first T-rail of FIG. 27
516 threaded narrow portion of 514
518 threaded bores in 390
520 threaded aperture in 508
522 relocatable copyholder of FIG. 28
523 T-slot of 547
524 body of 522
525 exposed opening of 527
526 document mounting side of 522
527 T-slot of 529
528 rear side of 524
529 first document mounting side of 549
530 inner side of 524
531 biased clip of 526, 529
532 outer side of 524
533 terminating edge of 527
534 upper side of 524
535 stand of FIG. 29
536 lower side of 524
537 main support body of 535
538 biased clip of 547
539 member relocating side of 537
540 support ledge of 547
541 support ledge of 526, 529
542 rib of 524
543 member relocating side of stand 545
544 flange of 524
545 stand of FIG. 31
546 cooperating engagement side of 544
547 second document mounting side of 549
548 support side of 544
549 symmetrical copyholder of FIG. 28A
550 main support body of 552
551 member relocating side of 552
552 stand of FIG. 30
553 main support body of 545
554 conventional file cabinet of FIG. 31
555 vertical support member of FIG. 32
556 rear side of 566
557 panel of 564
558 adhesive mat of 564, 568
559 recess of 564
560 inner facing attachment side of 558

Figure 32C:
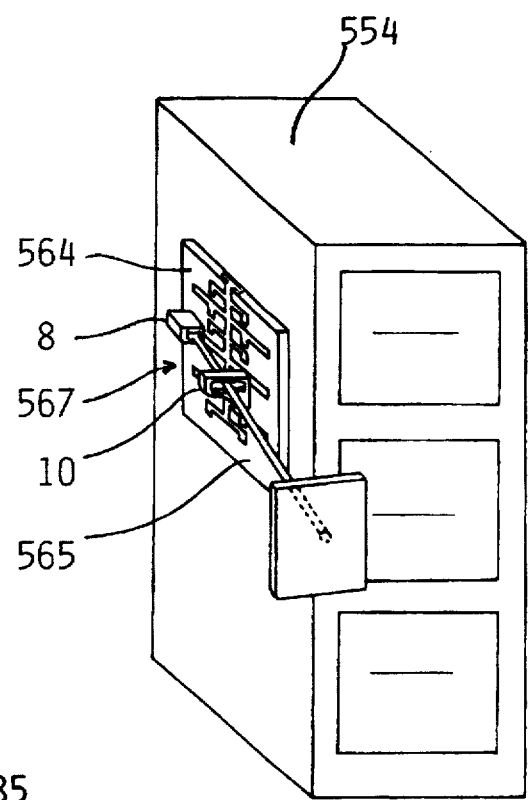
FIG. 32C is a front perspective view of a filing cabinet and adhering main support body, illustrating an application of the additional alternative form of the present invention shown in FIG. 32.
Figure 32D:
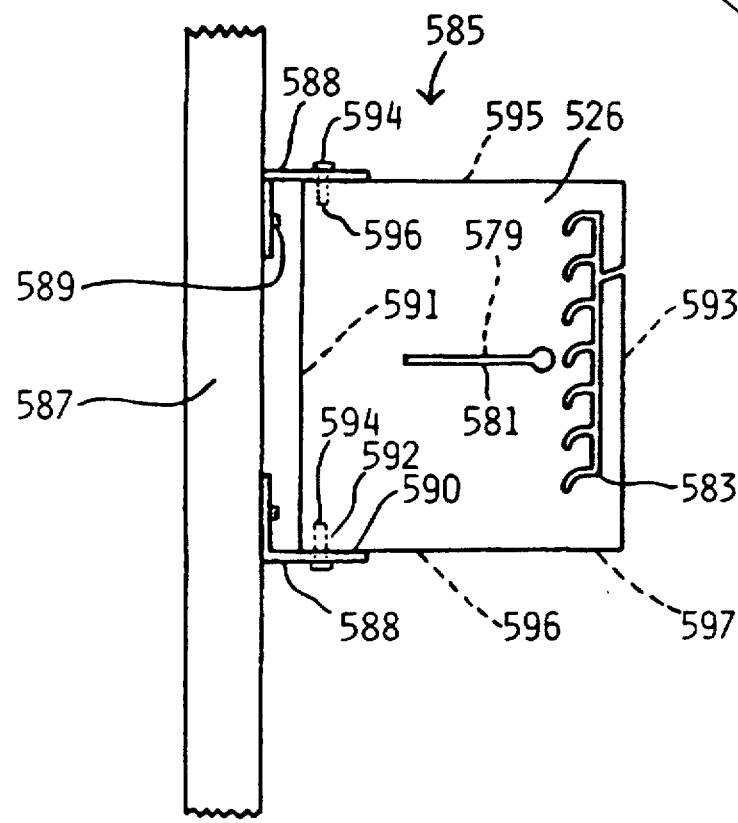
FIG. 32D is a fragmented front elevational view of a main support body pivotally mounted on a structural member, constructed in accordance with a modification to the mounting means of the present invention shown in FIG. 31.
Figure 33:
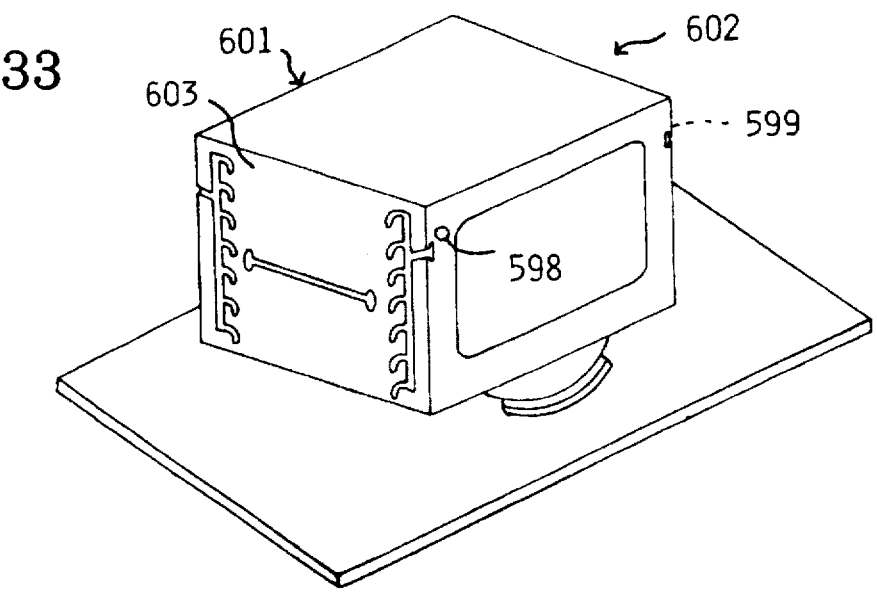
FIG. 33 is a front perspective view of a stationary main support monitor having the member relocating side of the present invention integrally formed within its casing, constructed in accordance with a combined form and application of the present invention.
Figure 33A:
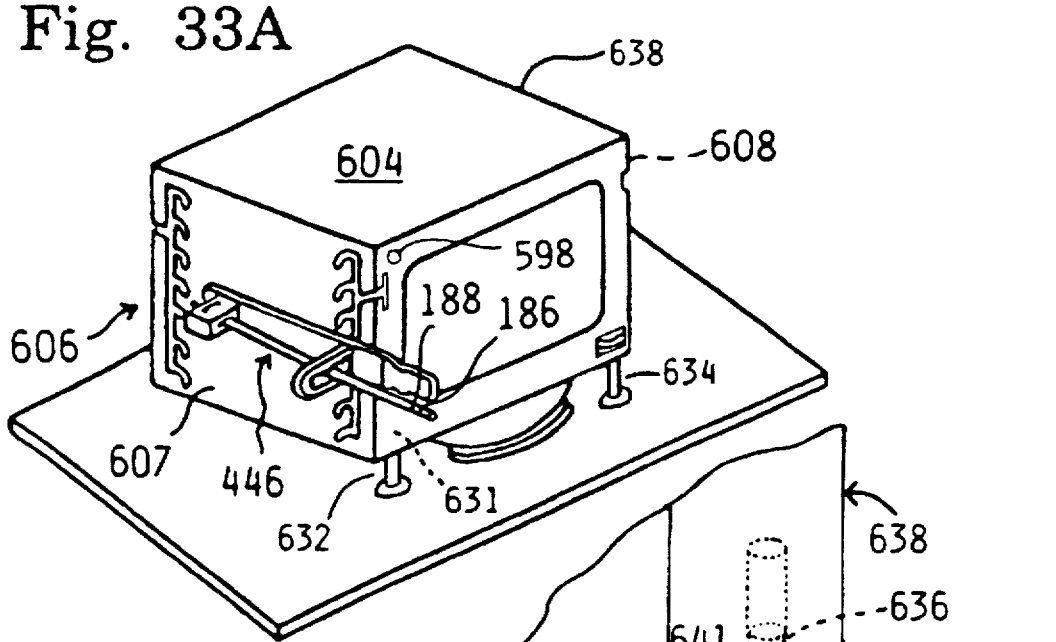
FIG. 33A is a front perspective view of an omni-directionable and multi-positionable video support stand constructed in accordance with an additional combined application of the present invention.
Figure 33B:
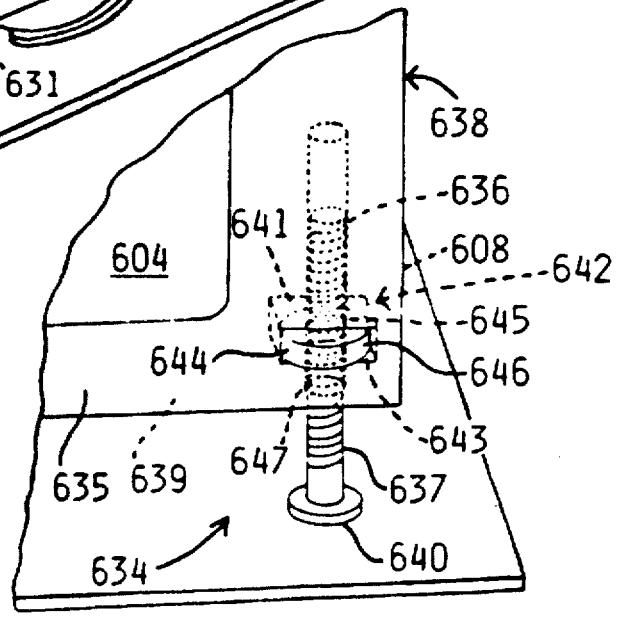
FIG. 33B is a fragmentary perspective view of an adjustable stabilizer member incorporated in the main support monitor of FIG. 33A.
Figure 33C:
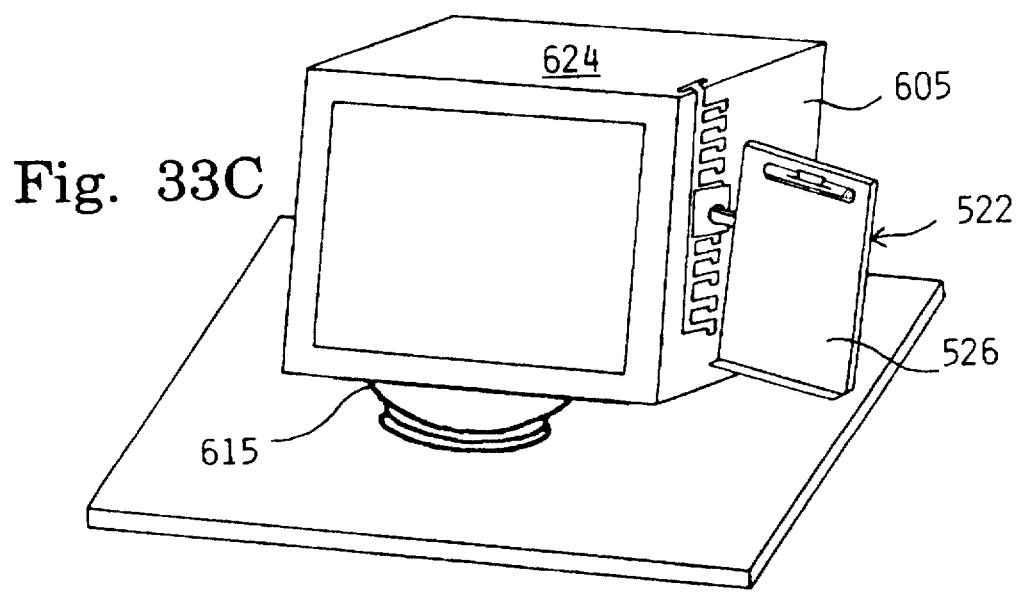
FIG. 33C is a front perspective view of a stationary main support member having a relocatable copyholder and adjustable-accessory base member constructed in accordance with a another combined application of the present invention.
Figure 33D:
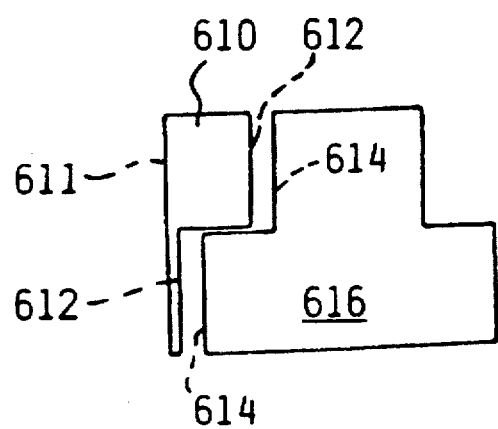
FIG. 33D is an exploded top elevational view of a irregularly shaped video display monitor and an adaptive main support body, constructed in accordance with an adapting form of the present invention.
Figure 34:
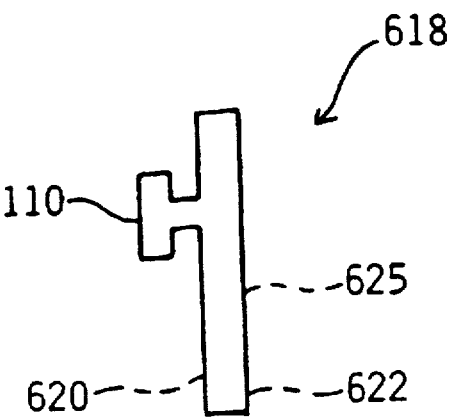
FIG. 34 is a side elevational view of a relocatable counterweight, constructed in accordance with one form of the present invention.
Figure 34A:
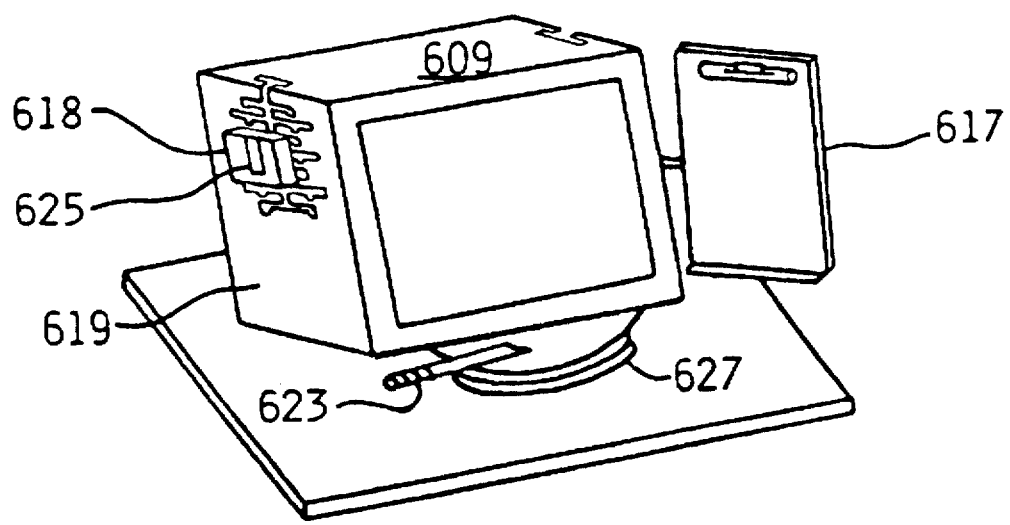
FIG. 34A is a front perspective view of a stationary main support monitor and adjustable-accessory brake assembly, constructed in accordance with a further combined form of the present invention.
Figure 34B:
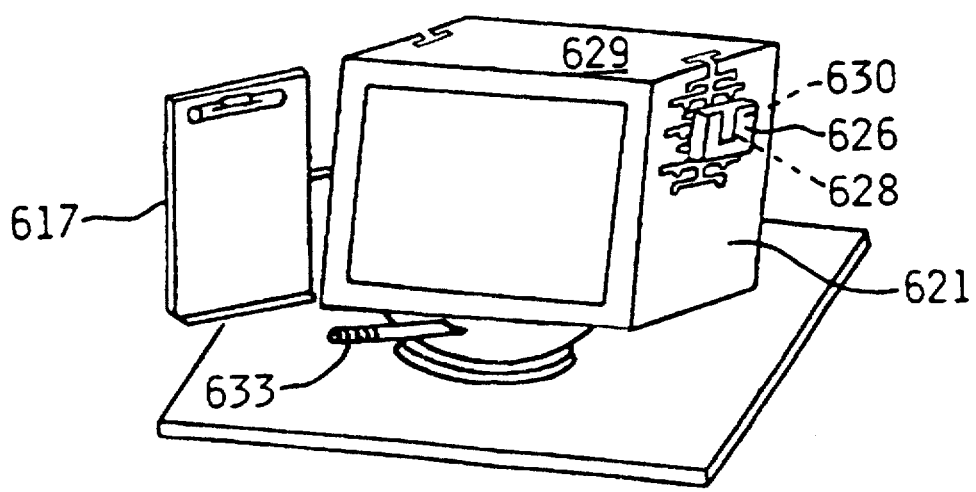
FIG. 34B is front perspective view illustrating a fixedly adjustable main support monitor having a brake assembly integrally formed therein, in accordance with an improved form of the embodiment shown in FIG. 34A.

562 outer facing adhesive side of 558
564 adhering main support body of 567
565 member relocating side of 564
566 panel of 568
567 stand of FIG. 32C
568 disengageable adhering main support body of FIGS. 32A, 32B
569 member relocating side of 568
570 semi-rigid engagement bolt of 568
572 pliable head of 570
574 threaded stem of 570
576 aperture in 558
578 slotted nuts for 574
579 common slotted edge of 585
580 recess in 566
581 horizontal slot of 585
582 holes in 566
583 vertical slot of 585
584 support surface for 568
585 main support body of FIG. 32D
586 first member relocating side of 585
587 vertical support post for 585
588 L-brackets for 585
589 screws for 588
590 projecting leg of 588
591 second vertical edge of 585
592 opening in 588
593 second member relocating side of 585
594 machine bolt for 585
595 top edge of 585
596 threaded aperture in 595
597 bottom edge of 585
598 cam lock
599 a member relocating side of 602
601 casing of 602
602 stationary main support monitor of FIG. 33
603 a member relocating side of 602
604 directionally adjustable main support monitor of FIG. 33A
605 member relocating side of 624
606 omni-directionable and multi-positionable video support stand of FIG. 33A
607 a member relocating side of 604
608 a member relocating side of 604
609 stationary main support monitor of FIG. 34A
610 adaptive main support body of FIG. 33D
611 member relocating side of 610
612 adapting side of 610
614 side of 616
615 adjustable-accessory base of FIG. 33C
616 irregularly shaped video display monitor of FIG. 33D
617 heavy duty document holder of FIG. 34A
618 relocatable counterweight of FIG. 34
619 a member relocating side of 609
620 proximate cooperating engagement side of 618
621 a member relocating side of 629
622 distal receiving side of 618
623 stabilizing control lever of 627
624 stationary main support monitor of FIG. 33C
625 T-slot of 618
626 shifting counterweight of FIG. 34B
627 adjustable-accessory brake assembly of FIG. 34A
628 hollow cavity of 626
629 fixedly adjustable main support monitor of FIG. 34B
630 movable weight of 626
631 threaded bore
632 an adjustable basic stabilizer of 604

Figure 36:
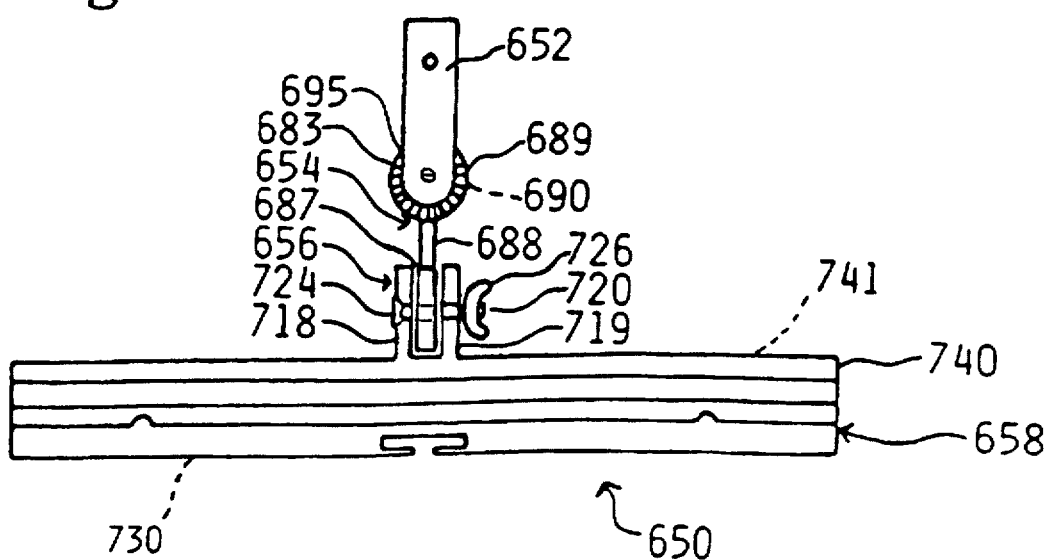
FIG. 36 is a top elevational view of the attachable multi-positionable document holder illustrated in FIG. 35 with its viewing side rotated ninety degrees relative to the position illustrated in FIG. 35.

633 stabilizing control lever of 629
634 an adjustable stabilizer of 604
635 front viewing side of 604
636 bore in 638
637 threaded rod of 634
638 casing of 604
639 bottom side of 638
640 self-leveling foot of 632, 634
641 a wall of 642
642 cutout in 635
643 a wall of 642
644 adjusting disk of 634
645 threaded center opening of 644
646 knurled circumferential surface of 644
647 opening to 636
650 attachable multi-positionable document holder device of FIG. 36
652 attachable proximate clevis of 650
654 biaxial positioning fitting of 650
656 pivotable distal clevis of 650
657 pivotable distal clevis of 746
658 rotatable document holder member of 650
670 leg member of 652
672 leg member of 652
674 short tube-like member of 652
676 snap fastener opening of 652
678 longitudinal concave depression of 652
680 outer planar side of 670, 672
681 inner planar side of 670, 672
682 cylindrical surface of 683
683 proximate disk of 650 in 654
684 curved edge of 652
685 center opening of 670, 672
686 tapered triangular prisms of legs 670, 672, 718, 719 and disks 683, 687
687 distal disk of 650 in 654
688 connecting bar of 654
689 upper circular side of 683
690 lower circular side of 683
692 center opening of 718, 719
694 aperture of 683
695 shaft of 683
696 head of 695
698 wingnut for 695
700 upper circular side of 687
702 lower circular side of 687
704 cylindrical surface of 687
710 aperture of 687
714 cylindrical surface of 687
717 inner side of 718, 719
718 leg of 656
719 leg of 656
720 shaft of 656
721 leg of 746
723 leg of 746
724 head of 720
726 wingnut for 720
728 plate-like body of 658
730 front side of 728 (viewing side of 658)
732 rear side of 728
734 T-slot of 658
735 turntable assembly of 658
736 top portion of 735
737 upper side of 735
738 bottom portion of 735
739 top side of 740
740 support plate of 658

Figure 42:
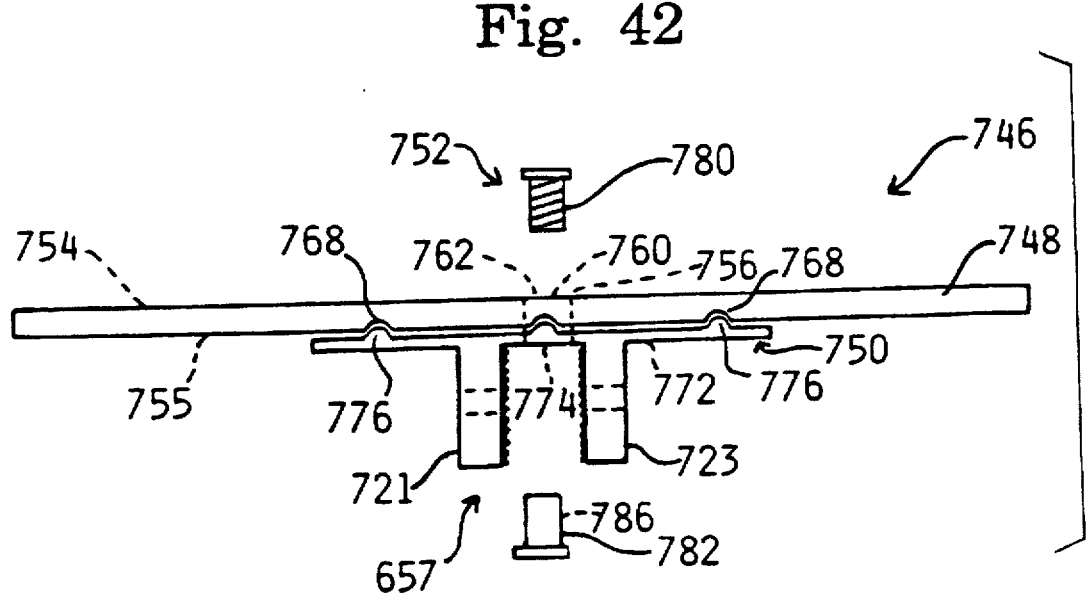
FIG. 42 is a partially exploded, side elevational view of a rotatable document holder member, constructed in accordance with an alternative form of the present invention.
Figure 42A:
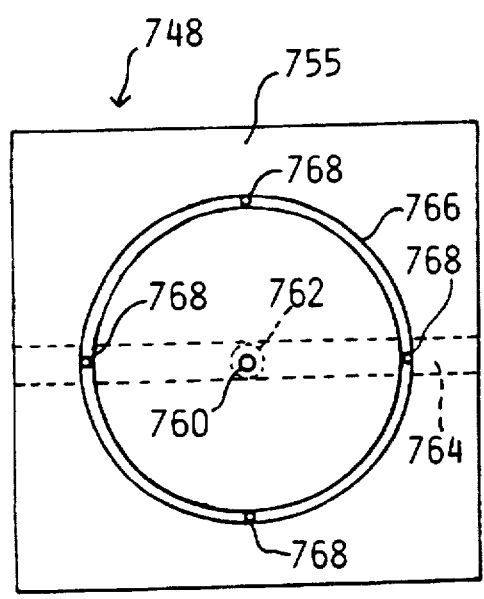
FIG. 42A is a bottom elevational view of the rear side of the plate-like rotating member of the rotatable document holder shown in FIG. 42 and illustrating the location of its integrally formed protrusion members.
Figure 42B:
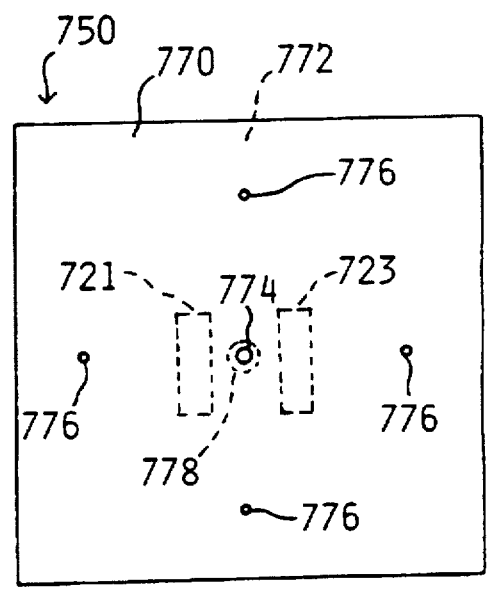
FIG. 42B is a top elevational view of the frontward side of the semi-rigid support member of the rotatable document holder shown in FIG. 42 and illustrating the location of its integrally formed stop detent members.
Figure 42C:
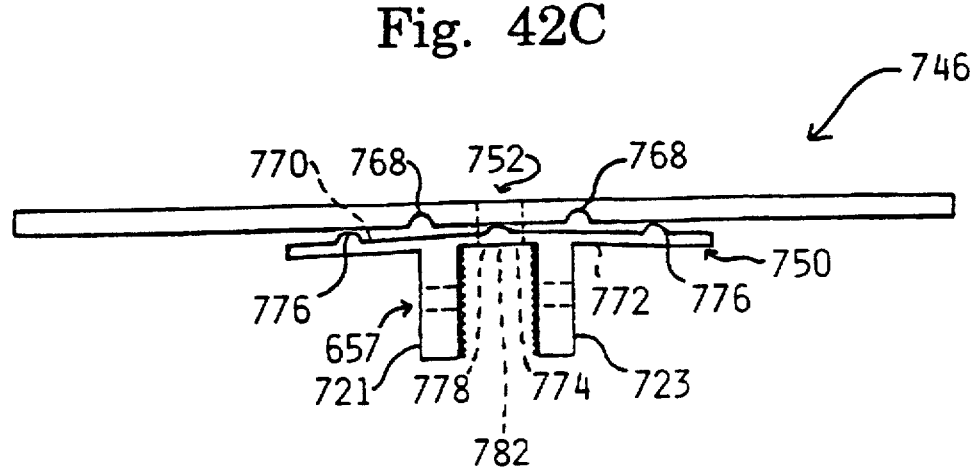
FIG. 42C is a side elevational view of the rotatable document holder member shown in FIG. 42, illustrating the flexed state of its semi-rigid support member when its protrusion members are disengaged from its engagable stop detent members.
Figure 43:
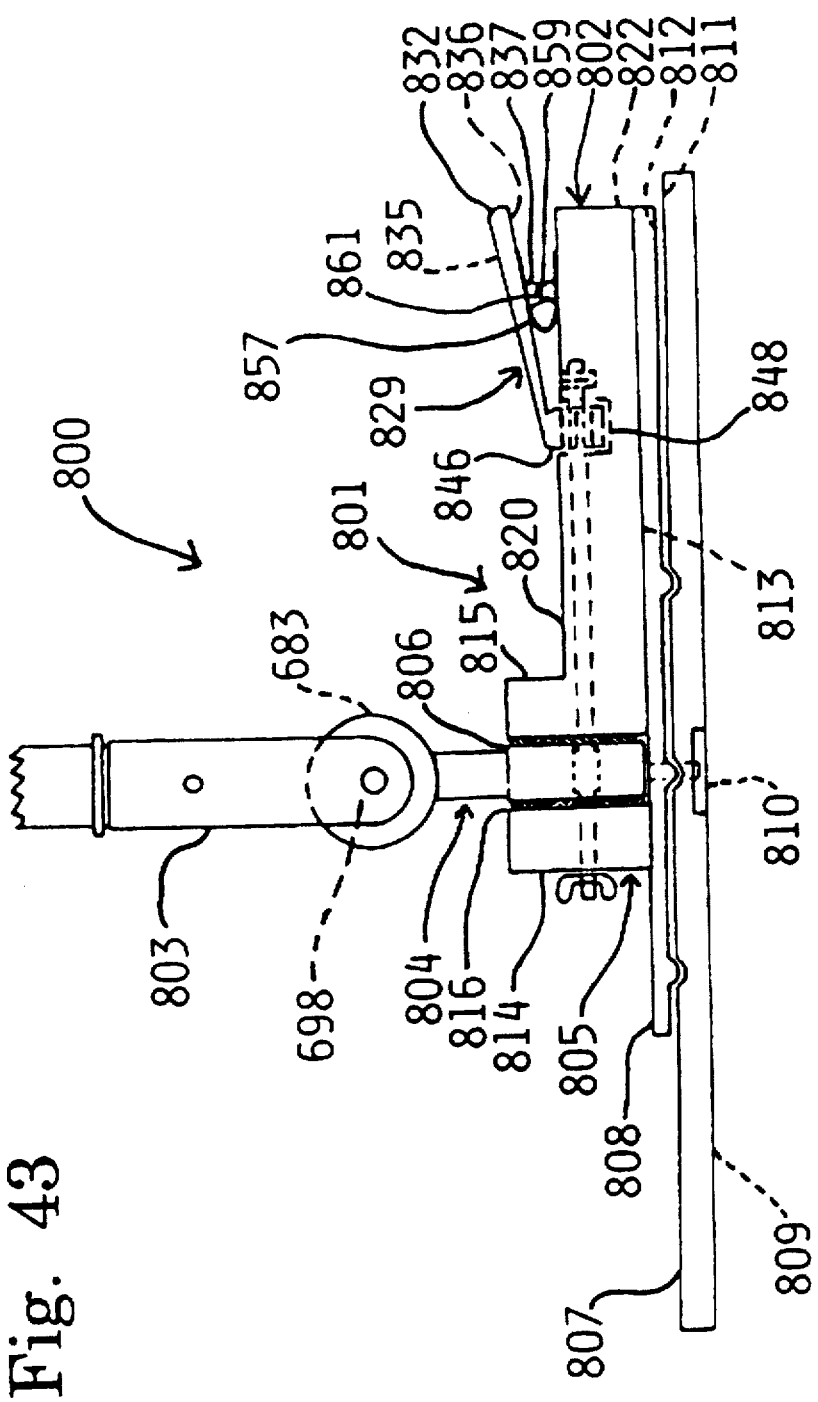
FIG. 43 is a top elevational view of a multi-positionable and pivotally fixable document holder, constructed in accordance with a further improved form of the present invention.

741 bottom side of 740
742 bullet shaped protrusions from 732
743 lower side of 738
744 stop detents in 732
746 basic rotatable document holder of FIGS. 42, 42C
748 plate-like body of 746
750 a plate-like semi-rigid support member of 746
752 rotational coupling member of 746
754 front side of 748 (viewing side of 746)
755 rear side 748
756 T-slot in 754
757 open end of 756
760 opening at center of 748
762 recessed shoulder of 760 at 754
764 backplate of 756
766 circular groove at 755
768 detent in 755
770 frontward side of 750
772 rearward side of 750
774 opening at center of 750
776 protrusions from 772
778 recessed shoulder at 772
780 shouldered screw for 782
782 shouldered coupling sleeve for 746
784 enlargement for 780
786 smooth exterior side of 782
788 smooth side wall of 774
800 multi-positionable and pivotally fixable document holder of FIG. 43
801 rotatable and pivotally fixable document holder of 800
802 rack and pinion platform of 801
803 attachable proximate clevis of 800
804 biaxial positioning fitting of 800
805 pivotable distal clevis of 800
806 modified distal disk of 804
807 plate-like body of 801
808 semi-rigid support member of 801
809 viewing side of 807
810 T-slot at 809
811 rear side of body 807
812 frontward side of 808
813 rearward side of 808
814 leg on 813
815 leg of 802
816 protrusions on 814, 816
817 modified openings of leg 814
818 modified aperture of 815
819 winged shaft of 802
820 raised back side of 802
821 disk facing legged side of 802
822 outer facing control side of 802
823 longitudinal side of 802
824 longitudinal side of 802
825 wall of 826
826 gear well of 802
827 wall of 826
828 retaining niche of 802
829 control lever of 802
830 modified bore of 802
831 a wall of 828
832 handle of 829
833 a wall of 828
834 keyways of 802
835 top surface of 832
836 bottom surface of 832
837 pivotable ears on 836
838 retaining end of 819

Figure 45:
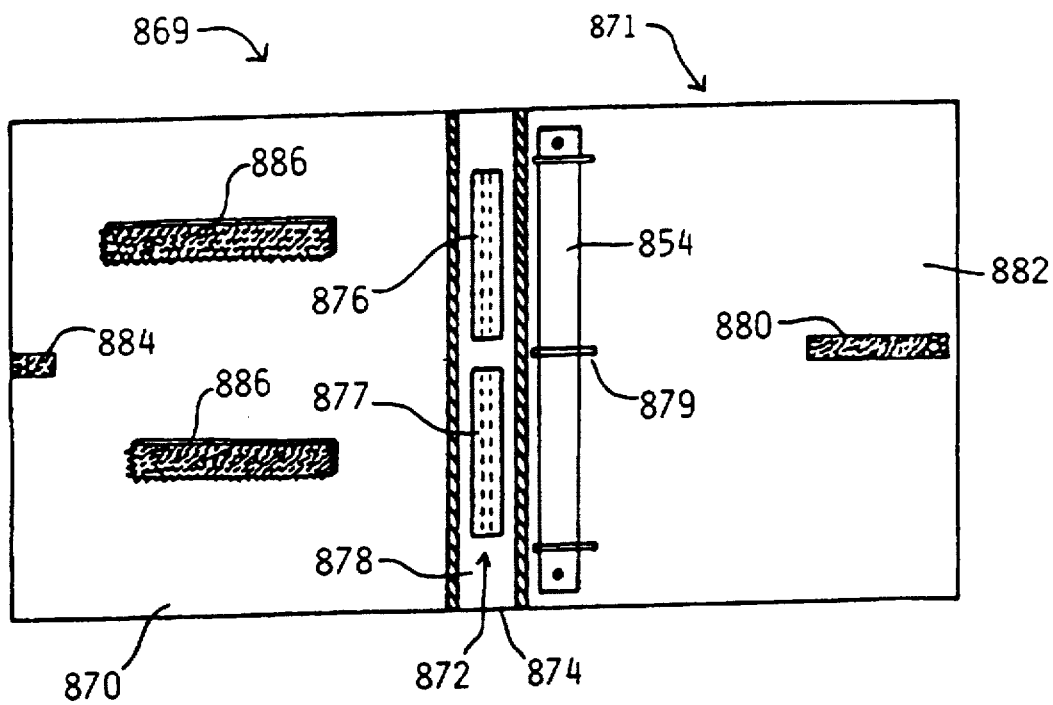
FIG. 45 is a top elevational view of an interiorly modified loose-leaf binder type document holder, having engaging means mounted on the inside of its cover, which engagably cooperates with the attachable multi-positionable document holder shown in FIG. 36, constructed in accordance with an improved form of the present invention.
Figure 46:
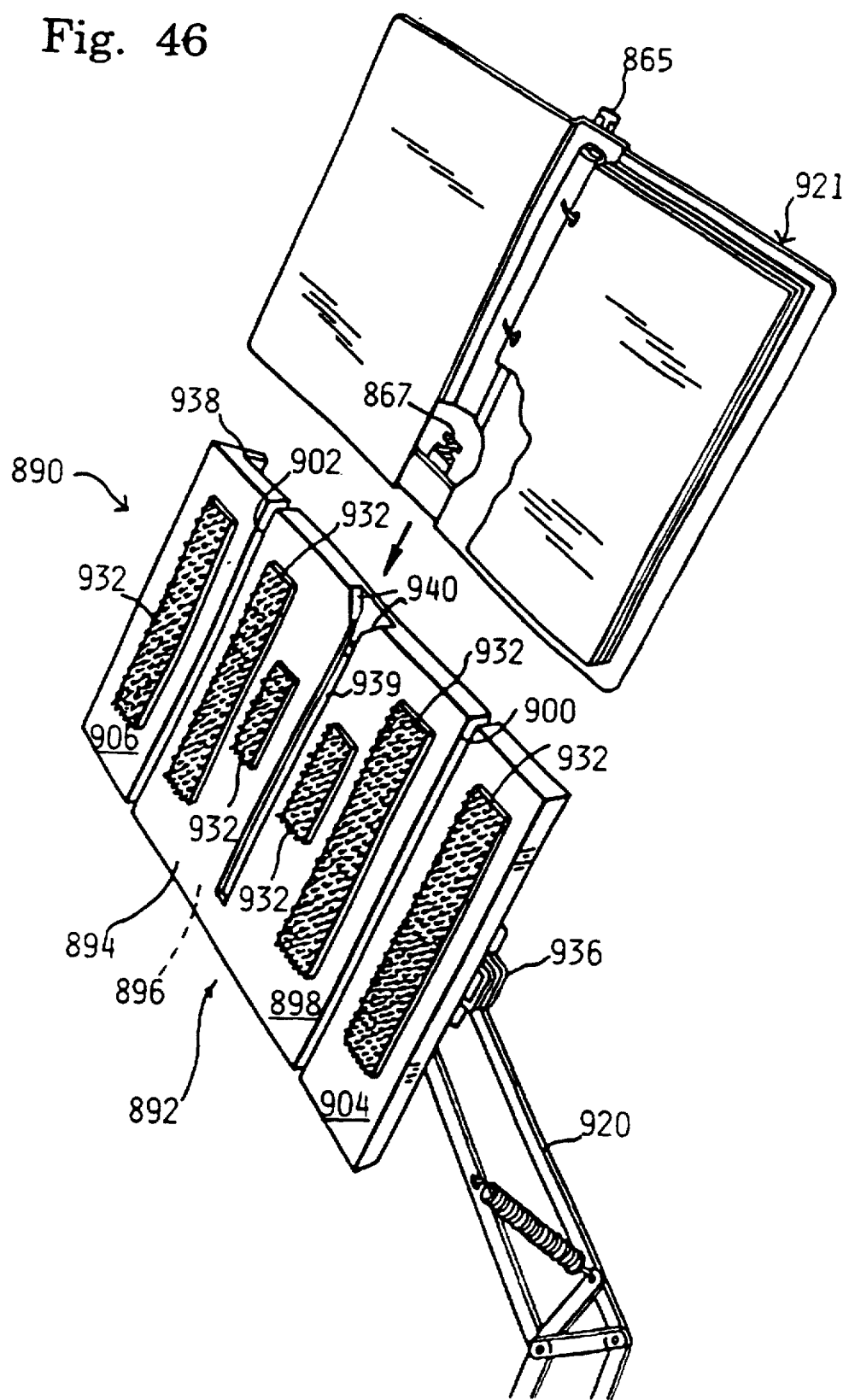
FIG. 46 is a front perspective view of a multi-purpose document support stand and a document holder, partially broken away, constructed in accordance with another form of the present invention.
Figure 46A:
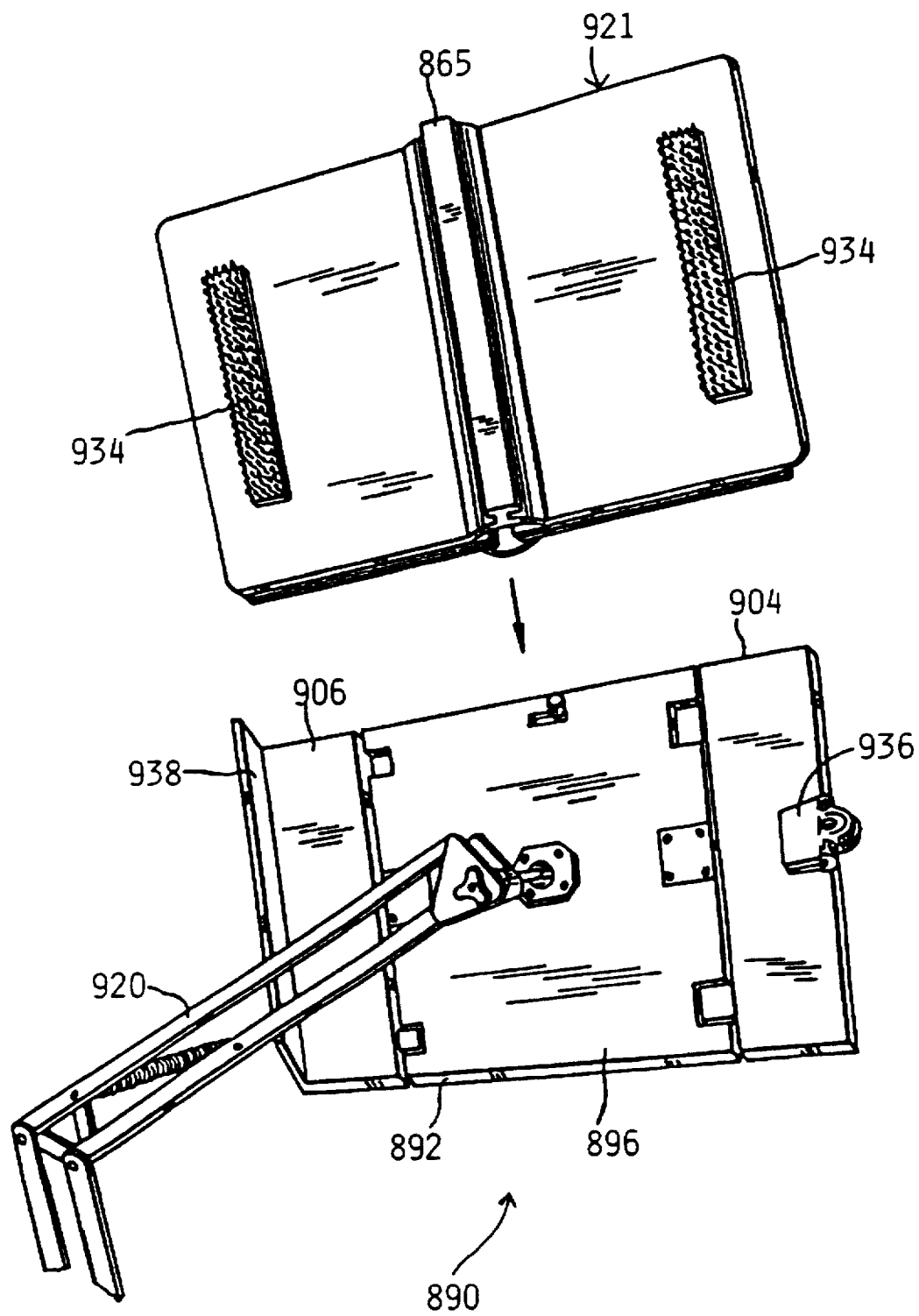
FIG. 46A is a rear perspective view of the document support stand and document holder shown in FIG. 46.
Figure 46B:
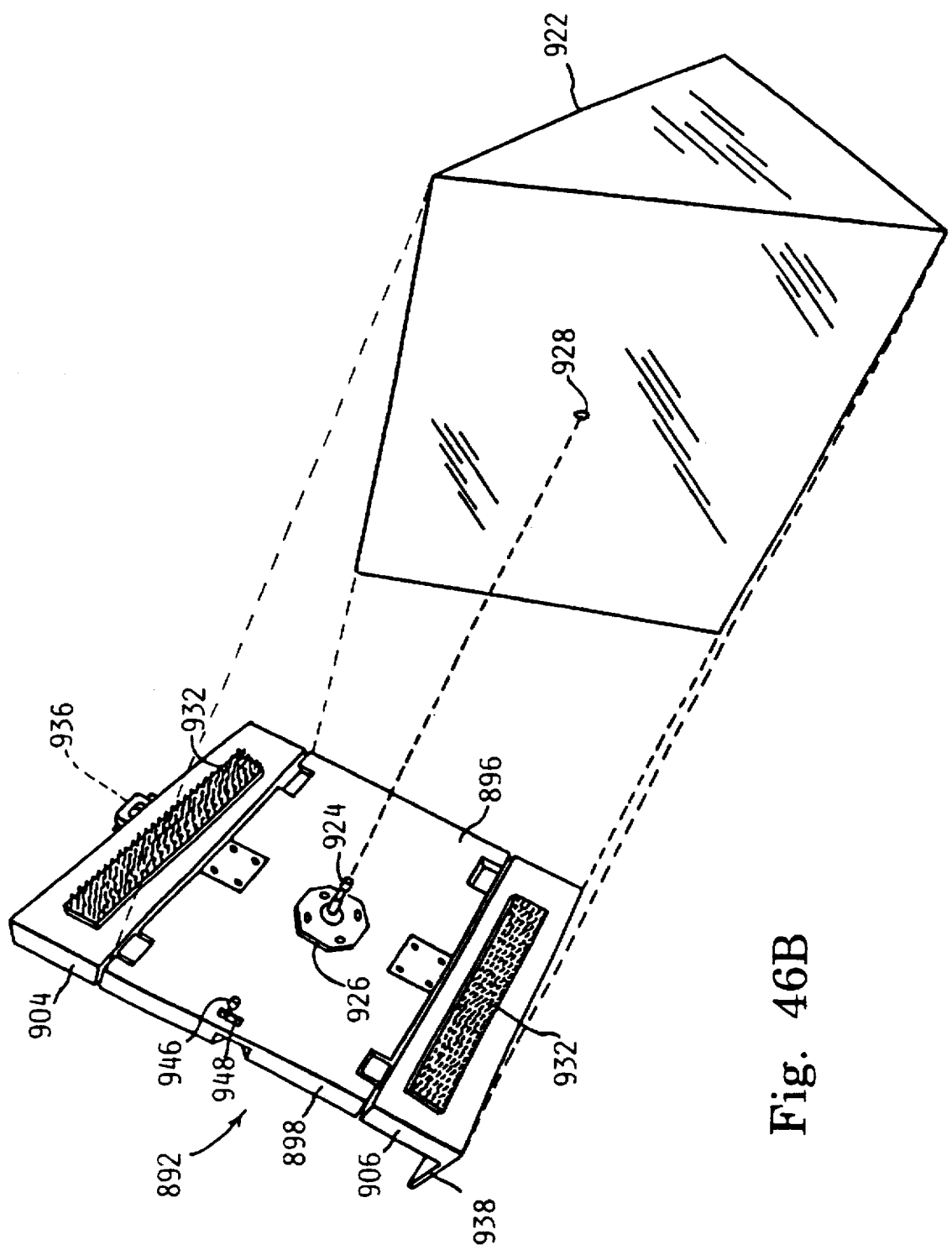
FIG. 46B is a partially exploded view, in perspective, of a document support stand formed in accordance with another form of the present invention.

839 threaded end of 819
840 circumferential retaining channel of 819
841 first engagement section of 819
842 second engagement section of 819
843 projecting keys for 841
844 projecting keys for 842
845 retaining split ring for 819
846 toothed rack on 836
847 threaded wingnut for 819
848 pinion on 819 of 802
849 modified opening of 848
850 prior art document holder
851 aperture of ear 837
852 loose-leaf binder of 850
853 pintle for 829
854 binder mechanism for 850, 869
855 shorter parallel side of 832
856 document
857 spring on 836
858 jacket of 852
859 ears on 820 of 802
860 front cover of 852
861 apertures of 859
862 back cover of 852
863 longer parallel side of 832
864 spine of 852
865 elongated rail of 850
866 narrowed portion of 865
867 widened portion 865
868 back plate of 865
869 interiorly modified document holder of FIG. 45
870 inner front side of 871
871 cover for 869
872 segmented T-rail of 869
874 inside spine of 869
876 a rail section of 872
877 a rail section of 872
878 common back plate of 872
879 rings of 869
880 Velcro fastener of 869
882 inner back side of 871
884 mating Velcro fastener
886 attachable Velcro
890 multi-purpose document support stand of FIG. 46
892 plate-like body of 890
894 front viewing side of 892
896 rear side of 892
898 main section of 892
900 first lateral side of 898
902 second lateral side of 898
904 first side section of 892
905 top rotatable side section of 956
906 second side section of 892
907 bottom rotatable side section of 956
908 pin for 904, 906, 905, 907
910 enlarged free end of 908
912 bore in lateral edge of 898
914 recessed portion rear side of 898
916 blocks for 914
918 screws for 916
920 support bracket of FIG. 46
921 document holder
922 pyramidal block of FIG. 46B
924 pinion of 926
926 flange for attachment to 896
928 bore in 922
932 hook and loop fastening strips on 890

Figure 47:
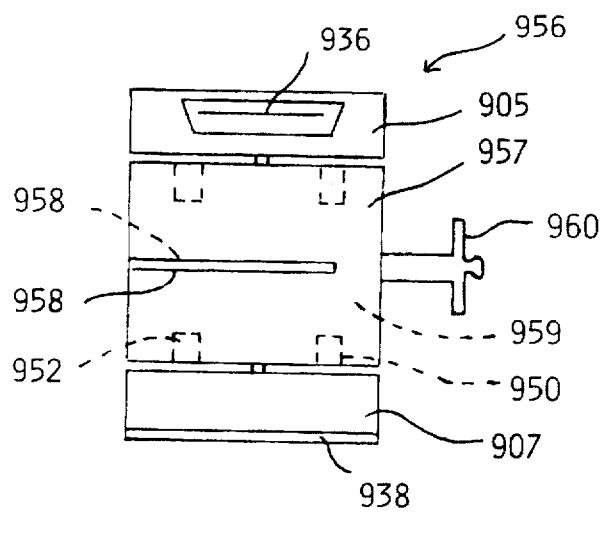
FIG. 47 is a front elevational view of a relocatable multi-purpose copyholder, constructed in accordance with an alternative form of the present invention.
Figure 47A:
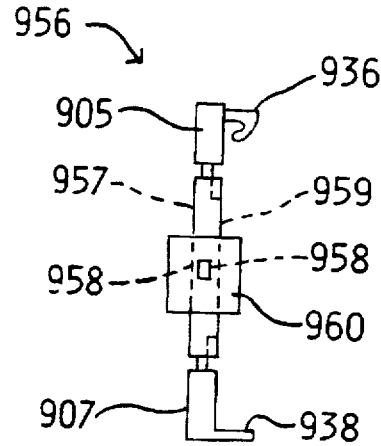
FIG. 47A is a side elevational view of the relocatable multi-purpose copyholder shown in FIG. 47.

934 mating hook and loop fasteners on 921
936 spring clip on 904
938 support ledge on 906
939 slot in 894
940 diverging sides of 939
942 channel in 898
944 elongated bar in 942
946 knob of 944
948 slotted opening in 896
950 tab of 904, 906
952 recessed portions in 896
954 hook and loop fasteners on 950, 952
956 relocatable multi-purpose copyholder of FIGS. 47 and 47A
957 first mounting side of 956
958 T-slot in 957, 959
959 second mounting side of 956
960 support flange of 956

DETAILED DESCRIPTION OF THE PREFERRED EMBODIMENTS

Initially referring to FIG. 1, it will be observed that a support stand, universal document support stand 1, is provided for the purpose of properly supporting and positioning documents for viewing at a computer workstation 24. Universal document support stand 1 may be considered to be a joined support stand which combines the positioning capabilities of two independent devices, namely: projecting, multi-positionable article support stand 2, and attachable multi-purpose and multi-positionable document holder 4. The present disclosure will present the description of universal document support stand 1 in two parts. The disclosure will begin with a description of the structure and function of projecting, multi-positionable article support stand 2 (of stand 1) followed by a description of the structure and function of its attached holder, attachable multi-purpose and multi-positionable document holder 4.

Upon viewing FIG. 2, in association with FIG. 1, it is noted that projecting, multi-positionable article support stand 2, constructed in accordance with one form of the present invention, includes three essential members. The combination of the three members provides a stand for firmly supporting an article (or workload), such as attachable document holder 4, at a variety of selectively fixed, and projected, positions in space. The members of support stand 2 include: a first essential member, main support body 6; a second essential member, relocatable and multi-positionable projecting support arm 8; and a third essential member, relocatable support bracket 10. As will be realized from the forthcoming description, both multi-positionable support arm 8 and support bracket 10 are removably mountable and relocatable to a plurality of fixedly supportive locations on main support body 6 of stand 2 of the present invention. The combination of the three members provides for the ability to fixedly position the distal end of support arm 8 at a multiplicity of secured spatial locations.

Figure 3:
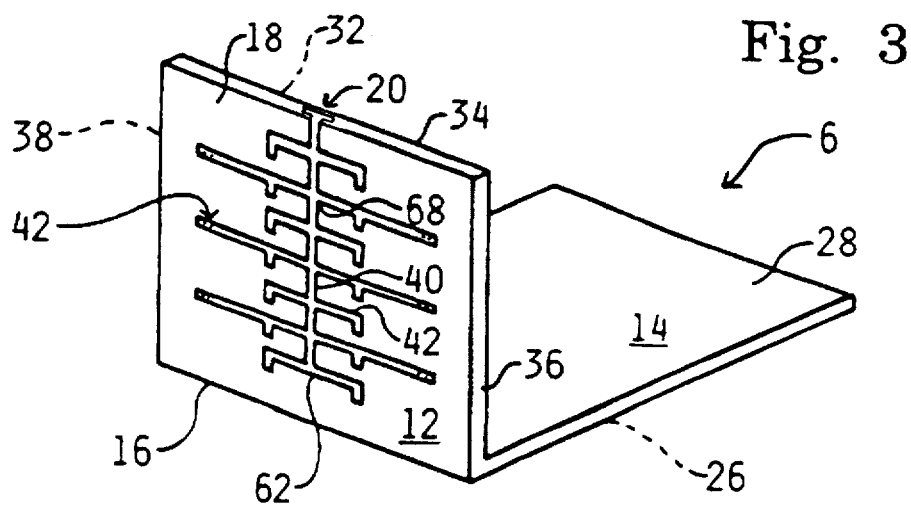
FIG. 3 is a front perspective view of the main support body of the document support stand shown in FIG. 2.

The first essential member, being a stationary support member, main support body 6, is formed from a planar, plate-like member medially bent across its width to create a right angled body having two distinct panel sections. Consequently, the main support body 6 may be described as including two attached plate-like solids, panel 12 and panel 14, with each panel formed in the shape of a rectangular right prism. Vertically disposed first rectangular panel 12 and horizontally disposed second rectangular panel 14 are integrally joined perpendicular to one another at bottom transverse edge 16. Additionally, vertical panel 12 has formed within the surface of its outer facing, or front, side, member relocating side 18. Member relocating side 18 includes a member mounting ability, T-slot 20 (to be described below), thereby completing the formation of, engagable support member, main support body 6 as seen in FIGS. 1, 2 and 3.

As is realized from FIG. 2, stand 2 of the present invention includes two primary support members, main support body 6 and relocatable support bracket 10 (the first and third essential members, respectively) which cooperate with a secondary support member, relocatable and multipositionable projecting support arm 8, in spatially positioning and fixedly supporting the distal end of arm 8. Arm 8, the second essential member of stand 2, is dependent on the first and third members for its support.

The additional features of the three essential members, which allow for their mutual cooperation, will now be described. Referring to FIG. 3, in association with FIGS. 1 and 2, it is observed that first essential support member, main support body 6, is oriented with first rectangular panel 12 vertically disposed thru the cooperation of perpendicularly attached and integrally formed second rectangular panel 14 being horizontally disposed and resting on horizontal surface 22 of workstation 24. Horizontal panel 14 has a bottom planar side 26 for resting on a flat horizontal surface 22 and a top planar side 28 the surface of which is used to support a weight bearing device such as a typewriter, television, computer or video display monitor 30. Vertical rectangular panel 12 includes a front member relocating side 18, constituting the mounting side of stand 2, and a parallelly opposite rear side 32. Vertical rectangular panel 12, of main support body 6, further includes top edge 34 opposite bottom transverse edge 16, and first vertical edge 36 opposite second vertical edge 38.

Figure 3A:
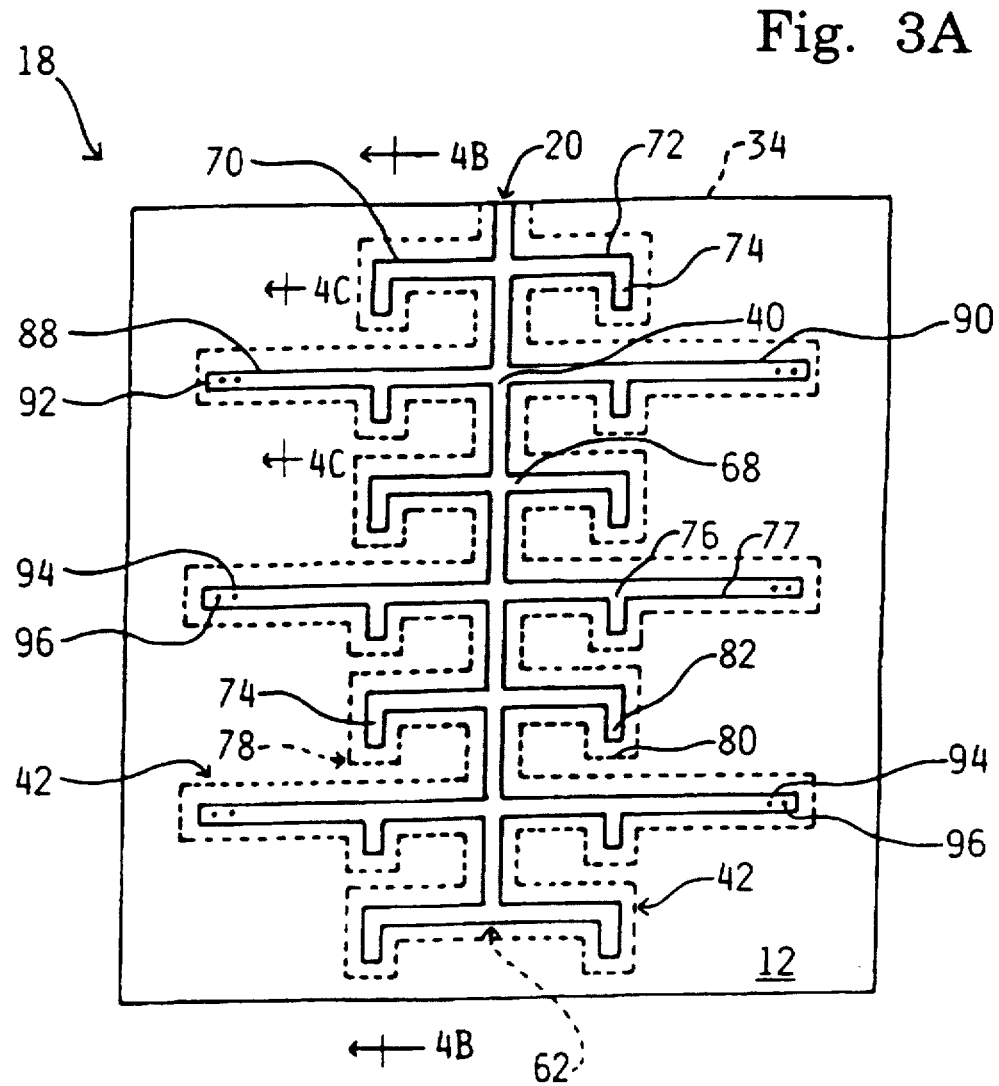
FIG. 3A is a front elevational view showing one form of a member relocating side of the main support body shown in FIG. 3.

As also shown in FIG. 3A, one form of member relocating side 18, of vertical panel 12, includes a slotted pattern, the structure and purpose for which will now be described. The member relocating side 18 is planar in nature, to provide a flat surface for mounting and relocating the engaging additional members of the stand. In the preferred form of the present invention, as shown in FIGS. 1, 2, 3 and 3A, T-slot 20 is observed traveling in a symmetrical pattern thereby forming an element of member relocating side 18 of main support body 6. T-slot 20 is provided to allow for the removable mounting of both relocatable and multi-positionable support arm 8 and relocatable support bracket 10 on member relocating side 18, of main support body 6, through the mutual cooperation of complementary engaging members.

Figure 4:
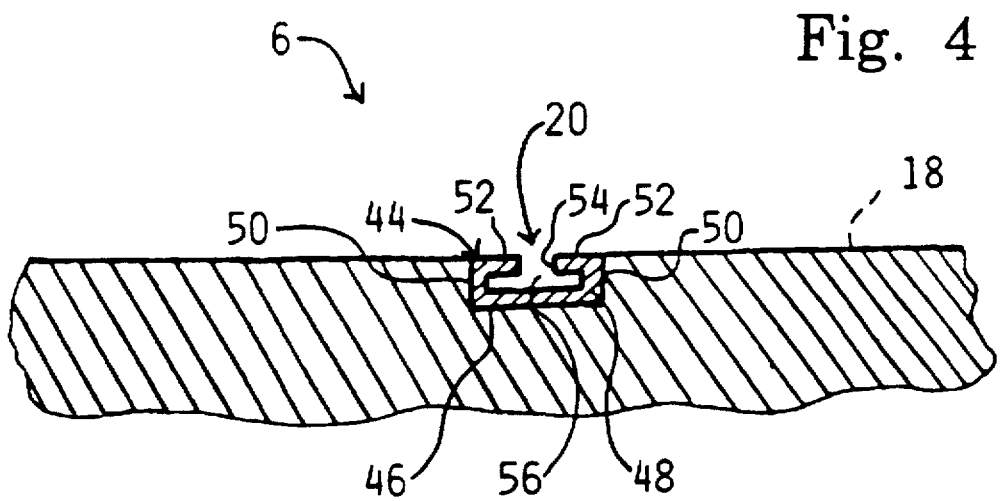
FIG. 4 is a fragmentary sectional view of the document support stand shown in FIG. 3, illustrating one form of the slot defining means in the member relocating side thereof.

As shown in FIG. 4, in one form of the present invention, a means for forming T-slot 20 includes a segmented, branched bracket 44 having a C-shape in cross section. Bracket 44 is mounted in recess 46 formed in the surface of the member relocating side 18 of main support body 6. The bracket 44 includes a back plate 48, a pair of side plates 50 joined to the back plate on the back plate's opposite transverse edges and extending perpendicularly from the back plate 48 on the same side of the back plate, and a pair of inwardly facing support arms each arm being joined to a respective side plate 50 and being spaced apart from the back plate 48. The C-bracket 44 defines a T-shaped slot 20, having narrowed and widened portions 54, 56. The narrowed portion 54 of the T-slot 20 is defined between the pair of arms 52, while the widened portion 56 of the T-slot 20 is defined between the pair of side plates 50.

Figure 4A:
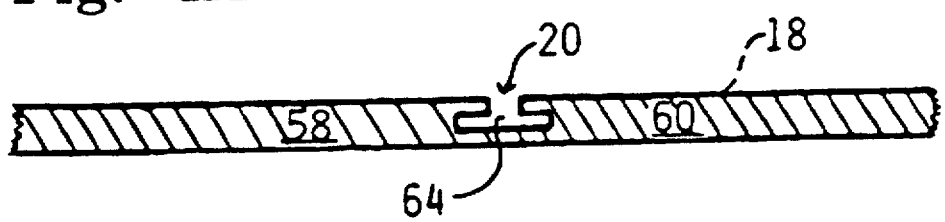
FIG. 4A is a fragmentary sectional view of the document support stand shown in FIG. 3, illustrating a second form of slot defining means in the member relocating side thereof.

As illustrated in FIG. 4A, in the preferred form of the present invention a separate C-bracket is eliminated with T-slot 20 being formed directly in member relocating side 18. Consequently, it is envisioned that the entire member relocating side 18 may be formed with an unobstructed, smooth planar surface allowing for the free placement, relocation and cooperation of members. In such a case, the narrowed and widened portions 54, 56 of the T-slot 20 are defined by first and second portions 58, 60 of the T-slot 20 of the front member relocating side 18. The first and second portions 58, 60 being L-shaped and in relative mirror image disposition, as illustrated.

As shown in FIG. 3, the T-slot 20 in front relocating side 18 extends from top edge 34 of side 18 and terminates before reaching the opposite, bottom transverse edge 16. The terminating edge 62 provides a stop, which limits the extent to which the cooperating support arm 8 and bracket 10 may be received by trunk section 40 of T-slot 20. As mentioned above, one end of the T-slot 20 extends to the top edge 34 of the member relocating side 18 of vertical panel member 12. Thus, as shown in FIG. 4A, this open end 64 is exposed, and is open to the T-slot 20 so that removably mountable and relocatable members, arm 8 and bracket 10, may be slidably received by the slot through the exposed open end 64.

Upon referring once again to FIGS. 3 and 3A, a T-slot section which is vertically disposed is observed in the middle of member relocating side 18 and identified as vertical trunk section 40. As shown in FIG. 3A, trunk section 40 has along its length a series of perpendicularly intersecting horizontal branch sections 42. Each horizontal branch section 42 intersects trunk section 40 at longitudinal side wall opening 68 and projects outwardly from trunk section 40 in mirror image forming an aligned pair of similar sections. Upon closer examination of horizontal sections 42 it is observed that two basic, but different, symmetrically aligned slot configurations are presented.

Figure 4B:
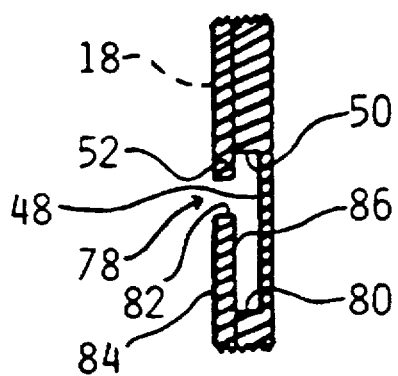
FIG. 4B is a fragmentary sectional view of the member relocating side shown in FIG. 3A, taken along line 4B—4B of FIG. 3A, illustrating a stop slot, constructed in accordance with one form of the present invention.

Initially, it is convenient to further identify horizontal branches 42 as either left branch side or right branch side. Additionally, as observed in each of the previously disclosed FIGS. 3 and 3a, each branch side has a pattern which alternates the two basic slot configurations. Upon referring to the left branch side proximate to top edge 34 of member relocating side 18 (as shown in FIG. 3A) it is observed that the uppermost slot is different in its formation from the slot directly below it. The uppermost left slot configuration is identified as left bracket support branch 70. The opposite right side is identified as right bracket support branch 72. Vertically disposed trunk section 40 is provided with a plurality of symmetrically positioned longitudinal side wall openings 68 with each opening connecting a horizontally disposed T-slotted branch section 42. Each bracket branch section 70 and 72 is provided with a vertically disposed stop slot 74. Stop slot 74 provides for a fixed supportive location for relocatable support bracket 10, the description of which will be provided below. Each stop slot 74 is created by providing a lateral side wall opening 76 in the lower wall 77 of each horizontal branch 42 with each opening leading to a vertically disposed stop slot 74. Additionally, each stop slot 74 is provided with a terminating stepped section 78. Terminating stop edge 78 includes horizontally disposed widened edge 80 and horizontally disposed narrowed edge 82 as shown in FIGS. 3A and 4B. Upon referring to the forenamed figures, in association with FIG. 4, it is observed that side plates 50 of C-bracket 44 are perpendicular to back plate 48. Additionally, as seen in FIG. 4B, the pair of inwardly facing arms 52 are oriented normally to the pair of side plates 50 and are therefore parallel to back plate 48. Consequently, edge 82 is disposed in an orientation perpendicular to back plate 48. Furthermore, each inward facing arm 52 may be considered to have a front side 84, coplanar with member relocating side 18 of main support body 6 and a back side 86, residing in face to face relationship with, and parallel to, back plate 48. The just described structure allows for the secure positioning of the relocatable bracket member of the present invention.

Figure 4C:
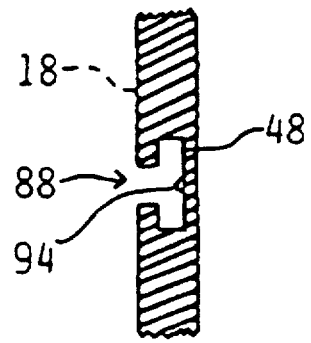
FIG. 4C is a fragmentary sectional view of the member relocating side shown in FIG. 3A, taken along line 4C—4C of FIG. 3A, illustrating the distal end of an arm/bracket branch and its protrusions.

As shown in FIG. 3A, the horizontal slot directly below left bracket support branch 70 is identified as left arm and bracket support branch 88, with the branch in mirror image being identified as right arm and bracket branch 90. Each arm and bracket branch 88, 90 adds to the structure previously described for bracket support branch sections 70 or 72. Each arm and bracket branch 88 (or 90) is additionally provided with a horizontal extension of T-slot 20 beyond lateral side wall opening 76 with each branch terminating in vertically disposed terminating edge 92. Terminating edge 92 is formed similarly to horizontally disposed terminating edge 62. However, as is shown in FIGS. 3A and 4C, the back plate 48 of each arm and bracket branch 88, and 90 is modified in the following manner. The back plate 48 of T-slot 20 (of branches 88 and 90) is provided with two separate protrusions 94, and 96 located along the longitudinal axis, near the distal end of each branch 88 and 90, in the vicinity of terminating edge 92. The first protrusion 94 is closer to trunk section 40 than the second protrusion 96 which is closer to the distal end of arm and bracket branches 88 and 90. The structural features which are present near the distal end of arm and bracket branches 88 and 90 provide for a fixed supportive location for relocatable and multi-positionable projecting arm 8, the description of which will be provided below.

The remaining branches are similarly placed in an alternating fashion having each arm and bracket branch 88, 90 positioned between a pair of bracket branches 70, 72. As suggested by the aforementioned, each branch is capable of supporting only bracket 10, or both arm 8 and bracket 10. The required structure which provides for the removable mounting of relocatable multi-positionable support arm 8 and relocatable support bracket 10 on member relocating side 18, through cooperative engagement, will be presented shortly.

At this point in the description it is observed that the main support body 6, including member relocating side 18, is symmetrically formed along its longitudinal axis. This symmetry allows for the selective positioning of vertical panel 12 to the right or left of a video display monitor 30. This ability is achieved through the cooperation of a display monitor resting on horizontal panel 14 which, in turn, is resting on a horizontal workstation surface 28, as illustrated in FIG. 1. Consequently, as will be shown below, this symmetrical feature allows stand 2, in its entirety, to be positioned and to function either to the left or the right of a video display monitor 30.

Additionally, as shown in FIG. 2A, a second form of document support stand, stand 100, could be provided. Stand 100 includes a main support body 102 having two vertically disposed rectangular panels 101 and 103, having oppositely facing member relocating sides 97 and 99 respectively, with a common connecting horizontal support panel 98. Stand 100 provides for the capability of positioning the relocatable members of the stand to each side of a video display monitor. Furthermore, as will be described further on, the exterior casing, or housing, of a computer monitor may be formed, at time of manufacture, with slotted vertical panels, to the left and to the right of the display screen thereby providing a member relocating side formed within the surface of each side of the monitor.

At this point in the description two forms of a projecting document support stand, stand 2 and stand 100, of the present invention, utilizing first essential member, main support body 6 and main support body 102 respectively, have been disclosed. The following provides a description of one form of the second essential member of the present invention, removably mountable, relocatable and multi-positionable projecting support arm 8. Upon referring to FIGS. 5, 5A and 5B, in association with FIGS. 1 and 2, relocatable and multi-positionable support arm 8 is observed. Support arm 8 includes two essential members: first member, multi-positionable base 104 and second member, pivoting elongated cylinder 106. It is observed that in one form of the first support arm member, multi-positionable base 104 includes a box-like socket housing member 108 and cooperating circular shaped T-rail member 110 mounted on socket housing 108.

Figure 5:
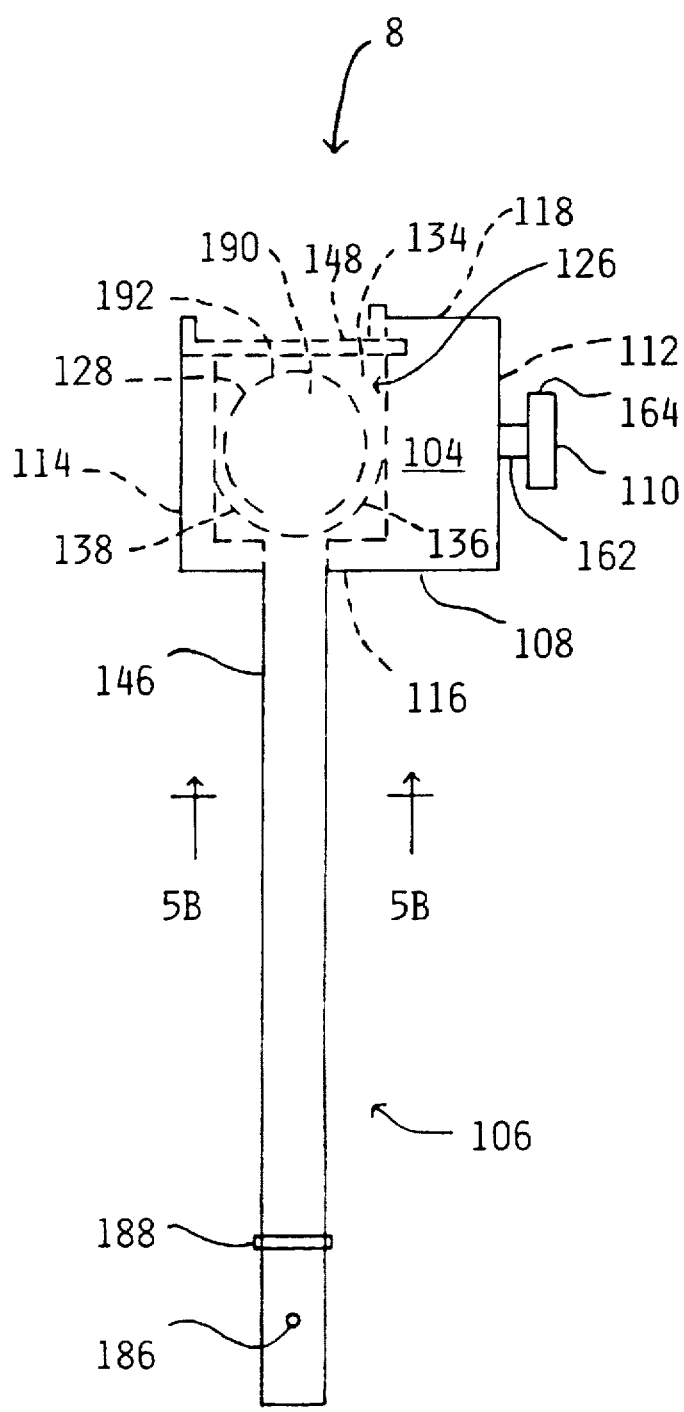
FIG. 5 is a top elevational view of the relocatable and multi-positionable support arm shown in FIG. 2, constructed in accordance with one form of the present invention.
Figure 5A:
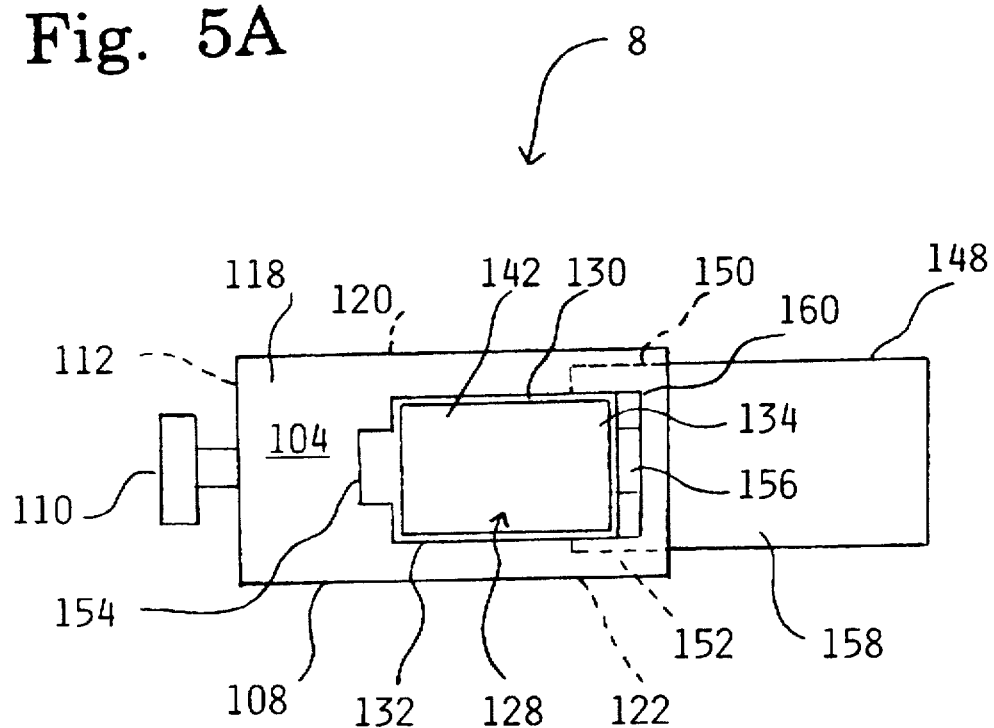
FIG. 5A is rear elevational view of the relocatable and multi-positionable support arm shown in FIG. 5.
Figure 5B:
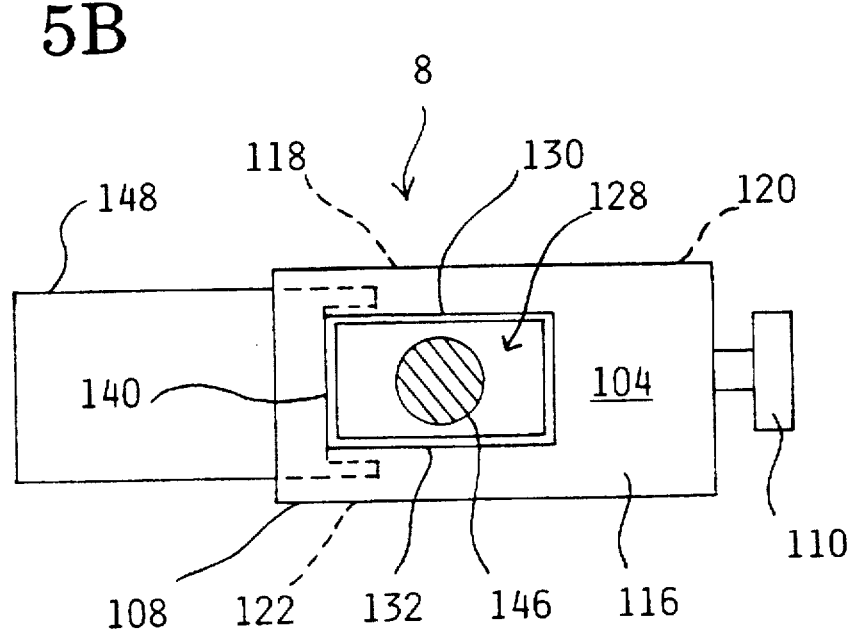
FIG. 5B is a front elevational view, partially in section, of the relocatable and multi-positionable support arm shown in FIG. 5, taken along line 5B—5B of FIG. 5.

As shown in FIGS. 5, 5A and 5B socket housing 108 is in the shape of a rectangular right prism having six planar sides: inner, proximate cooperating engagement side 112 opposite outer distal side 114; front side 116 opposite rear side 118; and top side 120 opposite bottom side 122. As shown in FIG. 5, socket housing 108 may be initially formed from a solid having a hollowed section created proximate to outer side 114. The hollowed section passes completely through housing 108 from front side 116 to rear side 118 forming an open ended disk shaped socket 126 having walls which are complementary, in part, to the shape and dimensions of disk 128. Referring once again to FIGS. 5A and 5B it is observed that socket 126 has top wall 130, in face to face relationship with bottom wall 132, with walls 130 and 132 being separated by a distance equal to the thickness or width of cylindrical surface 134 of disk 128. Additionally, socket 126 has contoured proximate side wall 136 opposite contoured distal side wall 138, with the amount of separation and curvature of the walls being determined by, and complementary to, the diameter of disk 128, to be discussed below. It should be noted that contoured walls 136 and 138, when viewed from the rear, are initially straight and are contoured to form a semicircle near the front of housing 108 so as to allow for the insertion and seating of disk 128 in housing 108.

When viewed from the top, as shown in FIGS. 5 and 5B, walls 136 and 138 create an abbreviated U-shaped form. The front side 116, of housing 108, is modified to include a window opening 140. Housing 108 is so fitted in order to provide for the removable insertion, or mounting, of pivoting elongated cylinder 106. As will be described in more detail below, and as shown in FIG. 5, pivoting elongated cylinder 106 is created through the combining of disk 128 and elongated cylinder 146 into one integrated member. Window opening 140 is sized to not only retain disk 128 within housing 108 but to also allow for the exposure of a portion of cylindrical surface 134 of disk 128 in order to permit pivoting elongated cylinder 106 to project and to transcribe an arc when disk 128 is pivoted about a y-axis of rotation. Thus, socket 126 has front window opening 140 opposite rear opening 142, with the size of front window opening 140 being less than the thickness, or width, of the cylindrical surface 134 of disk 128 but greater than the diameter of elongated cylinder 146.

As shown in FIG. 5A, socket housing 108 is also fitted with a sliding door 148 near rear side 118 which is provided to close rear opening 142. Sliding door 148, being captured by upper and lower U-shaped tracks 150 and 152, (formed in top and bottom wall sections 130 and 132 respectively) is slidably moved in a direction perpendicular to, and towards, or away from, inner proximate side 112 of housing 108. Door 148 may be frictionally fitted in tracks 150, 152 or provided with a protrusion/detent retaining fitting 154 to ensure its closure. Door 148 has a height, and a width, greater than the respective thickness, and diameter, of disk 128. Sliding door 148 is provided with a projecting handle stop member 156 on outer surface 158 in order to cooperate with keeper means, distal corner 160, of rear door opening 142, to prevent the accidental removal of door 148 from housing 108.

As shown in FIG. 5, base 104 is further modified to include a T-rail 110 mounted on inner proximate cooperating engagement side 112 of housing 108. T-rail 110 has a narrowed portion 162 joined to a widened portion 164, but the widened portion 164 of the T-rail 110 has a width and length which are substantially equal to each other and which are equal to, or slightly smaller than, the widened portion 56 of the T-slot 20 formed in the main support body 6, realized in association with FIG. 4. Similarly, the narrowed portion 162 of the T-rail has a width and length which are substantially equal to each other and which are equal to or slightly smaller than narrowed portion 54 of the T-slot 20. The T-rail 110, may include a back plate (not shown) mounted on the narrowed portion 162 and spaced from its widened portion 164 for mounting the rail on the proximate cooperating engagement side 112, such as by gluing, fasteners or other means. Or preferably, as shown in FIG. 5, the T-rail 110 may be integrally formed with housing 108 when the member is made. Consequently, the T-rail 110 is formed with circular shaped widened and narrowed portions 164 and 162 respectively, as shown in FIGS. 5 and 6.

Figure 6:
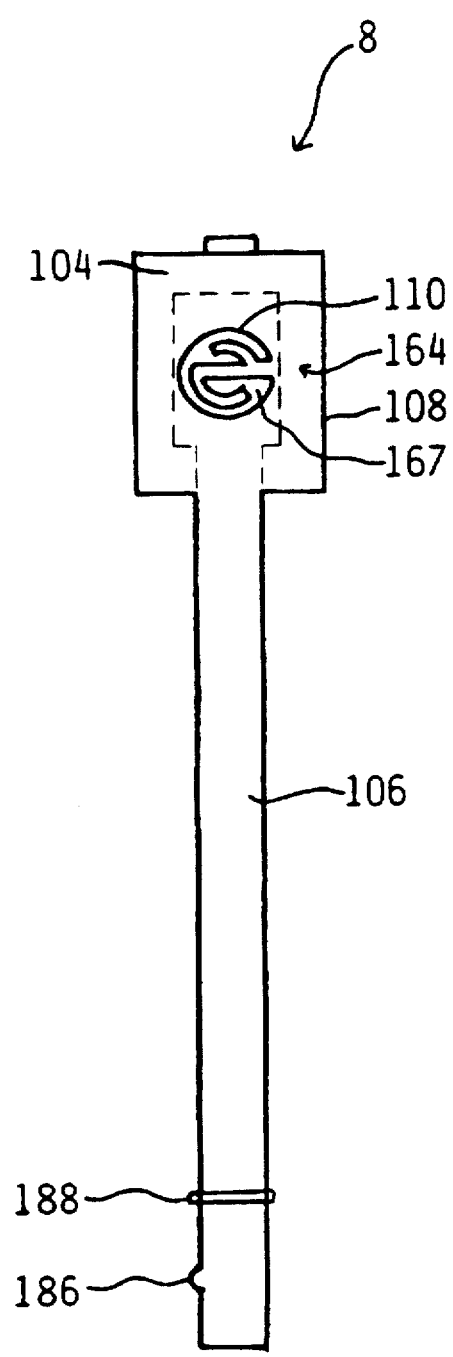
FIG. 6 is a side elevational view of the relocatable and multi-positionable support arm shown in FIG. 5.
Figure 6A:
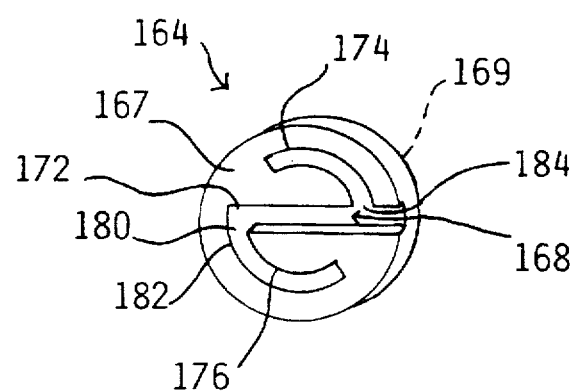
FIG. 6A is a perspective view of one form of a widened T-rail engagement portion formed with the base member of the relocatable and multi-positionable support arm shown in FIG. 6.

Additionally, as shown in FIGS. 6 and 6A, in one form of a widened T-rail engagement member of the present invention, circular widened portion 164 of T-rail 110 is formed with a grooved engagement pattern 168. Grooved engagement pattern 168 is provided to cooperatingly engage protrusions 94 and 96, as seen in FIG. 3A, of main body 6, formed in back plate 48, near the distal end of each arm and bracket branch 88 and 90.

Grooved engagement pattern 168 is created by forming a groove in the top surface 167, opposite bottom surface 169, of circular widened portion 164 of T-rail 110. The depth of the groove is less than the thickness of widened portion 164 of circular T-rail 110. The groove is concave in shape and has a depth and width which mates with, and is complementary to, the height and width of protrusions 94 and 96 formed in back plate 48 of T-slot 20, As shown in FIG. 6A, grooved engagement pattern 168 may be identified as having three sections: grooved diameter section 172, grooved far engagement arc section 174 and grooved near engagement arc section 176. Access to grooved engagement pattern 168 is provided by open diametrical end 178 formed in the top surface 167 of circular widened portion 164. The grooved pattern travels along the diameter section 172 of portion 164. Grooved diameter section 172 terminates at near engagement point 180 which is located proximate to, but set back from, closed diametrical end 182. At the location, along grooved diameter section 172, designated as near engagement point 180, near engagement arc section 176 branches out from the diameter section 172 and travels in a counterclockwise direction following an arc concentric with the center of circular widened portion 164 of T-rail 110. The diameter of the concentric arc being approximately equal to the distance between protrusions 94 and 96 formed in back plate 48 of T-slot 20 as illustrated in FIGS. 3A and 4C. Near engagement arc section 176 terminates before intersecting grooved diameter section 172.

Figure 6B:
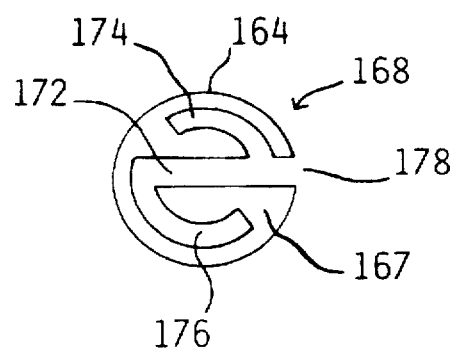
FIG. 6B is a plan view of the recessed engagement pattern of the widened T-rail engagement portion shown in FIG. 6A.

As seen in FIGS. 6A and 6B, grooved engagement pattern 168 also includes a grooved far engagement arc section 174. Grooved far engagement arc section 174 also branches out from grooved diameter section 172 in a manner similar to near engagement arc section 176. As illustrated, grooved far engagement arc section 174 branches out from diameter section 172 at a location along the grooved diameter section proximate to, but set back from, open diametrical end 178 and designated as far engagement point 184. Far engagement arc section 174, being similar to near engagement arc section 176 also follows a concentric arc, traveling in a counterclockwise direction and terminates before intersecting grooved diameter section 172.

Consequently, as is realized from FIG. 5, in association with FIGS. 2 and 6A, circular T-rail 110 now being provided with grooved engagement pattern 168 allows multi-positioning base 104, and therefore relocatable and multi-positionable support arm 8, to be rotatably mounted at a fixed supportive location on member relocating side 18 of main support body 6 (or main support body 102). The mounting of multi-positionable support arm 8 and its unique positioning capabilities will be discussed shortly.

Figure 7:
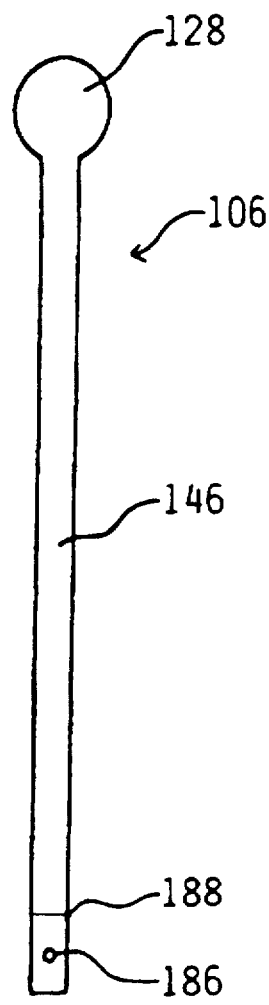
FIG. 7 is a top elevational view of a pivoting elongated cylinder constructed in accordance with one form of pivoting cylinder of the relocatable and multi-positionable support arm shown in FIG. 5.

Upon referring to FIG. 7, one form of the the second essential member of relocatable and multi-positionable support arm 8, pivoting elongated cylinder 106, is illustrated. Pivoting elongated cylinder 106 consists of elongated cylinder 146, with disk 128 integrally formed at its proximate end and a connecting fitting, such as protruding snap fastener 186, provided at its distal end. Additionally, as is illustrated, the distal end of elongated cylinder 146 has, ahead of snap fastener 186, a circumferential ridge 188 which is provided to assist snap fastener 186 in the releasable attachment of additional cooperating members. Disk 128 is observed, as shown in association with FIGS. 5, 5A and 5B, to be formed from a cylindrical solid having an upper closed circular region 190 separated from a lower closed circular region 192 by cylindrical surface 134. Disk 128 is modified to include elongated cylinder 146 integrally formed and projecting from cylindrical surface 134 of disk 128. Cylinder 146 has a diameter which may be equal to or less than the width of cylindrical surface 134 of disk 128. Furthermore, it should be noted that elongated cylinder 146 may be of varied length depending how it is modified to comply with different embodiments of the present invention. Elongated cylinder 146, being circular in shape when viewed from its distal end (as shown in FIG. 5B), is integrally formed with disk 128, thereby allowing both members to be formed as one unit and being identified as pivoting elongated member 106 as shown in FIG. 7.

Figure 8:
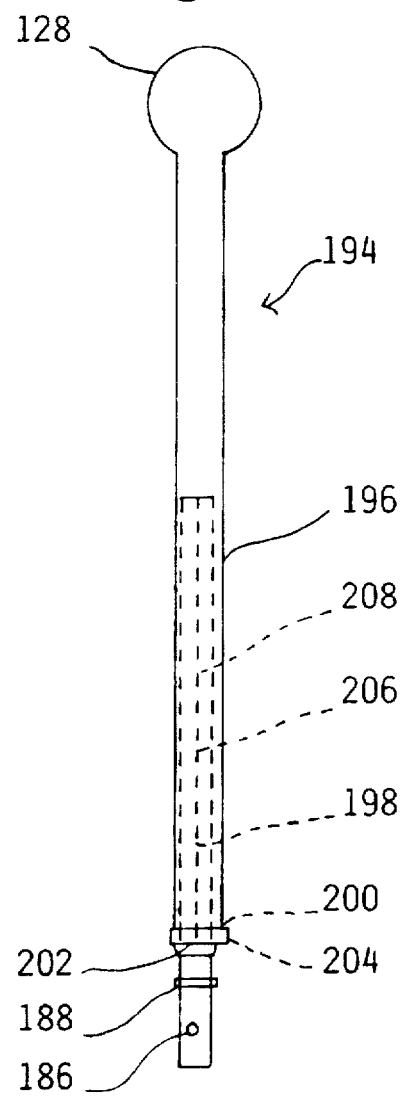
FIG. 8 is a top elevational view of a telescopic pivoting cylinder constructed in accordance with a second form of pivoting member of the relocatable and multi-positionable support arm of FIG. 5.
Figure 8A:
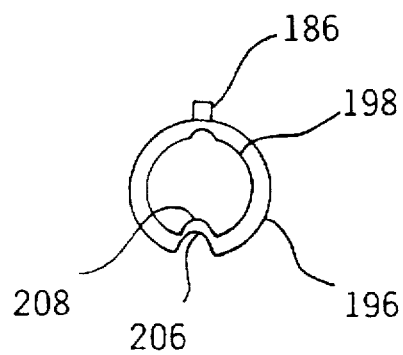
FIG. 8A is a front elevational view of the distal end of the telescopic pivoting cylinder shown in FIG. 8.

In the preferred second form of pivoting elongated cylinder of the present invention, however, as shown in FIGS. 1, 2, and 8, pivoting elongated cylinder 106 is further modified to provide an important additional ability. Telescopic pivoting cylinder 194 allows for the extension of the distal end of multi-positionable support arm 8 through the cooperation of modified elongated cylinder 196 and modified extension tube 198. The combination created by the structure previously described for pivoting elongated cylinder 106 and the additional structure provided by the mutual engagement of modified cooperating elongated cylinder 196 with modified extension tube 198 is referred to as telescopic pivoting cylinder 194. As illustrated by FIGS. 1, 2, 8 and 8A, modified extension tube 198 is sized and fitted to be housed within modified elongated cylinder 196 and to have limited retraction and extension through the additional cooperation of members known in the art. Modified elongated cylinder 196 is provided with an external thread 200 at its distal end to cooperate with mutually engaging, internally threaded, adjusting collar 202 slidably housed on modified extension tube 198. Adjusting collar 202, cooperates with a split compression washer 204 which slides on the exterior of modified extension tube 198 to engage the distal end and inner surface of modified elongated cylinder 196 in order to selectively restrict the longitudinal retraction and extension of modified extension tube 198 relative to modified cooperating elongated cylinder 196. The above telescoping features are known in the art and are used in such applications as microphone stands and camera tripod legs. An example of such an application is used in a tripod stand manufactured by Uniphot Incorporated, 61-10 34th Ave., Woodside, N.Y. 11377, USA and identifiable as the Star D-16 "Falcon" Tripod. Since the above telescoping features permit the rotation of modified extension tube 198 relative to modified elongated cylinder 196, and since such rotation is not desirable in the present invention, the members are modified in the following manner. As illustrated in FIGS. 8 and 8A, modified elongated cylinder 196 is hollow and fitted with an internally directed elongated convex protrusion 206 formed along the length of its inside surface. Convex protrusion 206, formed in cylinder 196, is provided to cooperate with a mutually engaging elongated concave depression 208 formed along the length of the exterior surface of extension tube 198. Thus it is realized that through the mutual cooperation of elongated protrusion 206 and elongated depression 208 the rotation of modified extension tube 198 relative to modified cooperating elongated cylinder 196 is prevented, the new combination being referred to as telescopic pivoting cylinder 194. The aforementioned completes the description of the basic structure of the members which may be utilized in forming relocatable and multi-positionable support arm 8.

The following, with the consideration of FIGS. 5, 5A and 5B, will demonstrate how either pivoting cylinder 106 or 194 is easily inserted or removed from housing 108 of base 104. Upon slidably opening door 148, pivoting elongated cylinder 106, or 194, is inserted through the rear opening 142, with elongated cylinder 146 passing through front window opening 140. Contoured walls 136, 138, in cooperation with top and bottom walls 130 and 132 respectively, allow disk 128 to seat in socket 126 with pivoting elongated cylinder 106 or 194 projecting from housing 108. The width of front window opening 140 is of sufficient size to retain disk 128 in housing 108 in order to allow pivoting elongated cylinder 106 (or cylinder 194) to pivot about a vertical y-axis. Upon referring to FIG. 5 it is observed that sliding door 148 is positioned, when closed, juxtaposed to the cylindrical surface 134 of disk 128. This closeness in proximity to disk 128 allows door 148 to maintain disk 128 within its partially formed complementary socket 126 and permits disk 128 to pivot about a y-axis of rotation. Additionally, as is understood from the above description, sliding door 148 provides for the removable mounting of pivoting elongated member 106 (or 194) in housing 108 by entering and exiting door 148.

The previous description, in association with FIGS. 1, 2, 2A, 9 and 9A, allows for the mounting of relocatable and multi-positionable support arm 8 on member relocating side 18 of main support body 6 of stand 2 (or on main support body 102 of stand 100). In order to mount multi-positionable support arm 8 on member relocating side 18 of main support body 6 (or on either member relocating side 97 or 99 of main support body 102) the operator may choose to mount either the complete arm assembly 8, or, initially, just base 104.

Figure 9:
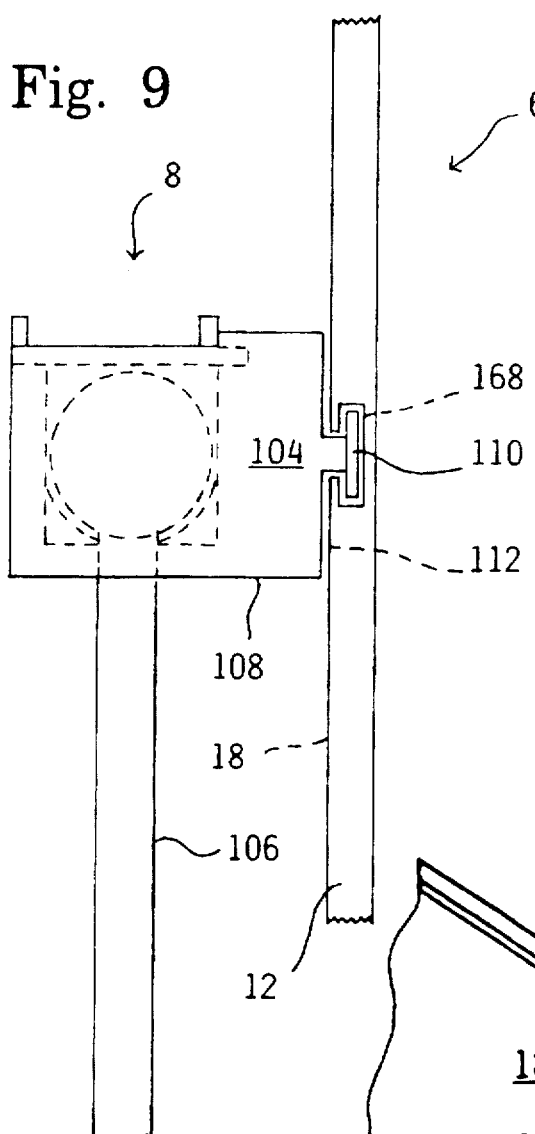
FIG. 9 is a fragmentary top view of the document support stand shown in FIG. 2, illustrating the relocatable and multi-positionable support arm in its initial mounted position.
Figure 9A:
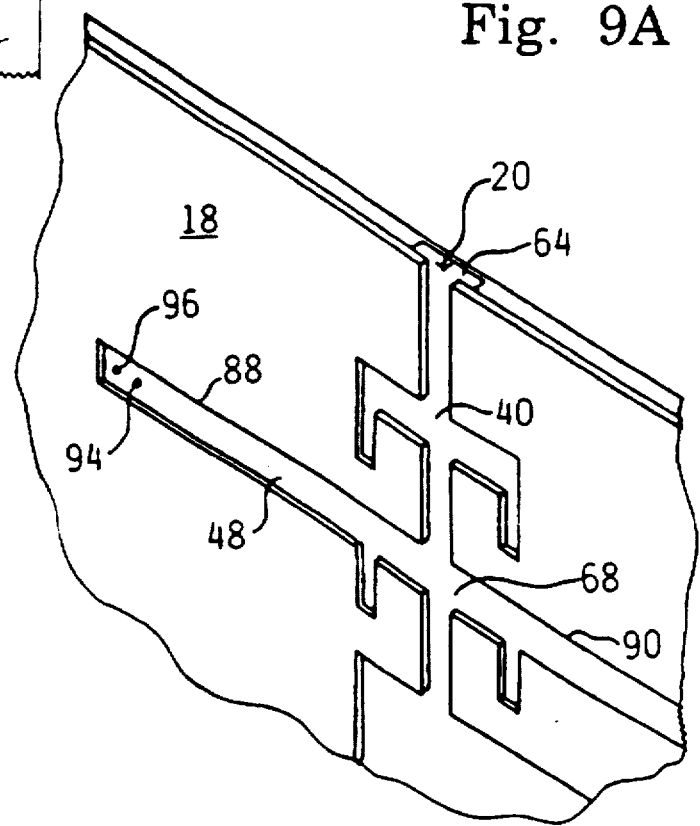
FIG. 9A is a fragmentary front view of the main support body of the document support stand shown in FIG. 3, illustrating one form of the branch members, constructed in accordance with the present invention.

As shown in FIGS. 9 and 9A, multi-positionable support arm 8 is removably mounted on relocating side 18 of vertical plate-like member, panel 12, of main support body 6 by the operator holding the base 104 with its inner proximate cooperating engagement side 112 in a vertical disposition, and sliding the base's circular shaped T-rail 110 through the exposed end 64 of T-slot 20 and moving base 104, and therefore support arm 8, along trunk section 40 until housing 108 of base 104 is positioned with its circular shaped T-rail 110 adjacent to side wall opening 68 of a selected arm and bracket branch 88 (or 90). In one form of the present invention, as shown in FIG. 9A, each arm and bracket branch 88 and 90 includes a similarly dimensioned T-slot which is generally referred to as T-slot 20. The branch selected by the operator will determine the secured vertical height of the proximate end of support arm 8 above the workstation surface 22. Since both the member relocating side 18 of main support body 6 and T-slot 20 are symmetrically formed (in order to allow, as described previously, for the positioning of the vertical panel 12 of main support body 6 of stand 2 to either side of a video display monitor 30) the operator has a choice at the site of a selected longitudinal side wall opening 68 whether to move the support arm 8 to the left or to the right of trunk section 40. The desired direction is that which is furthest away from the operator, in this instance arm and bracket branch 88.

Figure 9B:
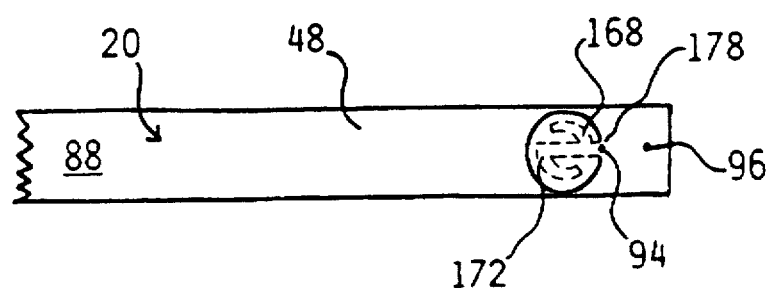
FIG. 9B is a fragmentary rear elevational view of the arm/bracket branch shown in FIG. 9A, illustrating the pre-engagement position of the recessed engagement pattern of the multi-positionable support arm in relation to the protrusions of the main support body of the present invention.
Figure 9C:
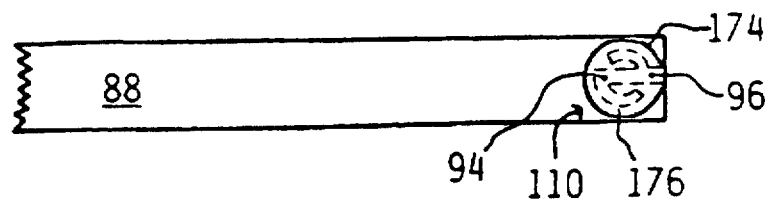
FIG. 9C is a view, like that of FIG. 9B, illustrating the initial engagement position of the recessed engagement pattern in relation to the protrusions of the main support body of the present invention.
Figure 9D:
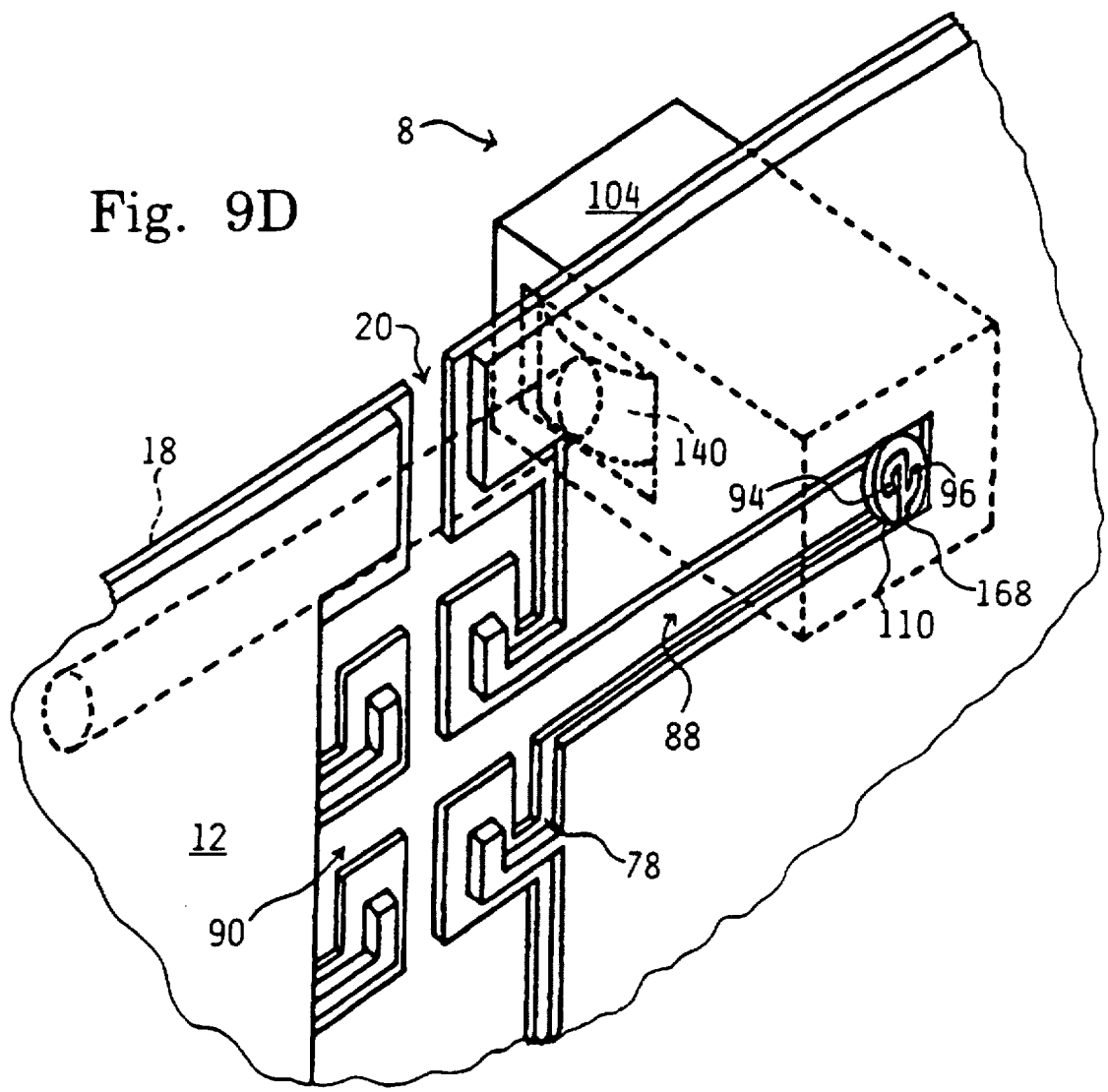
FIG. 9D is a fragmentary sectional view of the document support stand of the present invention shown in FIG. 2, taken on line 9D—9D of FIG. 2, illustrating the final engagement position of the recessed engagement pattern in relation to the protrusions of the main support body of the present invention.

Once relocatable and multi-positionable support arm 8 is committed to the chosen arm and bracket branch 88 the operator simply has to move base 104 of support arm 8 towards the furthest point along the branch. However, it is necessary when relocating support arm 8 to a fixed supportive location to engage grooved engagement pattern 168 of circular T-rail 110, of base 104, with protrusions 94 and 96 provided in back plate 48 of T-slot 20. In order to do so, as realized from FIGS. 9B, 9C and 9D, the operator when engaging branch 88, simply positions base 104 with its front window 140 facing downward and slides the member towards the furthest point along arm and bracket branch 88. The aforementioned description positions grooved engagement pattern 168 of T-rail 110 for engaging protrusions 94 and 96 residing on the back plate 48 of T-slot 20. As observed in FIG. 9D, the initial engagement being allowed by open diametrical end 178, as illustrated in FIG. 9B, allows the protrusions to be juxtaposed with grooved diameter section 172 and permits protrusion 94 and 96 to engage both near and far engagement arc sections 176 and 174, respectively of T-rail 110 simply by rotating base 104 in a counterclockwise direction as illustrated in FIG. 9D. Furthermore, as is also realized from FIG. 9D, in association with FIG. 9C, when front opening 140 of base 104 is positioned in a forward facing mounted disposition protrusions 94 and 96 are positioned in the approximate middle of both near engagement arc section 176 and far engagement arc section 174 respectively. The just mentioned thereby allowing for multi-positionable support arm 8 to be both securely supported and capable of being rotated about an x-axis of rotation through the range required by the present invention. The x-axis is defined to project normally from the member relocating side 18 of main support body 6 which is defined to reside in the y-z coordinate plane. Once base 104 is securely supported, and rotatably engaged at the desired location, its mounting is completed and allows the distal end of the second essential member, relocatable and multi-positionable support arm 8 to rotate about both an x and a y axis of rotation thereby cooperating in the support and selective spatial positioning of an article, such as attachable multi-purpose and multi-positionable document holder 4, mounted at the distal end of projecting support arm 8, as illustrated in FIG. 1.

Thus, as is realized from the aforementioned, through the engagement of additional engaging members (grooved engagement pattern 168 of T-rail 110 and protrusions 94 and 96 of T-slot 20) the mounting requirements of relocatable and multi-positionable support arm 8 are completed, thereby, allowing for its locatably fixed, supportive, and rotational positioning on member relocating side 18 of main support body 6. Consequently, it is observed that the proximate end of relocatable and *multi-positionable support arm 8 is provided with a base fitting 104 which provides not only for the removable mounting and relocation of multi-positionable support arm 8 at numerous secured supportive locations on member relocating side 18, of main support body 6 (or 102) but through the cooperation of pivoting elongated cylinder 106, or telescopic pivoting cylinder 194, allows the distal end of relocatable and multi-positionable support arm 8 to rotate about both the x and y axes and to be positionable through the wide range of locations envisioned in the present invention. It should be noted, as will be discussed further on, that multi-positionable support arm 8 is equipped with a protruding snap fastener 186, and circumferential ridge 188, at its distal end for the attachment of additional members.

The aforementioned description allows the distal end of relocatable and multi-positionable support arm 8 to be positionable through a wide range of horizontal and vertical positions. However, as is evidenced from the previous description, the distal end of support arm 8 is not capable, at this point, of projectively supporting an object in one or more elevated positions due to the lack of any cooperating fittings, joints, springs or other similar members known in the art for maintaining a support arm in a number of selectively fixed projected positions in space.

As shown in FIGS. 1, 2 and 2A, the ability to support a workload article, such as an attachable multi-purpose and multi-positionable document holder 4, at the distal end of support arm 8 is provided through the assistance of the third essential member of stand 2 (or stand 100) of the present invention. In one form of the present invention, a cooperating essential member, relocatable support bracket 10 is removably mountable and relocatable to numerous fixedly supportive locations on main support body 6 (or main support body 102) and cooperates with body 6, and arm 8, to provide for the support of the distal end of arm 8 through a plurality of selectively fixed positions in space.

Initially, upon referring to FIGS. 10 and 10A, it is observed that the third essential member, relocatable support bracket 10, is initially formed from a solid, having a body 210 in the shape of a corbel type bracket with six sides: a vertical cooperating engagement side 212 (defined by the height of the bracket construction), an upper horizontal support side 214 (defined by the depth of the bracket construction), a lower sloping support side 216 (defined by the curved contour of the corbel bracket construction), a front side 218 and a rear side 220 opposite the front side (each side 218 and 220 being defined by the planar surface area bounded by sides 212, 214 and 216). Front side 218 and rear side 220 are separated by the thickness of the solid construction. The thickness of the solid defines the width of the aforementioned sides, namely, cooperating engagement side 212, horizontal support side 214, and sloping support side 216.

Referring once again to FIG. 10, it is observed that relocatable support bracket 10 has an internal window-like cutout 222. Cutout 222 is essentially a rectangularly shaped opening and passes completely through the thickness of body 210. Cutout 222 creates bounded proximate side 224 opposite bounded distal side 226 of support bracket 10 with each side 224 and 226 parallel to cooperating engagement side 212. Additionally, cutout 222 also creates bounded upper horizontal side 228 and bounded lower horizontal support surface 230 parallel to upper horizontal support side 214 of relocatable support bracket 10.

Cutout 222 allows for the creation of cradle support section 232. Cradle support section 232 is shaped and contoured at the site of bounded lower horizontal support surface 230 in the following manner. Support surface 230 has for its surface a series of wave-like contours 234. Each contour 234 is somewhat like the shape commonly used for grasping an automobile steering wheel having a rounded bottom depression 236.

Additionally, as shown in FIG. 10B, each contour has a left, arm oriented, side 238 and, a similarly angled, right, arm oriented, side 240. The sides of each wave-like depression are angled in order to be parallel with the position of a section of pivoting elongated cylinder 106 (or 194) when the pivoting cylinder is placed in a selected contour 234. It should be noted that the angularity of each pair of side walls is different because of the change in the angle of pivoting elongated cylinder 106 (or 194) when it is selectively placed along the horizontal in relation to its fixed pivoting location on either main support body 6 or 102. The bottom depression 236 and sides 238, 240 of each wave are shaped, or contoured, to cooperate with the curvature and angularity requirements needed to allow relocatable and multi-positionable support arm 8 to be adequately seated in each contour thereby providing for the selective positioning and firm support of the distal end of mounted support arm 8.

As illustrated in FIG. 10A, relocatable support bracket 10 is modified to further include a T-rail 242 mounted on cooperating engagement side 212. Alternatively, as shown in FIG. 10B, in accordance with a second form of relocatable support bracket of the present invention, a bracket 244 may have a pair of similarly formed T-rails 242. The T-rail 242 of relocatable support bracket 10 differs, however, in construction from circular T-rail 110 described previously and incorporated in multi-positionable base 104 for mounting relocatable support arm 8 on member relocating side 18. As shown in FIGS. 10, 10A, 10B, and 10E T-rail 242 has a narrowed portion 243 joined to a widened portion 245, but the widened portion 245 of the T-rail 242 has a width and length which are substantially equal to each other and which are equal to or slightly smaller than the widened portion 56 of the T-slot 20 formed in the member relocating side 18 of main support body 6, as illustrated in FIG. 4. Similarly, the narrowed portion 243 of the T-rail 242 has a width and length which are substantially equal to each other and which are equal to or slightly smaller than narrowed portion 54 of the T-slot 20. Consequently, the T-rail 242 is formed with square shaped widened and narrowed portions 245 and 243 respectively. As shown in FIG. 10A, the widened portion 245 has a top surface 246 opposite a bottom surface 248.

Additionally, the joining of narrowed portion 243 to widened portion 245 may be described as being "stepped" having the horizontally disposed edges of narrowed portion 243 setback from the similarly disposed edges of widened portion 245 when viewed from the side, as shown in FIGS. 10, 10A, 10B and 10D. This "stepped" feature, emphasizing lower stepped engagement support section 250, will be utilized below in illustrating, as shown in FIG. 10D, and describing the secure positioning of relocatable support bracket 10 in stop slot 74 which is formed in the member relocating side 18 of main support body 6 (or 102). The T-rail 242 may include a back plate (not shown) mounted on the narrowed portion 243 and spaced from its widened portion 245 for mounting the rail on the body 210, such as by gluing, fasteners or other means. Or preferably, the T-rail 242 may be integrally formed with the body 210 when the relocatable support bracket 10 is made.

Alternatively, in accordance with a third form of relocatable support bracket of the present invention, and as shown in FIG. 10E, the support bracket 255 may be provided without an internal cutout 222 having cradle support section 232 with an exposed support surface 256 and a curved distal end 258 to encourage the maintenance of a distal section of relocatable and multi-positionable support arm 8 when being supported by the relocatable support bracket 255.

Unlike relocatable and multi-positionable support arm 8, in this embodiment, relocatable bracket 10 may be positioned in any horizontal branch 42 since all branches are provided with a means for supporting bracket 10, namely, stop slot 74. It should be noted, however, that member relocating side 18 could be formed with each and every branch 42 formed similarly to arm and bracket branch 88 and 90 previously described. As illustrated in FIG. 3A, each branch 42 includes a similarly dimensioned T-slot which may also be referred to as T-slot 20. The branch 42 selected by the operator will determine the secured vertical height of relocatable support bracket 10 above the workstation surface 22. Since both relocating side 18 of main support body 6 and T-rail 242 are symmetrically formed (in order to allow, as described previously, for the positioning of main support body 6 of stand 2, or body 102 of stand 100, to either side of a video display monitor 30) the operator has a choice at the site of a selected open end 64 whether to move the bracket to the left or to the right of trunk section 40. The most appropriate direction is that which is furthest away from the mounted, proximate end, of multi-positionable support arm 8. In other words, if support arm 8 is mounted to the left of trunk section 40 (as when the vertical panel 12, of main support body 6, is positioned to the left when the operator is facing a video display monitor 30), support bracket 10 should be mounted to the right of trunk section 40 in order to provide for the maximum support of multi-positionable support arm 8 along its elongated member 146.

As shown in FIGS. 10C and 10D, in association with FIGS. 1, 2, and 10A, the support bracket 10, having one T-rail 242, is removably mounted on main support body 6 in the following sequence: the operator holds bracket 10 with its cooperating engagement side 212 in a vertical disposition, passes the distal end of mounted support arm 8 through cutout 222, and slides the bracket's square shaped T-rail 242 through the exposed end 64 of the C-bracket's T-slot 20. The operator continues to move relocatable support bracket 10 along trunk section 40 until the bracket 10 is positioned with its square shaped T-rail 242 adjacent to side wall opening 68 of a selected branch 42. Once support bracket 10 is committed to a particular branch 42 the operator simply has to move the bracket until the lower engagement support section 250 of T-rail 242 is in alignment with lateral side wall opening 76 of vertical stop slot 74. Once in alignment, the support bracket 10 will drop into stop slot 74 thereby completing its mounting, as shown in FIG. 10D, and allowing for its secured and supportive positioning on member relocating side 18 of main support body 6 through the cooperation of stepped lower engagement support section 250, of T-rail 242, with both terminating widened edge 80 and terminating narrowed edge 82 of stepped stop section 78 of stop slot Additionally, as illustrated in FIG. 10D the top surface 246 and the bottom surface 248 of the widened portion 245 of T-rail 242 provides support for maintaining relocatable bracket 10 in stop slot 74 through its face to face position with the back plate 48 and the back side 86 of inward facing arms 52 respectively. Once in stop slot 74, relocatable support bracket 10 is considered to be in a fixed, or secured, supportive location for contributing to the support of a workload at the distal end of support arm 8.

Thus, it is observed from the above that cooperative member, relocatable support bracket 10 not only provides stand 2 (or stand 100) with a surface for balancing the downward vertical forces of relocatable and multi-positionable support arm 8 and a workload at its distal end but also cooperates with support arm 8 for positioning and supporting the workload in a multiplicity of horizontal, vertical and adjustably projecting spatial locations.

In order to achieve the unique spatial positioning capabilities of the present invention the following is to be considered in association with FIG. 1. The vertical plate-like member, panel 12, of main support body 6 (or main support body 102) is considered to be a solid having a member relocating side 18 residing in the y-z coordinate plane and having the x-axis projecting normally from its member relocating side 18. The relocatable and multi-positionable support arm 8 is removably mountable on the member relocating side 18 through the agency of an engaging means which has structure that cooperates both perpendicularly and parallelly to the y-z coordinate plane. The mounted positioning ability of the engagement means, allows the base 104 of the support arm 8 to project normally from the plane and to rotate about the x-axis while being relocatable at a plurality of fixed support locations in the y-z coordinate plane. The normally projecting base 104 of the support arm 8 additionally supports one end of elongated member 106 and allows for its pivotal movement about a y-axis of rotation. Consequently, the above combination allows the distal end of relocatable and multi-positionable support arm 8 to be selectively positionable about a plurality of axes of rotation. Additionally, through the cooperation of telescoping pivoting cylinder 194, the distal end of the support arm 8 is extendible along a directionly positionable z-axis thus providing for a multiplicity of adjustable spatially projecting positions.

As understood from FIG. 10D, in association with FIGS. 10, 10B and 10E, the relocatable support brackets 10, 244 and 255 are also removably mountable on the member relocating side 18 of main support body 6 (or body 102) through the agency of an engaging means which has structure that cooperates both perpendicularly and parallelly to the y-z coordinate plane. The engagement means allows each bracket 10, 244 and 255 to project its horizontal support surface 230, or 256, normally from the y-z plane and to be relocatably mountable at a plurality of fixedly supportive locations in the y-z coordinate plane thereby allowing for a change in its horizontal and vertical support positions. The normally projecting support side 230, or 256, allows a distal section of the multi-positionable arm 8 to be selectively positioned and supported along a plurality of locations along an x-axis.

In summarizing the present invention at this point in the disclosure, it is realized that the positioning and support capabilities of relocatable support bracket 10 in combination with the positioning and supportive capabilities of the relocatable and multi-positionable support arm 8 allows the the distal end of arm 8 to positionably support workloads of varying weight at a multiplicity of selectable locations in space. It is of primary importance to note that the present stand embodiment, as well as those to follow, provide for supporting the distal end of a projecting arm member in the absence of any tensioning control device for balancing the spatial position of the apparatus such as tensioning springs (coil, hydraulic, pneumatic) or adjusting knobs.

As shown in FIG. 11, in a second form of the front member relocating side, of a main support body 259, of the present invention, member relocating side 260 is formed to include four symmetrically positioned, vertically disposed, parallel T-slots 21. Each T-slot 21 is similar in construction to the T-slot 20 used in trunk section 40 of the first embodiment, shown in FIGS. 3, 3A, and 4A except for the absence of longitudinal side wall openings 68. Referring to FIG. 11 each T-slot 21 is identified as: distal arm T-slot 261, distal bracket T-slot 262, proximate bracket T-slot 264, proximate arm T-slot 266. Alternatively, the member relocating side 260 could be provided with just two parallel slots identified as distal arm and bracket T-slot 268 and proximate arm and bracket T-slot 270. Each of the following members of T-slot 21 are similarly formed to the first embodiment, T-slot 20, and thus one is identified by the same numerals: back plate 48, a pair of side plates 50, a pair of inwardly facing arms 52, narrowed portion 54 and widened portion 56. Additionally, like the previously described first embodiment, the symmetrical embodiment shown in FIG. 11 also allows for the placement of a vertical member, panel 263, of main support body 259 to either side of a video display monitor 30.

Upon referring to FIG. 11, once again, it is observed that in addition to the above structure T-slots 261, 262, 264 and 266 (or 268 and 270) each have a series of openings 272. Openings 272 are equally spaced along the length of back plate 48 of each T-slot with the center of openings 272 being in direct alignment with the center of narrowed portion 54 of each T-slot 261, 262, 264 and 266 (or 268 and 270). The depth of openings 272 may pass through the thickness of back plate 48. Additionally, the openings 272 may pass partially or completely through the thickness of vertical solid member, panel 263.

The previously described second form of the member relocating side, side 260, also provides for the mounting of relocatable and multi-positionable support arm and bracket members thereby creating stand 265. Upon referring to FIGS. 12, 12A and 12B, a second form of support arm, removably mountable, relocatable, retractable, and multi-positionable support arm 274 is observed. Support arm 274 of the second form provides for the same axes of rotation capabilities as support arm 8 of the first embodiment, namely, rotation about both the x and y axes. Relocatable, retractable, and multi-positionable support arm 274 consists of two essential members: base 276 and attached pivoting elongated cylinder 278. The first essential member, base 276, being the second base form of the present invention, may be considered to be initially formed through the joining of two rectangular solids: elongated rectangular solid 280, and shortened stepped rectangular solid 282. As shown in FIGS. 12A and 12B, the solids 280 and 282 are joined perpendicularly at one end of each solid thereby forming an L-shaped solid 284, of base 176, when viewed from the top. L-shaped solid 284 includes 8 sides: a top side 286, opposite bottom side 288, a front side 290 opposite back side 292, a proximate cooperating engagement side 294 which provides the first rotation end of the arm base member 276, opposite outer stepped distal side 296, a shortened inner stepped distal side 298 which is opposite and parallel to outer stepped distal side 296, with both parallelly opposite sides 298 and 296 perpendicularly intersecting stepped pivot side 300 at the distal end of L-shaped solid 284. Stepped pivot side 300 provides the second rotation end of base 276.

L-shaped solid 284, of base 276, is fitted with circular flange 302 mounted or formed around the edge perimeter adjacent to its proximate cooperating engagement side 294. Being somewhat similar to base 104 of the first embodiment, base 276 is also provided with a T-rail 304 on its engagement side 294 for mounting retractable and multi-positionable support arm 274 on the member relocating side 260 of main support body 259. T-rail 304 of the present embodiment is similar, in part, to T-rail 110 of the first embodiment. T-rail 304 has a narrowed portion 162 joined to a widened portion 164, with both portions being circular in shape and being equal to or slightly smaller than the narrowed and widened portions 54 and 56 respectively of each T-slot 21 formed in the member relocating side 260, of main support body 259. T-rail 304 is mounted, or formed, at the center of proximate engagement side 294. The center of engagement side 294 is a point on the central axis of elongated rectangular solid 280. Although T-rail 304 is circular, like the first embodiment, it is modified to include aperture 306 which passes completely through the center of both its narrowed portion 162 and its widened portion 164. It should be noticed, also, that because of the present modifications the recessed engagement pattern 168 of the previous embodiment is not required. Base 276 is further modified by providing a cylindrically shaped bore 308 along the central axis of its elongated rectangular solid 280. Bore 308 travels completely through solid 280 from proximate engagement side 294 emerging at opening 310 near outer distal side 296. The diameter of opening 310 is smaller than the diameter of bore 308. Consequently, bore 308 is in alignment with aperture 306 provided in T-rail 304 thereby allowing for the insertion of retractable control rod 312 in aperture 306 located at the proximate engagement side 294. Control rod 312 is cylindrical in shape and has a diameter smaller than circular narrowed portion 162 of T-rail 304. Additionally, the diameter of control rod 312 is reduced near its distal end in order to create a stop section 314 which cooperates with smaller opening 310 and recessed wall 316 to prevent the withdrawal of rod 312 from solid 280. The distal end of rod 312 is provided with knob 318 to allow the operator to control its projection and retraction. Furthermore, as illustrated in FIG. 12C, knob 318 is fitted with a pair of protrusions 320 which cooperate with a pair of captivating niches 322, formed in recess 323 of base 276, to secure the projection of control rod 312.

As stated previously, and as observed upon referring to FIG. 12, relocatable, retractable, and multi-positionable support arm 274 consists of two essential members: first essential member, base 276, described above, and second essential member, attached pivoting elongated cylinder 278. Pivoting elongated cylinder 278 is herein presented as a second form of pivoting elongated cylinder of the present invention. As shown in FIG. 12C, stepped section 324 is provided at the distal end of base 276 to allow for the lapping and pivotal engagement of elongated cylinder 278 with base 276. Elongated cylinder 278 is essentially cylindrically shaped, having a body like that of the previously discussed elongated cylinder 146 of FIG. 7, except for a planar shaped stepped section 326 near its proximate end. The distal end of elongated cylinder 278 may be provided with fittings, such as those previously described in association with cylinder 146, protruding snap fastener 186 and circumferential ridge 188, for the attachment of additional members. Stepped section 326 is provided to allow the proximate end of pivoting elongated cylinder 278 to pivotally cooperate with the similarly shaped distal end of base 276.

FIGS. 12B and 12C illustrate the cooperative engagement of the second forms of the base and pivoting elongated cylinder of the present invention. Upon referring to the illustrations it is observed that each end, the distal end of base 276, and the proximate end of pivoting elongated cylinder 278, is provided with cooperating stepped sections 324 and 326, respectively, in order to allow for the lapping of members. Each stepped section 324 and 326 includes a hole 328, positioned on, and perpendicular to, the longitudinal axis of each member, having a recessed shoulder 330 formed just below the surface of one side. As shown in FIG. 12C, in order to attach members 278 and 276, the top side 332 of section 326 and the bottom side 334 of section 324 are each provided with a recessed shoulder 330 to allow mutually shouldered members, a screw 336 and a receivable coupling sleeve 338, to attach, but not bind, elongated cylinder 278 to base 276. Consequently, elongated cylinder 278 is allowed to pivot freely, about the distal end of base 274. Thus, as is understood from the previous description, relocatable, retractable, and multi-positionable support arm 274 is created. It should be noted, that the pivoting of elongated cylinder 278 is initially only about a y-axis of rotation through the position and contribution of screw 336 and coupling sleeve 338. However, an additional axis of rotation, namely the x-axis of rotation, is provided to elongated cylinder 278, through the cooperation of circular T-rail 304 and projecting control rod 312. This mutual cooperation is provided through the mounting of retractable and multi-positionable support arm 274 on the member relocating side 260 of main support body 259 (or on a pair of similarly formed member relocating sides of a main support body like that previously discussed and illustrated in FIG. 2A) which will now be described.

As shown in FIG. 12, in association with FIG. 11, in order to mount relocatable, retractable, and multi-positionable support arm 274, on the member relocating side 260, of main support body 259, the operator would choose distal T-slot 261, which is furthest away from the operator, in order to provide for the optimum arm support position on relocating side 260. As shown in FIG. 12, support arm 274 is removably mounted on the member relocating side 260 of vertical solid, panel 263, by the operator holding the base 276 with its inner proximate engagement side in a vertical disposition, with control rod 312 in a retracted position, and sliding the base's circular shaped T-rail 304 through the exposed end 64 of T-slot 21 and moving the base member 276, and therefore relocatable, retractable and multi-positionable support arm 274, along distal T-slot 261 until the support arm 274 is positioned at the location desired by the operator. Once the location is chosen, as observed in FIG. 12A, the operator simply pushes knob 318 inward, towards relocating side 260, thereby extending and engaging control rod 312 in any one of a plurality of selectable openings 272. Control rod 312 is secured further by turning knob 318 clockwise, one quarter of a turn, in order to allow for the cooperative engagement of protrusions 320 and retaining niches 322 as illustrated in FIG. 12C.

Thus, being somewhat similar to the description of the first embodiment of the present invention, the combination of the aforementioned second form of relocating side, side 260, and support arm, arm 274, allows for the relocatable mounting of multi-positionable support arm 274 at any one of a plurality of selectably fixed locations on the vertical solid, panel 263 of main support body 259. Similarly, the distal end of support arm 274 is also rotationally positionable about the x and y axes of rotation. Additionally, however, like the first form of arm member of the present invention, relocatable, retractable and multi-positionable support arm 274 requires additional support in order to be capable of positioning and supporting an object through a wide range of selectively fixed locations in space.

Being similar, in part, to the first form of multi-positionable arm member, arm 8, the additional support required for the present second form of arm member, arm 274, is provided by relocatable and retractable support bracket 340 illustrated in FIG. 13. Retractable support bracket 340, being a fourth form of bracket member of the present invention, is a modified version of the first three forms illustrated in FIGS. 10, 10B and 10E. Basically, retractable support bracket 340 of the present embodiment differs from support brackets 10, 244 and 255 in two ways. Firstly, retractable bracket 340 utilizes an elongated T-rail 342 rather than the square shaped T-rail 242 of the previous embodiments. Secondly, retractable bracket 340 utilizes a retractable control rod 344, having knob 341, to secure its vertical positioning with the cooperation of openings 272 in member relocating side 260, of main support body 259, rather than the square T-rail 242 and stop slot 74 combination previously described. The elongated T-rail 342 is formed and mounted on the proximate engagement side of retractable support bracket 340 in a manner similar to that described in the previous embodiments. As shown in FIG. 13, control rod 344 is housed in a bore 346 formed in the bracket's body 339 along a line that is parallel to the lower horizontal support surface 230 formed in its body. The additional features related to control rod 344 are similar to those previously described for control rod 312 of relocatable, retractable, and multi-positionable support arm 274.

Thus, having described the features of relocatable and retractable support bracket 340, it is realized that relocatable and retractable support bracket 340 is mountable on main support body 259 in a manner similar, in part, to that described previously for relocatable support brackets 10, 244 and 255. Since the same T-slot form is used in all the T-slots of the present embodiment of FIG. 11, the operator has a choice of any one of the remaining three slots 262, 264 or 266. Obviously, T-slot 266, being the furthest from the slot used for mounting support arm 274 would provide the maximum amount of support. The operator, however, may chose an alternative slot depending on the specific needs and angularity requirements of the task at hand. The bracket 340 is mounted in a selected T-slot with a section of pivoting elongated cylinder 278 passing through bracket opening 222. After the bracket is slidably mounted in a T-slot, the operator merely engages control rod 344 of the retractable bracket 340 with a selected opening 272 of backplate 48 in the same manner previously described for control rod 312 of retractable multi-positionable support arm 274. Once an opening is engaged, bracket 340 is fixedly located at a position, on member relocating side 260, thereby allowing for the firm support of a section of cylinder 278 through its cooperation with bracket support surface 230. Consequently, it is realized that the present embodiment provides for the firm support of the distal end of relocatable, retractable and multi-positionable support arm 274 through a wide range of selectively fixed spatial positions.

Figure 14:
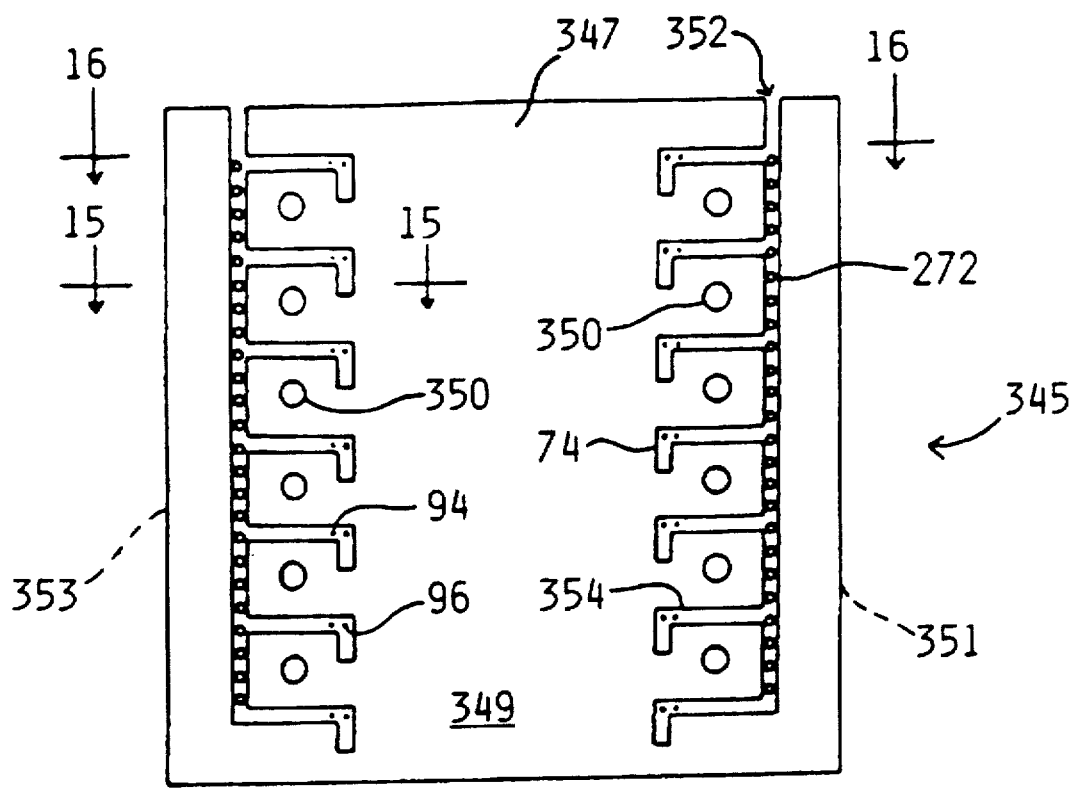
FIG. 14 is a view, like that of FIG. 3A, illustrating a third form of member relocating side of the present invention.

FIGS. 14 illustrates a third form of the member relocating side of the present invention. The third form, relocating side 347, of a main support body 345, provides for the mounting of the proximate end of locatably fixed multi-positionable support arm 348 at a fixed location on the member relocating side 347 of the vertical solid member, panel 349, of main support body 345. Upon observing FIG. 14 arm mounting means, bores 350, are seen placed along a line parallel to and set back from second vertical edge 353 of vertical panel 349.

Additionally, another set of bores 350 may be similarly placed in relation to first vertical edge 351 of vertical panel 349 as well. FIG. 14 also shows bracket mounting means, T-slot 352, having openings 272, for mounting previously described retractable support bracket 340 which cooperates with locatably fixed multi-positionable support arm 348 in positioning and supporting the distal end of arm 348. Additionally, FIG. 14 also illustrates other support means, branched T-slot 354 having stop slots 74 for mounting previously described support brackets 10, 244 or 255 illustrated in FIGS. 10, 10B and 10E respectively.

FIG. 15 illustrates stand 343, utilizing a third form of multi-positionable arm member of the present invention, locatably fixed, multi-positionable support arm 348. Locatably fixed, multi-positionable support arm 348, consists of a third form of base member, base 356 and pivoting elongated cylinder 278. Base 356 includes an L-shaped solid 358 having a long leg 360 and a shorter leg 362. Base 356 is formed, in part, similar to base 276 of the second embodiment. However, because it provides part of its support from a fixed location, previously described T-rail 304 and control rod 312 are not required. Instead, L-shaped solid 358 is equipped with a support fitting 364 near its proximate end. Support fitting 364 includes a circular plate-like flange 366 having a rigidly affixed threaded stud 368 projecting from the center of its inner facing side 370 and a smooth shaft 374 projecting from the center of its outer facing side 372. Smooth shaft 374 is fitted with a circumferential groove 376 near its distal end. Shaft 374 cooperates with through aperture 378 formed in L-shaped solid 358 to allow the rotation of the solid relative to the fixed shaft. Aperture 378 is formed along the entire length of the longitudinal axis of the longer leg 360 of solid 358. Consequently, shaft 374 is insertable at the proximate end of solid 358 and projects slightly from the outer side 372 of the solid to cooperate with reinforced e-ring 382 thereby allowing for both the securing and rotation of L-shaped solid 358 relative to shaft 374. Upon referring to FIG. 15, once again, it is observed that base 356 includes the L-shaped solid 358, and is also capable of pivotally attaching an elongated member 278 at its distal end in a manner similar to that of the second form previously described. Thus, it is realized that the locatably fixed multi-positionable support arm 348 of the present form allows for rotation about the same axes, namely, the distal end of support arm 348 is rotatable about both the x and y axes of rotation. Additionally, the distal end may be provided with a projecting ability via a telescoping means like that previously described to allow for its selective positioning in space. It is understood from the aforementioned that locatably fixed, multi-positionable support arm 348 may be supported at its distal by any of the support brackets previously described in the foregoing forms of the present invention.

In a fourth form of multi-positionable arm member of the present invention, as shown by stand 355 of FIG. 16, an additional ability is added to those presented in the third form just described. The present embodiment provides for the creation of a fourth form of arm base member which results in the formation of a fourth form of multi-positionable support arm. The third form, locatably fixed, multi-positionable support arm 348 is limited in its ability to be easily moved, or relocated, on member relocating side 347 of main support body 345. The present embodiment, relocatable, semi-fixed, multi-positionable support arm 384, maintains most of the structure of the third form except for the structure fitted to the inner facing side 370 of flange 366, shown in FIG. 16, which provides for the relocatable, semi-fixed, multi-positionable support arm 384 to be relocated on member relocating side 347. Instead of having a projecting threaded stud 368, inner facing side 370 of the present embodiment is provided with circular T-rail 110, previously described for removably mounting support arm 104 of the first embodiment. T-rail 110 is fitted with recessed pattern 168 which cooperates with protrusions 94 and 96 of the main support body in the same manner previously described for the first form and illustrated in FIG. 16. Consequently, it can be observed from the aforementioned that relocatable, semi-fixed, multi-positionable support arm 384 is provided with a relocating means that works in cooperation with any of the previously described relocatable support brackets of the present invention.

In appreciating the positioning capabilities presented in the foregoing embodiments a new combination of elements will now be presented which not only enhances those capabilities but provides additional improvements as well. The present embodiment, an example of which is illustrated in FIG. 19C, creates a new stand, in the form of stand 386, which includes only two essential members in the form of: a main support body 389, and a joined multi-positionable support arm 388. Joined multi-positionable support arm 388, to be discussed below, is a new first form of joined arm member which provides for the mounting of both the proximate end of a projecting arm and a support bracket on the same relocatable, joining base member. Joined multi-positionable support arm 388 combines, and modifies, the previously discussed third essential member, support bracket 255 of FIG. 10E, as an integral member of the second essential member of the present embodiment. The present stand concept allows for the mounting, relocating, and secure positioning of a joined multi-positionable support arm on a support body.

Figure 18:
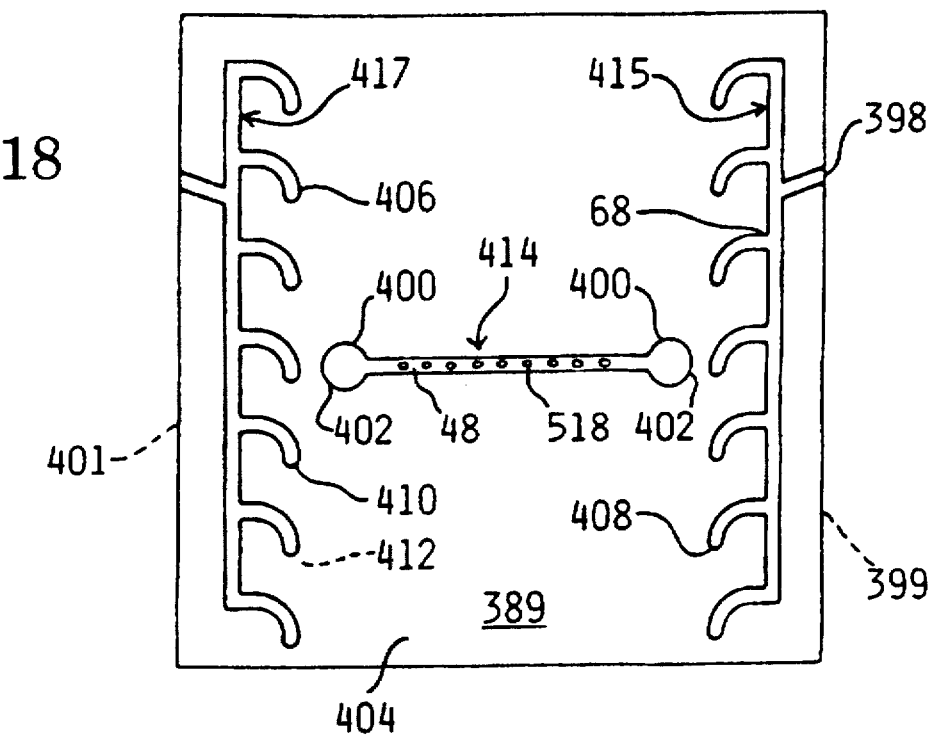
FIG. 18 is a view, like that of FIG. 17, illustrating a member relocating side, constructed in accordance with a fifth form of the present invention.

Upon referring To FIG. 19C it is observed that main support body 389 is provided with a member relocating side 404. It is of importance to note that the slotted pattern which is formed in the member relocating side of the present embodiment can take a variety of forms depending on the applications envisioned for the stand at time of manufacture. For example, FIG. 17 illustrates main support body 387, having a member relocating side, side 390, which is a modified form of the previously discussed member relocating sides. FIG. 17 illustrates a basic, fourth form of member relocating side, side 390, with FIGS. 18 and 19C illustrating an improved, and preferred, fifth form of member relocating side, side 404.

As shown in FIG. 17, the first essential member of the newly formed stand concept may include a symmetrically formed main support body 387, in part, like that of FIG. 3, and slotted member relocating side 390 which has the ability to be positioned to either side of a video display monitor. The ability to be positioned to either side of a monitor allows for the mounting and secure positioning of the symmetrically formed, second essential member of the present stand concept, joined multi-positionable support arm 388 shown in FIG. 19. As illustrated in FIG. 17, the present main support body 387 is identifiable as a new entity when compared to the previously disclosed main support bodies of the present disclosure. The newly created combination provides for a member relocating side which supports a joined arm and bracket member. Additionally, it is understood that the present main support body 387 may also be further modified to include a basic U-shape form, having oppositely facing member relocating sides, like that of main support body 102 of stand 100 previously described and illustrated in FIG. 2A.

The member relocating side 390 of FIG. 17 provides a T-slot 385 formed in at least two differently orientated sections which allows for the mounting and relocating of, the second and final essential member of the new stand concept, joined multi-positionable support arm member 388. As shown in FIG. 17, the member relocating side 390, includes: at least one centrally located and horizontally oriented T-slot section, horizontal-first T-slot section 392, and at least one vertically oriented T-slot section, 1st vertical-second T-slot section 394. T-slot sections 392 and 394 share a T-slot form identified as T-slot 385 which is similar to T-slot 20 previously illustrated in FIGS. 3, 3A, 4A and 14 in association with the first and third forms of the member relocating side of the present invention. First vertical-second T-slot section 394 includes a series of longitudinal inner side wall openings 68 formed along its inwardly disposed side. Side wall openings 68 interconnect inverted L-shaped lower stop slots 74 which consist of horizontal leg 73 and vertical leg 75. Vertical leg 75 includes stepped stop section 78 which is the same in construction as that described previously and illustrated in FIG. 4B. As described previously, each stop slot 74 provides for a fixedly supportive location of a mounted member on the member relocating side of the present embodiment. Additionally, member relocating side 390, of main support body 387, may also be provided with at least one upper stop slot 396, formed in mirror image to its oppositely directed lower stop slot 74.

The member relocating side 390 may be provided with one or two vertical-second T-slot sections. In its most basic form only one elongated 1st vertical-second T-slot section 394 may be provided, running parallel to, and slightly set back from, first vertical edge 391. Alternatively, if another elongated 2nd vertical-second T-slot section 395 is desired it could be formed in mirror image to the 1st vertical-second T-slot section 394, running parallel to, and slightly set back from second vertical edge 393. Additionally, each vertical-second T-slot section 394, 395 is provided with a longitudinal outer side wall channel opening 398, which emerges at edges 391, 393 respectively to allow for the mounting of a joining base member fitted with a cooperating T-rail 110 engagement member. Alternatively, or in combination, an enlarged opening 400 may be formed in the surface of the member relocating side 390. Enlarged opening 400 has a length and width which is at least equal to the width of back plate 48 of T-slot sections 392, 394 and 395.

Upon referring to FIG. 17, once again, it is observed that member relocating side 390 is provided with at least one horizontal-first T-slot section 392. Horizontal-first T-slot section 392 is provided with a pair of enlarged openings 400. Horizontal-first T-slot section 392 may be formed as a continuation of the T-slot formed in a vertical-second T-slot section 394 (or 395). Consequently, opening 398 or 400 would provide access to both horizontal-first T-rail section 392 and vertical-second T-rail sections 394 and 395. Alternatively, as illustrated in FIG. 18, the horizontal-first T-slot section 392 may be formed as a separate T-slot section having terminated ends 402 and a pair of enlarged openings 400. It should be noted that if a non-symmetrical member relocating side is desired only one vertical-second T-slot section 394 would be required as well as only one opening 398, or 400. Additionally, if the just mentioned non-symmetrical side is provided with a separate horizontal-first T-slot section 392 only one enlarged opening 400 is necessary.

Figure 18A:
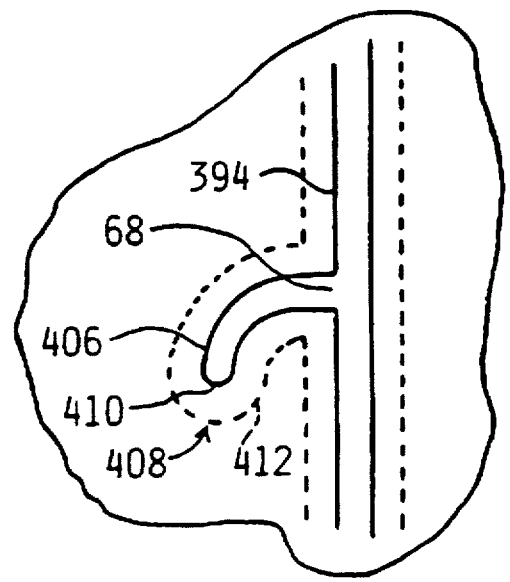
FIG. 18A is a fragmented front elevational view of the member relocating side shown in FIG. 18, illustrating a stop slot, constructed in accordance with a second form of the present invention.

Upon referring to FIG. 18, it is observed that a main support body 389 having a differently patterned member relocating side surface for mounting a joined arm member may be provided. FIG. 18 illustrates a fifth form of the member relocating side of the present invention, side 404. As shown, member relocating side 404 of FIG. 18 is formed, in part, like that of FIG. 17 having a first vertical edge 399 opposite a second vertical edge 401. However, each lateral side wall opening 68 joins second T-slot section 394 (or 395) to a short, downwardly sloped, arced stop slot 406. Each stop slot 406 is an extension of T-slot section 394 and, except for its curved characteristics shares the same structural form. Each arced stop slot 406 has an arced stepped stop section 408 which differs, in part, from stepped stop section 78 previously discussed in the first form of member relocating side, side 18. Arced stepped section 408 includes arced terminating narrowed and widened stop edges 410 and 412 respectively as seen in FIGS. 18 and 18A. Arced stop slot 406 is positioned lower than side wall opening 68 and serves the same function as previously discussed stop slot 74. From the aforementioned it is understood that various other types of slotted patterns may be provided in order to accomplish the objects of the present invention.

Having described two forms of the member relocating side 390 and 404, of the present combined forms of the present invention, the following will disclose the structure of joined multi-positionable support arm 388, illustrated in FIG. 19, which allows for its removable mounting and relocation on member relocating side 390 of main support body 387, or side 404 of FIGS. 17 and 18 respectively.

Joined multi-positionable support arm 388 is the first combined form of a joined arm support member of the present invention. In its most basic and economical form, joined multi-positionable support arm 388 may be formed from a plastic material as one integral unit having no moving parts with a non-pivoting, spatially projecting, elongated cylinder. The present form, however, as shown in FIG. 19, provides for three, or four, moving parts while allowing for a wide variety of support positions when mounted on member relocating side 390 or 404. As shown in FIG. 19, joined multi-positionable support arm 388 consists of two essential members: a joining base 416 and a pivoting elongated cylinder 278. Joining base 416 is a combined first form of a joined base member which provides for the attachment, or joining, of a support bracket on the base member of a multi-positionable arm. This joining of members provides for the simultaneous relocation of both the arm and bracket members to a multiplicity of fixedly supportive locations on the main support body of the stand of the present invention.

Referring to FIGS. 19 and 19A, joining base 416, of joined multi-positionable support arm 388, is initially formed from a solid having the form of a rectangular right prism having six sides: a front side 418 opposite a cooperating engagement side 420, a back edge 422 opposite a front edge 424, and a top edge 426 opposite a bottom edge 428. The front side 418, has near its back edge 422, an L-shaped solid 284, formed with, and projecting normally from it surface. The L-shaped solid 284 is formed in a manner similar to that described previously in association with the second form of arm member of the present invention, namely, relocatable, retractable and multi-positionable arm 274 illustrated in FIGS. 12 and 12A. As previously described, the distal end of L-shaped solid 284 is provided with screw 336 and coupling sleeve 338 for the attachment of pivoting elongated cylinder 278. Alternatively, an integrally formed screw (not shown) and complementary coupling sleeve 338, like that previously described may be utilized for pivotally coupling elongated cylinder 278 to joining base 416. Additionally, it is understood that the same telescopic principles apply for extending the distal end of joined multi-positionable support arm 388 as those previously discussed and illustrated in the previous forms of the present invention.

As further illustrated in FIG. 19B, joining base 416, of arm 388 is provided with a symmetrically formed bracket 430, projecting normally from front side 418, near front edge 424. Symmetrical bracket 430, is the first form of a joined bracket and the fifth form of support bracket of the present invention. The present embodiment, symmetrical bracket 430 is formed as an integral member of the aforementioned joined multi-positionable support arm 388. Bracket 430 cooperates with the above-mentioned pivoting elongated cylinder 278. Symmetrical bracket 430 is formed in mirror image to the relocatable support bracket 255 (without T-rail 242) described previously and illustrated in FIG. 10E. Symmetrical bracket 430 is provided with enlarged bounded cutout 432 having a horizontal left arm support surface 434 oppositely facing a horizontal right arm support surface 436. Joining base 416 is also fitted with a contoured symmetrical handle 438. Handle 438 is formed with grip-like contours 440 symmetrically formed along top and bottom edges 426, 428 respectively.

As shown in FIG. 19A, the final fabrication of joined multi-positionable support arm 388 is completed upon the affixing and positioning of a pair of circular T-rail members 442 and 444. First and second circular T-rails 442 and 444 respectively project from the back cooperating side 420 of joining base 416, with each being positioned at a point along the longitudinal axis of joining base 416. As shown in FIG. 22, first circular T-rail member 442 is affixed to cooperating engagement side 420 at a location which is set back somewhat from back edge 422. Additionally, second circular T-rail member 444 is also affixed to cooperating engagement side 420 at a location which is set back from front edge 424. Although T-rails 442 and 444 may be sized equally, it may be desirable in certain applications of the present invention to vary the size of the rail members. For example, the first T-rail 442, and its mutually engaging T-slot section 392, shown in FIG. 17, could be made considerably larger in diameter than the second T-rail 444, and its mutually engaging second T-slot section 394, if a different sized mechanical means is desired. The present description allows for the creation of joined multi-positionable arm 388 and provides for its symmetrical mounting and relocation to a multiplicity of fixedly supportive locations on main support body 389 of stand 386 as shown in FIG. 19C.

In a preferred second combined form of the present joined arm concept, as shown in FIGS. 20 through 24, it is envisioned that the base member and the pivoting elongated cylinder be fitted together by static means which provide for the mutual cooperative engagement of the members and yet still allows for the removable mounting of the pivoting elongated cylinder on the base member. An example of members which provide such a cooperative engagement ability is illustrated in the just-mentioned figures and is identified in FIG. 20A as joined and partially releasable multi-positionable support arm 446.

As shown in FIGS. 23 and 24, the present preferred embodiment provides for a document support stand 448 which includes only three parts, namely, main support body 389, joining base 450 (which, like the first combined form, joined multi-positionable support arm 388 described above, also includes symmetrical support bracket 430) and releasable pivoting elongated cylinder 452. The present stand embodiment, stand 448, is envisioned to be ideal for an all plastic fabrication of three individually static members which engagably cooperate to create a dynamically functioning document support stand 448.

FIG. 20 illustrates, improved and preferred second combined form, joined and partially releasable multi-positionable support arm 446. Joined and partially releasable multi-positionable support arm 446 includes only two essential members: joining base 450 and releasable pivoting elongated cylinder 452 with each member being statically formed.

Figure 20A:
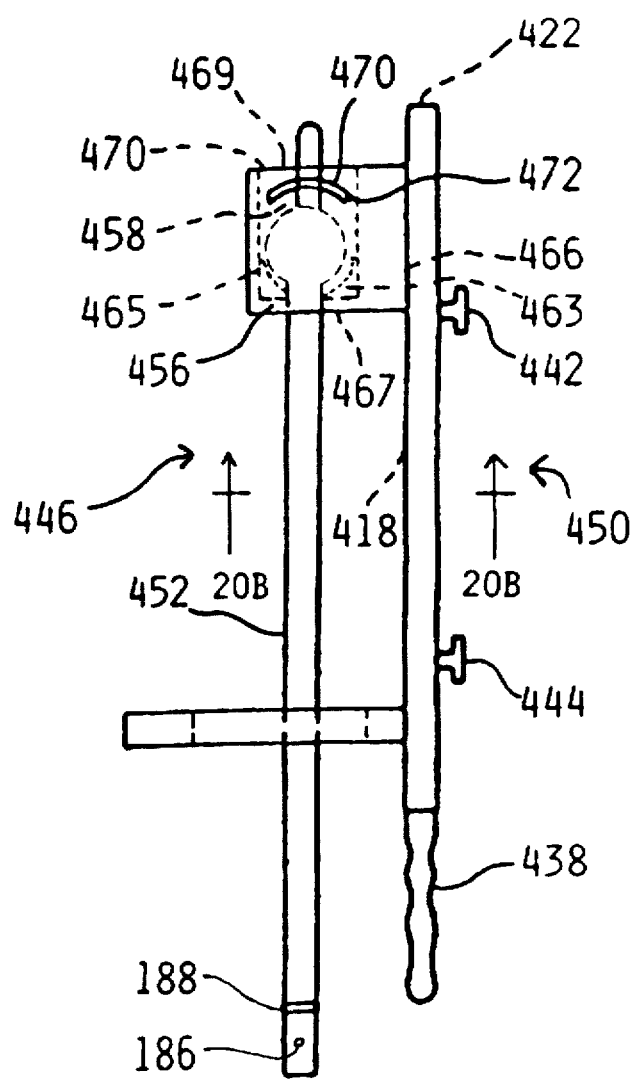
FIG. 20A is a top elevational view of the joined and partially releasable multi-positionable support arm shown in FIG. 20.
Figure 20B:
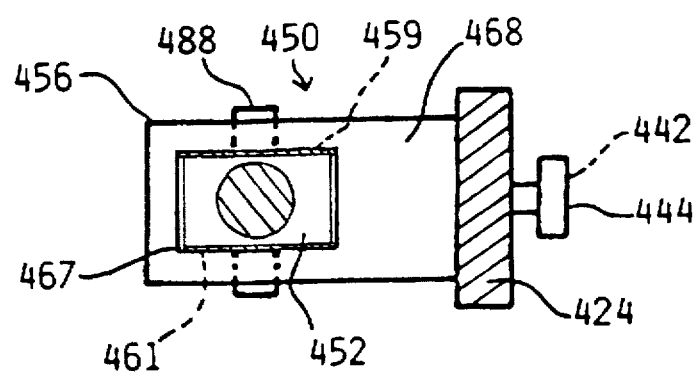
FIG. 20B is a front elevational view of the joined and partially releasable multi-positionable support arm shown in FIG. 20, taken on line 20B—20B of FIG. 20A.

As illustrated in FIGS. 20 and 20A, in association with FIGS. 19 and 19A, since joining base 450 of the present embodiment is initially formed from a rectangular solid like that of joining base 416, it is helpful to maintain the same reference numerals for the same parts. The basic difference between the present joining base 450 and aforesaid joining base 416 is in the method of attaching the pivoting elongated cylinder member to the front side 418 of the base member. Joining base 450 of joined and partially releasable multi-positionable support arm 446 has engagable housing 456 which provides for the releasable engagement of releasable pivoting elongated cylinder 452 from joining base 450. Housing 456 is initially formed from a U-shaped member having three plate-like rectangular sides. Engagable housing 456 replaces the L-shaped solid 284, of joining base 416 used in the previous joined embodiment 388 shown in FIG. 19. As shown in FIG. 20D, in association with FIG. 20A, the sides of the U-shaped member are perpendicularly affixed to, and formed with, the front side 418 of joining base 450, near its back edge 422. Engagable housing 456, consists of five rectangularly shaped enclosing side sections: a top side 460 opposite a bottom side 462 with each side being parallel to and connected by perpendicularly intersecting distal side 464 and proximate side 466 (defined by a surface area of front side 418 of joining base 450). Additionally, engagable housing 456 is fitted with front side 468, as seen in FIG. 20B. Engagable housing 456 is similar, in part, to socket housing 108 of the previously described embodiment discussed in association with FIGS. 5, 5A and 5B. Being, in part, like the previously described embodiment, and upon referring to FIG. 20A, in association with FIG. 20B, engagable housing 456 may be identified as having the following similar members: socket 458, inner top wall 459, inner bottom wall 461, inner contoured proximate side wall 463, inner contoured distal side wall 465, front window opening 467 and rear opening 469. It should be noted that in the present embodiment a securable rear opening is neither required nor desired. Engagable housing 456 is fitted further with a pair of similarly formed, and forwardly directed, aligned terminating curved slots 470 near the rear of outer top side 460 and outer bottom side 462. As seen in FIG. 20D, each curved slot 470 is provided with a pair of curved terminated ends 472. Terminated ends 472 are forwardly positioned in relation to the rearwardly positioned middle of each curved slot 470.

Having described the first static member of joined and partially releasable multi-positionable support arm 446, joining base 450, which includes engagable housing 456, the second static member will now be described. As illustrated in FIGS. 21 and 21A, releasable pivoting elongated cylinder 452 is a fourth form of a pivoting cylinder in the present invention. Releasable pivoting elongated cylinder 452 is similar, in part, to the previously described first form of pivoting elongated cylinder 106 illustrated in FIG. 7. The present embodiment differs from the just mentioned in relation to the original disk member 128 which was integrally formed within the elongated cylinder 146 of pivoting elongated cylinder 106. As seen in FIG. 20, the protruding modified disk 474 of the present embodiment allows for the entire member, releasable pivoting elongated cylinder 452, to be formed as a one piece static member allowing for its releasable mounting on, and engagement with, engagable housing 456 of joining base 450. Upon referring to FIGS. 21 and 21A, it is observed that releasable pivoting elongated cylinder 452 has protruding modified disk 474 formed at its proximate end. Protruding modified disk 474 includes, in part, a disk-like section similar to that previously discussed in relation to forementioned disk 128. Additionally, protruding modified disk 474 is further modified to include a pair of rearwardly directed projecting handles, 482, 484 which project normally from the cylindrical surface 134 of the disk-like section. The handles are parallel with, and project in a direction opposite to that of integrally formed elongated cylinder 146. The pair of projecting handles may be identified as upper handle 482 which is opposite to lower handle 484 with the exterior surface of each handle being coplanar with the upper and lower closed circular regions 190 and 192 respectively of the disk-like section 478. As seen in FIG. 21A, the pair of projecting handles, 482, 484 form a protruding U-shape when viewed from the side. Both handles are formed as an integral member of protruding modified disk 474 and are resiliently flexible allowing, when grasped, for their inwardly directed flexing toward each other. Additionally, each handle 482, 484 has formed, at the approximate middle of its length and, on its outwardly facing exterior surface 486 a protruding ear 488 which is integrally formed therein. Protruding ears 488 may be provided with a shape like that of a short cylindrical rod or, alternatively, like that of a curved plate-like tab member. Each protruding ear 488 has a length and width of sufficient size and shape to engage and cooperate with curved slot 470 of engagable housing 456 the engagement of which will now be described.

Figure 20C:
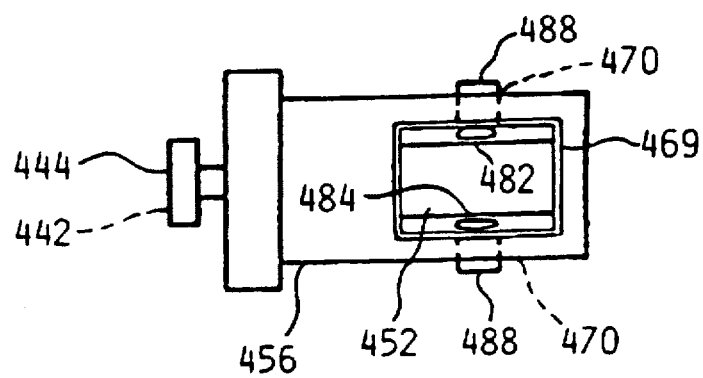
FIG. 20C is a rear elevational view of the joined and partially releasable multi-positionable support arm shown in FIG. 20A.
Figure 20D:
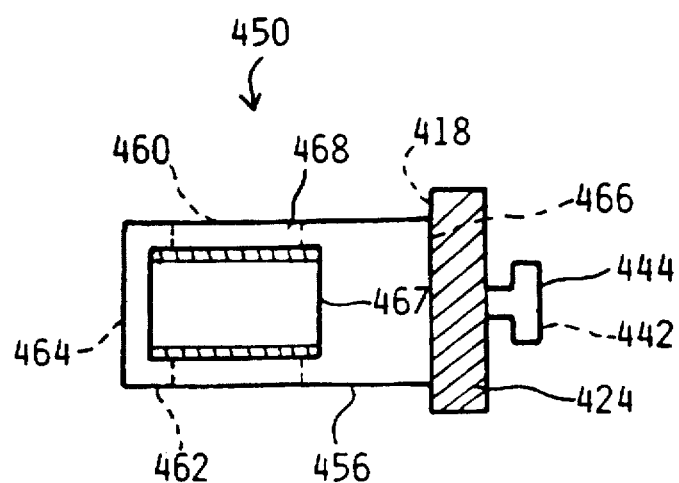
FIG. 20D is a view, like that of FIG. 20B, illustrating an empty socket cavity upon the release and disengagement of the releasable pivoting elongated cylinder from the joined base member of the present invention.

Upon referring to FIGS. 20A and 20C, it is realized that releasable pivoting elongated cylinder 452 is mountable and engagable on engagable housing 456 by inserting the distal end of the releasable pivoting elongated cylinder 452 through the rear opening 469 of housing 456. As the cylinder 452 passes through front opening 467 the operator grasps handles 482, 484 and urges the flexible handles, and consequently protruding ears 488, toward each other thereby allowing for the complete insertion of elongated cylinder 452 within housing 456. Upon full insertion the operator releases the grasp thereby allowing the pair of protruding ears 488 to engage the pair of captivating curved slots 470 resulting in the mounting and pivotal engagement of statically formed releasable pivoting cylinder 452 on statically formed joining base 450 of stand 448.

It should be noted that it may be desirable to modify protruding disk 474 further thereby creating a fifth form of pivoting elongated cylinder of the present invention. The present modification, illustrated in FIG. 21B, results in the formation of an alternative embodiment of the present invention, modified pivoting elongated cylinder 476. Modified pivoting elongated cylinder 476 is an improved version of the just described releasable pivoting elongated cylinder 452 and is formed to cooperate as an essential member of joined and partially releasable multi-positionable support arm 446. As shown in FIG. 21B, protruding disk 474 may be provided with a internalized rectangularly shaped cutout section 490, rearwardly directed, from its central axis. Cutout section 490 is positioned between, and parallel to, upper and lower closed circular regions 190 and 192 respectively, of protruding disk 474. Cutout section 490 results in a further relieved U-shaped segment of protruding modified disk 474 when viewed from the side as shown in FIG. 21B. Such a cutout may be desirable, depending on the type of material used in forming the member at time of manufacture, in order to provide for the required flexibility of handles 482 and 484. The inwardly directed flexibility and restorative resiliency of handles 482 and 484 is required to ensure the clearance and engagement of protruding ears 488 with curved slots 470 when mounting modified releasable pivoting elongated cylinder 476 on engagable housing 456.

Having completed the description of the symmetrical structure of the present embodiment and upon referring to FIG. 23, it is observed that the aforementioned left arm support surface 434 of symmetrical bracket 430 supports a projecting section of releasable pivoting elongated cylinder 452 when joined and partially releasable multi-positionable support arm 446 is mounted, on main support body 389, to the left of a video display monitor 30. Additionally, at the option of the individual user, and as shown in FIG. 24, when the joined and partially releasable multi-positionable support arm 446 is mounted, on main support body 389, to the right of a video display monitor 30, the right arm support surface 436 of symmetrical bracket 430 will provide support to the projecting section of releasable pivoting elongated cylinder 452. It is realized that the forementioned joined and partially releasable multi-positionable support arm 446 is both symmetrically formed of static members and symmetrically functional in supporting and positioning a workload in a multiplicity of selectable spatial positions. Additionally, it is understood from the beforementioned that, except for the static characteristics of the present embodiment, previously described joined multi-positionable arm 388, illustrated in FIG. 19, functions in a manner similar to that of joined and partially releasable support arm 446.

Having described the structural form of the joined and partially releasable multi-positionable arm 446 of the present invention its mounting on member relocating side 389, as illustrated in FIG. 23, will now be described. It should be noted that the mounting of joining base 416 on main support body 389 of the aforementioned embodiment, joined multi-positionable support arm 388 of FIG. 19, is similar to the mounting of joining base 450 of the present embodiment. As illustrated in FIGS. 22 and 23, in association with FIGS. 9, 10C, and 18, the present embodiment, joined arm 446, is mounted on member relocating side 404, of main support body 389, (or on side 390 of body 387 shown in FIG. 17) through the mounting of the projecting first and second circular T-rails 442 and 444 respectively. The operator aligns the widened portion 164 of first T-rail 442 parallel to back plate 48 of centrally located horizontal T-slot section 414, placing the first T-rail 442 in nearest enlarged opening 400. Once first T-rail 442 is mounted, the operator simply slides the joined support arm 446 (or joined arm 388) back and away from first vertical edge 399 of main support body 389 placing widened portion 164 of second T-rail 444 parallel to back plate 48 and entering outer side wall opening 398.

As realized from FIGS. 23 and 24, once both T-rails 442 and 444 are mounted on the main support body 389 the operator, with the assistance of handle 438, simply chooses the vertical support height desired by engaging the second T-rail 444 in any one of a plurality of inwardly directed longitudinal side wall openings 68, branching out from 1st vertical-second T-slot section 415, to positionally and cooperatingly engage the fixed support location of stop edge 408 (or edge 78) of a selected stop slot 406 (or stop slot 74). Upon viewing FIGS. 18 and 19C it is observed that relocating side 404 is provided with two vertical T-slot sections, with 2nd vertical-second T-slot section 417 oriented parallel, and opposite, to section 415 thereby providing for the optional disposition of body 389 to either side of the video display terminal 30. As is realized from FIG. 18, in association with FIG. 22, this maneuverability is achieved through the relocation and positioning capabilities provided by the cooperation of first circular T-rail 442 with centrally located horizontal-first T-slot section 414 and through the further cooperation of second T-rail 444 with 1st vertical-second T-slot section 415. Upon the fixed engagement of second T-rail 444 with a chosen arced stop slot 406 (a supportive, fixed location) the first T-rail 442 is also prevented from moving through the cooperation of joining base 450 and is therefore also considered to be at a fixed location. Upon referring once again to FIGS. 18 and 19C, in association with FIGS. 23 and 24, it is observed that any one of the combined support positions provided by horizontal-first T-slot section 414 and 1st vertical-second T-slot section 415 (or section 414 and section 417) can be said to have support locations which reside along an imaginary line, or transversal, which crosses first vertical edge 399 and second vertical edge 401 of main support body 389. It is further observed that joined arm 388 of FIG. 19C (or joined arm 446 of FIGS. 23 and 24) is capable of being supported at a minimum of only two locations along such a transversal. The mutual cooperation of the supporting members can be realized further upon referring to FIGS. 18, 18A and 22 in association with FIG. 19C. The engagement of first circular T-rail 442 with horizontal-first T-slot 414 allows for the further engagement of second circular T-rail 444 with any one of a plurality stop sections 408 which are available along a transversal which includes the location of both engaged T-rail members and which also crosses the opposing vertical edges 399 and 401 of main support body 389. Such repositioning provides for the selective placement of the document holder attaching means located at the distal end of support arm 446 to a plurality of forwardly projecting spatial locations. As seen in FIG. 23, once the joined support arm 446 is fixed at a selected vertical location by being engaged in a chosen stop slot 406 (or 74) the operator is free to pivot the releasable elongated cylinder 452 along the x-axis thereby providing for the further positioning of the distal end of joined and partially releasable multi-positionable support arm 446.

Upon referring to FIGS. 23 and 24, in association with FIGS. 18 and 19B, it is observed that releasable elongated cylinder 452 extends through enlarged cutout 432 of symmetrical bracket 430 and rests a section of its length, near its distal end, on either left or right arm support surfaces 434, 436 respectively. It is noted that since releasable pivoting elongated cylinder 452 is an extending member and not absolutely rigid, its distal section will fall to either left support surface 434 or right support surface 436 depending on whether joined and partially releasable multi-positionable support arm 446, is mounted either to the left or to the right of a main support body 389. As is realized from the aforementioned the vertical position of the distal end of releasable pivoting elongated cylinder 452 is easily changed simply by lifting handle 438 and choosing a different arced stop slot 406 (or 74). It is understood, as inferred previously, that the aforesaid and following capabilities of the present joined embodiment also apply to the first combined embodiment, joined relocatable and multi-positionable support arm and support bracket 388 of FIG. 19.

Upon observing FIG. 25 and in appreciating that the present invention provides for the support of various types of document holders, such as attachable multi-purpose and multi-positionable document holder 4 shown in FIG. 1, which, in turn, may be required to hold a heavy document holder, such as an encyclopedia, it may be desirable to have a removable counterweight 494 ability which is fixedly attachable to the back edge 422 of joining base 450 (or joining base 416) in order to assist in supporting the document. FIG. 25 shows removable counterweight 494 which consists of a weight 496, formed from a rectangularly shaped solid. Weight 496 has a projecting threaded rod 498 which cooperates with a longitudinally threaded hole 500 internally formed in joining base 450 (or joining base 416) and emerging at back edge 422. An improvement in the counterweighting ability may be provided by means of a telescoping member. FIG. 25A shows attachable counterweight 506 including weight 496 having a projecting tube 502 with opening 503 which cooperates with a longitudinally projectable telescopic member 504 which is housed in joining base 450 (or joining base 416) and telescopically extends in a manner similar to that previously described in other embodiments of the present invention.

Opening 503 assists in the secure mounting of attachable counterweight 506 on telescopic member 504 through engagement with protruding snap fastener 186 positioned at the distal end of telescopic member 504. Consequently, in consideration of the foregoing, one can appreciate the advantage of providing a counterweight to a heavy workload in order to achieve an ease of maneuverability. It may also be advantageous to have the arm subjected to forces that urge its distal "workload" end in an upward direction. As is realized when viewing FIG. 17, in association with FIGS. 25 and 25A, if the arm is weighted near its proximate attachment point, the operator simply pulls down on the arm (which is being held in second T-slot section 394 of main support body 389 through the assistance of terminating edge 397) when positioning the arm and engages the second T-rail 444 in upper stop slot 396. It should be noted that, in this instance, since the distal end of joined support arm 446, or 388, is urged upward, in regards to the aforementioned, it is physically urged to fixedly engage upper stop slot 396 and will remain so engaged until purposely relocated by its user.

A modification to the aforesaid joined arm form of the present invention is presented in FIGS. 26 and 27. The cooperating engagement side 420 of joining base 450 may be adapted to provide for the axial movement of a modified form of the first T-rail, T-rail 514, illustrated in FIG. 27, along the longitudinal axis of joining base 450. As shown in FIG. 26 the cooperating engagement side 420 is modified to include an axial T-slot 508 having a terminated end 510 near, but setback from the affixed second T-rail 444 with its other end open and emerging at access opening 512 of back edge 422. Axial T-slot 508 is provided to cooperate with threaded circular first T-rail fitting 514 shown in FIG. 27. Threaded circular first T-rail 514 allows for an alternate method for mounting arm 446 (or arm 388) on main support body 389. Threaded circular first T-rail 514 is formed with a circular widened portion 164, like that previously described, having a partially threaded, stud-like, narrow portion 516 attached at the center of its bottom surface 169. Circular first T-rail 514 is threaded at its end in order to provide for its threaded mounting in one of a plurality of threaded bores 518 formed in the member relocating side 404 of FIG. 18 (or 390 of FIG. 17). As understood from FIG. 24, the aforesaid modified mounting means permits, through its cooperation with axial T-slot 508, the initial engagement of a modified form of joined and partially releasable multi-positionable support arm 446 (or arm 388) with main support body 389. The remaining mounting requirements for engaging the second circular T-rail 444 with the member relocating side 404 (or 390) of main support body 389, would be the same as previously described. The present embodiment allows for added facility in positioning the distal end of either modified joined support arm, arm 446 (or arm 388) at a plurality of fixed vertical positions while allowing for the quick disengagement of the joined support arm from the main support body of the present stand 448 (or 386). Alternatively, as realized from FIG. 26, in association with FIG. 27, threaded circular first T-rail 514 may be affixed at a plurality of selectable fixed points on the cooperating engagement side 420 of modified joining base 450 (or 416) through the threadable engagement with threaded apertures 520. From the aforementioned, it is appreciated that threaded circular T-rail 514 provides for the fixed selective positioning of the first circular T-rail of the present form of the invention at a plurality of locations on member relocating side 404 (or 390) of main support body 387 (or 389) with either of the modified forms of joined support arms: arm 446 (or arm 388) of the present invention. Consequently, it is realized that the fixed positioning possibilities of the joined arms of the present disclosure are great in number. Additionally, the versatility provided by the ease of dismounting and resultant ability to exchange one type, or size, of joined support arm for another enhances the usefulness and number of applications of the present invention. It is understood from the aforementioned that main support body 389 of the present discussion may also be modified to take the form of main support body 102 of FIG.

An alternative joined form of the present invention, relocatable copyholder 522, is shown in FIG. 28. Relocatable copyholder 522 is adapted for being mounted on and relocated to a plurality of fixed locations main support bodies of the present invention. Relocatable copyholder 522 has a body 524 formed from a rectangularly shaped plate-like solid, having six sides: a front document mounting side 526 opposite a rear side 528, an inner side 530 opposite outer side 532, and upper side 534 opposite lower side 536. Front mounting side 526 is provided with a removable biased clip 531 and a support ledge 541 for mounting a document. As illustrated in FIG. 28, inner side 530 has a transversely disposed and integrally formed square shaped rib 542 projecting normally from its surface. Rib 542 is provided at its projecting distal end with integrally formed rectangularly shaped plate-like support flange 544. Support flange 544 has a cooperating engagement side 546 opposite outer facing support side 548. Flange 544 is perpendicularly disposed to transversal rib 542 with its plate-like sides parallel to the inner side 530 of body 524. Cooperating engagement side 546 of flange 544 has an integrally formed square shaped T-rail 242 which projects normally from its plate-like surface. T-rail 242 is like that previously described, and shown in FIG. 10, for engaging relocatable support bracket 10 of the first form of the present invention and cooperates with stop slot 74 in the same manner previously described and illustrated in FIGS. 2, 10C and 10D. Additionally, the front mounting side 526 may be fitted with a centrally transversing T-slot 527 of the form previously described and illustrated in association with FIG. 4A. T-slot 527 has an exposed opening 525 at outer side 532 and transverses widthwise the mounting side 526 ending before reaching inner side 530 at terminating edge 533. T-slot 527, with the cooperation of removable biased clip 531, allows for the engagement additional engaging document holders of the type previously and presently described.

Alternatively, as illustrated in FIG. 28A, a dual sided, symmetrical copyholder 549 may be formed with dual mounting sides: a front, first document mounting side 529, having T-slot 527, and an identically formed rear, second document mounting side 547, having T-slot 523. The present embodiment may be equipped with dual biased clips 531, 538 as well as dual support ledges 541, 540 mounted on its respective mounting sides 529 and 547. The duality of the present embodiment provides for its efficient mounting and relocation on a main support body of the stands of the present invention whether its disposition be to the left or to the right of the viewer. Consequently, as is realized upon referring to FIG. 29, either aforementioned relocatable copyholder 522 or symmetrical copyholder 549 are capable of supporting a document, or document holder, and of being removably mounted, relocated, and securely positioned on the member relocating side of the variety of different types of vertical support panels herein presented. FIG. 29 illustrates a two piece document support stand, stand 535, which consists of main support body 537 having member relocating side 539 and symmetrical copyholder 549. If desirable, biased clip 531 of symmetrical copyholder 549 may be removably mounted in order to allow T-slot 527 (or T-slot 523) to engage additional holders.

As previously suggested, and as shown in FIG. 30, a main support body, such as body 550, and consequently a member relocating side, side 551, similar, in part, to the previously discussed main support body embodiments, may be incorporated in any vertical solid having a planar surface of sufficient size to accommodate its mountable support members. FIG. 30 illustrates a main support body 550 formed from a modified file cabinet, having an integrally formed member relocating side 551 incorporated within its side panel and adapted for use in the present invention. Consequently, FIG. 30 illustrates multi-positionable stand 552, which consists of main support body 550 having member relocating side 551, relocatable and multi-positionable arm 8 and relocatable support bracket 10. Member relocating side 551 is patterned in a manner similar to member relocating side 18 previously discussed in association with FIGS. 3 and 3A. The particular pattern of the member relocating side is one of choice. The following are envisioned to be ideally suitable in the modern office environment for the inclusion (or attachment of a member which includes) of the main support body and slotted member relocating side disclosed in the present invention: walls, partitions, shelving, file cabinets, desks, workstations, video display monitors and the like. In a modified form of the present invention, as shown in FIG. 31, stand 545 includes a main support body 553 consisting of just one, vertically disposed, plate-like panel having a shape like that of a rectangular right prism and having a member relocating side 543. Main support body 553 may be efficiently and economically attached to a vertically disposed support member, such as a conventional file cabinet 554, through the use of self-tapping screws, glue or other attachment means.

Alternatively, in the embodiment identifiable as adhering main support body 564, and shown in FIGS. 32 and 32C, the rear planar side 556, of panel 557 may be provided with a recess 559 formed to receive an attached adhesive mat 558, which includes an inner facing attachment side 560 and an outer facing adhesive side 562. The inner facing attachment side 560 is attached to the rear side 556 of main support body 557 by gluing or other means thereby allowing the outer facing adhesive side 562 to adhere to a vertical support member, such as member 555, when contact is made. A material which is envisioned to be ideally suitable for supporting a vertically disposed main support body panel of the type presently described because of its extraordinary contacting adhesive characteristics is a roofing material having the name Ice and Water Shield (TM) and sold by the W. R. Grace and Company, Construction Products Division, of 62 Whittemore Ave., Cambridge, Mass. 02140, which method of adhering is herein incorporated by reference. Upon referring once again to FIG. 32, in association with FIG. 32C, it is realized that the aforementioned adhesive means may be adapted to assist in the firm attachment of panel 557 upon contact with a structural member such as a wall or conventional file cabinet 554, the newly formed embodiment being identifiable as adhering main support body 564, an application of which is shown in FIG. 32C. FIG. 32C illustrates stand 567 which includes: adhering main support body 564, adhering to file cabinet 554 and having member relocating side 565; relocatable and multi-positionable projecting arm 8 and relocatable support bracket 10.

An alternative embodiment of the present invention, illustrated in FIGS. 32A and 32B, however, not only provides for the very positive engagement of the adhering members of the main support body but allows for their subsequent disengagement if desired. Due to the extremely positive adhering characteristics of material such as Ice and Water Shield {TM} it is extremely difficult for the aforementioned rigid plate-like panel 557, formed in the shape of a rectangular solid panel to be removed from an engaged surface when utilizing an adhesive material of the type just described. The adhering contact per square inch is increased due to the fact that the rigid panel 557 provides a large and inaccessible contact surface area. These characteristics allow for the mounting of the main support body members without the need for marring the contacting support surface. It is possible, however, to provide for the disengagement of the adhering members through the following arrangement of parts. As shown in FIGS. 32A and 32B, the present disengagable adhering main support body 568 consists of a semi-rigid engagement bolt 570, having an enlarged, planar and pliable head 572 and an elongated threaded stem 574. Bolt 570 is inserted in an aperture 576 at the outer facing adhesive side 562 of adhesive mat 558. Consequently, the pliable head 572 of bolt 570 is placed in face to face relationship with side 562 of adhesive mat 558. The head diameter of semi-rigid engagement bolt 570 is of sufficient size to engage the assembly in a manner that will provide sufficient cooperative support for maintaining the assembly when forces are applied both normally away from, and parallel to, panel 566 of main support body 568. The inner facing attachment side 560 of adhesive mat 558 is positioned in face to face relationship with rear side 556 of panel 566. The disengagable main support body 568 is assembled via the assistance of slotted nuts 578 which are fastened to bolt 570, at the front member relocating side 569, through holes 582 which are bored completely through panel 566. Slotted nuts 578 reside in a recess 580 formed below the planar surface of the panel 566. Once assembled, and adhesive side 562 of disengagable adhering main support body 568 establishes contact with a support surface 84 the entire assembly is capable of providing the support required for the many applications of the main support body of the present invention.

Accordingly, in order to remove the disengagable main support body from its support surface 584 one simply removes nuts 578 thereby disengaging panel 566 from adhesive mat 558. Adhesive mat 558 is removed from support surface 584 by initially making a peeling-like action at a corner of the mat. Semi-rigid bolts 570 are thus exposed and removed with the peeling action. Additionally, it should be noted that semi-rigid bolts 570 may be integrally formed with adhesive mat 558, with head 572 being integrated within mat 558. A somewhat related means is known in the art for securing equipment such as a typewriter to a horizontal surface. The aforesaid securing means is disclosed in U.S. Pat. No. 3,850,392 (Gassaway) and is herein incorporated by reference.

In considering the mounting of the main support body panel of the present invention on a vertical support member the following alternative method is also presented. Upon referring to FIG. 32D it is realized that a main support body 585 having a member relocating side 586 may be pivotally mounted on a vertical support member such as a wall or post 587. As illustrated, a pair of L-brackets 588 are mounted on vertical support post 587 through the agency of screws 589. The projecting leg 590 of mounted L-bracket 588 is fitted with an opening 592 in order to accommodate a machine bolt 594 which is threadably received in aperture 596 located on top and bottom edges 595 and 597 respectively of main support body 585. Apertures 596 are positioned on the top and bottom edges near second vertical edge 591. Thus it is realized that the main support body 585 may be pivotally positioned about the y-axis thereby further enhancing the positioning capabilities of the multi-positionable document support stands of the present invention. Additionally, it is noted that the main support body 585 may be firmly positioned in its pivotal movement about the y-axis by tightening machine bolt 594 or by other bracket means known in the art for securely positioning pivoting members.

It is also of importance to realize upon viewing FIG. 32D, that it is within the scope of the present invention to provide a planar main support body which consists solely of a single layered sheet of rigid material, such as plexiglass, styrene or other similar type of material which provides for two, oppositely facing and parallely disposed, member relocating sides, side 586 and side 591, having a common or shared slotted pattern with slots 581 and 583. Like the previously discussed T-slots of the present invention, single layered slots 581 and 583 also allow for a member relocating side which cooperates with the previously discussed T-rails and arm members of the present invention through the cooperation of the widened and narrowed portions of the rail members. Additionally, in the present embodiment, the previously discussed "stepped" feature of the rail members allows for each rail member to receive its support through the mutual cooperation of the two oppositely and parallely disposed member relocating sides 586 and 593 and the common slotted edge provided by the thickness of the planar body. The slotted edge 579 connects to, and is normally disposed to, both member relocating sides 586 and 593. Thus it is realized that the just described single sheet concept is both economical to manufacture and versatile in its possible applications as a contributing main support body member in the stands of the present invention.

As is realized from the present disclosure the applications of the stands of the present invention are great in number. The following additional disclosure will provide rather significant improvements by applying the present inventive concepts to the support of documents and document holders at a computer workstation. Although, a main support body panel, similar in form to main support body 585 may be attached to a vertical surface such as a file cabinet 584, or post 587, as shown in FIGS. 31, 32C, and 32D, it is also envisioned to incorporate a symmetrical main support body, having dual member relocating sides, with a slotted pattern similar to side 404 of FIG. 18, within the two upright side panel sections of a video display monitor casing 601, as shown in FIG. 33. FIG. 33 illustrates symmetrically formed, stationary main support monitor 602, having member relocating sides 599 and 603, which has been adapted to function as an improved alternative form of main support body in the present invention. Additionally, FIG. 33A, in association with FIG. 33, illustrates the combined application of an integrally formed main support body and directionally adjustable video display monitor in creating a new type of dual purpose tilting and/or swiveling video display and symmetrical main support body, directionally adjustable main support monitor 604, which is capable of functioning both as a video display monitor and as an adjustable main support body in supporting and directionally positioning joined multi-positionable arms, such as arm 388 and arm 446 previously discussed and illustrated in FIGS. 19 through 25A.

The ability to tilt and swivel a video display monitor is well known in the art and is disclosed in patents which either: 1) provide an accessory base for the support and positioning of a stationary type monitor, such as U.S. Pat. Nos. 4,365,779 (Bates, et al.) and U.S. Pat. No. 4,500,060 (Anderson, et al.) and is designated in FIG. 33C as adjustable-accessory base 615, or, alternatively: 2) provide a video display monitor which incorporates a tilting and swiveling ability within its structure as disclosed in U.S. Pat. No. 4,554,590 (Chelin et al.) and U.S. Pat. No. 5,024,415 (Purens) and is designated in FIG. 33A as adjustable main support monitor 604. The just mentioned patents are herein incorporated by reference. As illustrated in FIG. 33A, the modification of a tiltable and swivable video display monitor to form an essential member, directionally adjustable main support monitor 604, having member relocating sides 607 and 608, in combination with the other essential members of the present invention results in the formation of a new and improved type of omni-directional and multi-positional stand which may be identified (in FIG. 33A) as omni-directionable and multi-positionable video support stand 606. The present embodiment adds greatly to the ability to support and position a wide selection of various types of document holders to either or both sides of a computer display monitor. This improved versatility is accomplished through a means which adds a minimum amount of additional support apparatus to the workstation environment.

An additional important feature is disclosed in the video support stand 606 of FIG. 33A. FIG. 33A shows cam lock 598 fitted to the front side 635 of support monitor 604. Lock 598 is provided to prevent the unauthorized removal of arm 446 from support stand 606 by blocking the exit of longitudinal outer side wall channel opening 398. Lock 598 is of the cam type like that sold by the National Lock Company of Rockford, Ill. 61101 and designated as Model No. C8111. Basically, there are two approaches available with a cam lock such as lock 598. By mounting lock 598 on the front side 635 of monitor 604, with the lock cylinder parallel to member relocating side 607, the cam of lock 598, which is pivotally rotatable perpendicular to its cylinder, is capable of blocking channel opening 398 by passing through a laterally formed opening which sections the T-slotted channel of opening 398 thereby preventing the removal of arm 446 from support monitor 604. Alternatively, as illustrated in FIG. 17, lock 598 may be fitted on member relocating side 390 of a support body. In this embodiment, however, the cam is now pivotable parallel to back plate 48 of T-slot 385. Consequently, the cam of lock 598 is capable of passing through an opening formed in side plates 50 of the T-slot thereby also preventing the removal of arm 446 from support monitor 604. A similar type of securing means has been disclosed in U.S. Pat. No. 5,020,763 (Hegarty) the disclosure of which is herein incorporated by reference.

In summarizing the unique and versatile positioning capabilities of omni-directionable and multi-positionable video support stand 606 the following is to be considered. In addition to allowing for the spatatial projecting and secured positioning of the distal end of the stand's arm member along a z-axis, and also about both an x and a y axis of rotation, the following ability is also created in combination. By providing a main support body, such as directionally adjustable main support monitor 604, having a tilting and swiveling ability, support monitor 604 (the main support body of stand 606) of the present embodiment may be considered to be directionally positionable about both an x and a y axis of rotation. The ability to additionally pivot the main support body member of the present stand about two axes of rotation creates a combination which greatly enhances the overall fixed spatial positioning capability of stand 606 of the present invention.

When considering the fact that there is now an ability to project various types and weights of workloads on an arm which is mounted to a tilting and swiveling video display monitor the following additional ability is quite helpful. Although a tilting and/or swiveling monitor may possess sufficient size and placement ridgidity to support a suspended copyholder mounted on its side it is recognized that a stabilizing means is necessary when the weight of a workload creates a lever which is of sufficient force to overcome the stability of the monitor's chosen viewing position. Upon referring once again to FIG. 33A, a pair of adjustable stabilizers 632, 634 is observed fitted to support monitor 604. Each stabilizer 632, 634 is formed in a manner similar, in part, to that used for leveling heavy appliances such as washing machines and dryers. As understood further upon also considering FIG. 33B, stabilizer 634 includes a bore 636 formed in casing 638 of directionally adjustable main support monitor 604. Bore 636 is provide to cooperate with threaded rod 637 which is fitted at one end with a self-leveling foot 640. Self-leveling foot 640 is of the type known in the art which utilizes a ball and socket joint. Bore 636 is disposed near a front corner of the support monitor 604, being initially bored in the bottom side 639 of casing 638, forming opening 647, at a location slightly setback from, and parallel to member relocating side 608. Additionally, main support monitor 604 is provided at its front, near a lower corner of viewing side 635, with rectangularly shaped niche-like cutout 642. Cutout 642 is disposed perpendicular to bore 636 and has parallel walls 641, 643 with the center of each wall intersected by bore 636 at a point slightly above the entrance to bore 636. Cutout 642 is provided to receive adjusting disk 644 which is fitted with threaded center opening 645 and knurled circumferential surface 646. The adjustable stabilizer 634 is assembled simply by inserting threaded rod 637 in bore 636 and threadably engaging adjusting disk 644 which is housed in cutout 642 and maintained in that location through the mutual cooperation of threaded rod 637 and perpendicular walls 641, 643 of cutout 642. Once directionally adjustable main support monitor 604 is provided with at least one stabilizer 634, the support monitor 604 is capable of maintaining a projecting workload, of substantial weight, at a selected tilt position while still permitting the tilt of the display screen to be selectively adjusted simply by turning the knurled surface 646 of adjusting disk 644. As an alternative to the just described adjustable stabilizer 634 the support monitor could be fitted with an adjustable basic stabilizer 632 which consists of a threaded bore 631 fitted to casing 638 in a manner similar to that of bore 636. Threaded bore 631 would cooperate with threaded rod 634 in adjustably stabilizing support monitor 604 by rotating threaded rod 634 in bore 631 rather than turning adjusting disk 644 of adjustable stabilizer 634. It should be noted that the just described stabilizing ability still allows stand 604 to be rotated about the y-axis by the agency of self-leveling foot 640 which is free to be relocated to any desired position along the horizontal.

Alternatives to the just described stabilizing feature are available when combining, or incorporating, the supportive features of directionally adjustable main support monitor 604 with selected features of the following references. An ability to stabilize a tiltable and/or rotatable main support monitor may be acquired through the further incorporation of an adjustable brake assembly as disclosed in the following patents, the disclosures of which are herein incorporated by reference: U.S. Pat. No. 4,453,687 (Sweere); U.S. Pat. No. 4,591,120 (Bryant-Jeffries, et al.); and U.S. Pat. No. 4,591,123 (Bradshaw, et al.). This present feature is designated in FIG. 34A as adjustable-accessory brake assembly 627 having stabilizing control lever 623. Brake assembly 627 provides for a means to adjust and fixedly position stationary main support monitor 609. Alternatively, if an improvement of the type disclosed in the above references (U.S. Pat. Nos. 4,591,120; 4,591,123) is integrally incorporated within the base of a directionally adjustable main support monitor an even further improved embodiment is formed. As is realized upon viewing FIG. 34B, fixedly adjustable main support monitor 629, having stabilizing means and control lever 633 integrally formed therein, is created from the just mentioned description. Upon considering a previously described form of the present invention and referring to FIG. 33C, in association with FIGS. 3A, 29 and 10D, it is appreciated that an alternatively joined embodiment, relocatable copyholder 522 is also especially useful, when combined further with a directionally adjustable base 615 and stationary main support monitor 624 having a member relocating side 605, for supporting a document parallel to the screen of a tilting monitor since front mounting side 526 of the relocatable copyholder 522, and its mounted document, remains parallel to the screen at all times due to the fact that the mounted relocatable copyholder 522 will remain in the same position relative to the screen as the monitor is turned or tilted for viewing. The just mentioned description also applies to previously discussed symmetrical copyholder 549 illustrated in FIG. 28A.

Alternatively, it should be noted that not all video display terminals are formed in a regular or box-like shape having smooth, planar, plate-like sides which provides for the ease of mounting the rear side of an attachable main support body, such as main support body 553 (or 564) discussed previously. Consequently, upon referring to FIG. 33D it is realized that an alternative main support body, adaptive main support body 610 may be provided which is formed with a plate-like member relocating side, such as side 611, opposite a irregularly shaped adapting side 612 which is complementary in shape to the irregularly shaped sides 614 of video display monitor 616. Adaptive main support body 610 may be attached to the sides of the video display monitor by mechanical means such as screws, glue or through the use of alternative adhesive means like those disclosed previously. Furthermore, it is noted that in order to satisfy the needs of specific applications the adaptive main support body, such as body 610, of the present invention may be formed from more than one part. Additionally, it is also within the scope of the present invention to modify the cooperating engaging side, or the length of its projecting rail members, of the joined arm members herein presented in order to allow for their mounting on irregularly shaped video display terminals such as monitor 616 illustrated in FIG. 33D.

In considering the unique combination of arm and bracket members and video display monitors of the present invention an additional improvement follows. Although the multi-positionable devices of the present invention are mountable on such display monitors an additional feature may be desirable. As realized from FIG. 34A, if the operator decides to use a heavy workload, such as heavy duty document holder 617, at the distal end of a projecting arm, the ability to add additional weight to the opposite upright side panel of the monitor (when not equipped with a stabilizing means) would assist in equalizing the forces created by the lever created on the side of the monitor supporting the workload. Such an additional weight is illustrated in FIGS. 34 and 34A and identified as removable counterweight 618. Removable counterweight 618 is a six sided rectangular solid having a proximate cooperating engagement side 620 opposite a distal receiving side 622. Cooperating engagement side 620 is provided with a T-rail such as T-rail 110 (or 242) previously described which allows for its mounting on a member relocating side of the present invention. Receiving side 622 is provide with a T-slot 625, like that previously described in association with FIG. 4A, which provides for the attachment of an additional removable counterweight 618 if desired.

Additionally, as shown in FIG. 34B, it would be helpful when utilizing a tilting video display and main support monitor (when also not equipped with a stabilizing means) to provide a movable counterweight, having a shifting weight means, which allows the center of gravity to shift thereby allowing for the adjustment and stabilizing of the monitor's screen while maintaining a counterweight ability. FIG. 34B illustrates shifting counterweight 626 which incorporates almost all of the features of removable counterweight 618 previously described except for it having a hollow cavity 628 which contains a movable weight 630 such as a liquid confined within its cavity. Both removable counterweight 618 and shifting counterweight 626 may be positioned along a horizontal slot formed in a manner similar to arm and bracket branch 88 and 90 of previously discussed member relocating side 18, shown in FIG. 3A, having stop slots 74, in order to modify the forces required for maintaining a balanced state. Additionally, it should be realized that a horizontal slot like that of arm and bracket branch 88 and 90, having stop slots 74, could be employed for the sole purpose of positioning a counterweight.

At this point in the description the essential forms and features of document support stands having various directionable, relocatable and multi-positionable members have been described. Upon referring, once again, to FIG. 1, it is realized that as part of the instant invention, projecting support stand 2, of universal document support stand 1, is capable of projecting the distal end of a support arm at a multiplicity of fixed spatial positions. Additionally, it is appreciated that the distal end of the support arms disclosed in the present invention are provided with a means for attaching an unlimited number of various article holders through protruding snap fastener 186 cooperating with a mutually engaging fitting attached to an attachable article holder.

For the field of interest of the present invention it is desirable to join, or mount, an attachable document holder, such as attachable multi-positionable document holder 650, to the distal end of a relocatable and multi-positionable support arm, such as previously discussed arms 8, 388 or 446. It can be appreciated upon referring to FIG. 1, once again, that the joining of projecting support stand 2 with an additionally positionable document holder provides for a multiplicity of support positions. FIG. 1 refers to holder 4, the unique features of which will be appreciated upon the complete reading of the present disclosure. Holder 4 incorporates, in part, the embodiment to be discussed at the present time, namely, holder 650.

Figure 35:
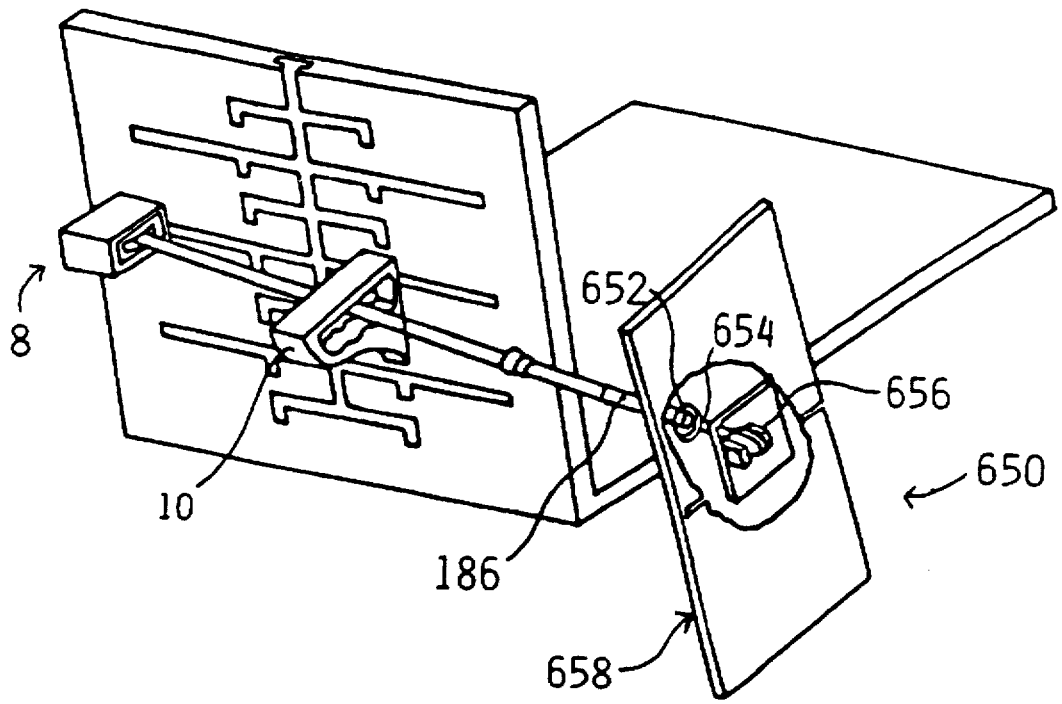
FIG. 35 is a front perspective view of the projecting, multi-positionable support stand and attachable multi-positionable holder of the universal document support stand shown in FIG. 1, formed in accordance with the present invention.

Referring to FIGS. 35 and 36, attachable multi-positionable document holder 650 of the present invention may be considered to consist of four essential members: the first member, attachable proximate clevis 652; the second member, biaxial positioning fitting 654; the third member, pivotable distal clevis 656; the fourth member, rotatable document holder 658. It should be noted that although the present embodiment is described as being attachable, it may also be permanently mounted to a fixed, stationary support simply by modifying the attachable end of proximate clevis 652 to include a flange member having screw holes for mounting.

The first and third members, 652 and 656, respectively, cooperate with the second member, biaxial positioning fitting 654 to allow for the mounting and positioning of the fourth member, rotatable document holder 658 on a supporting structure.

Figure 37:
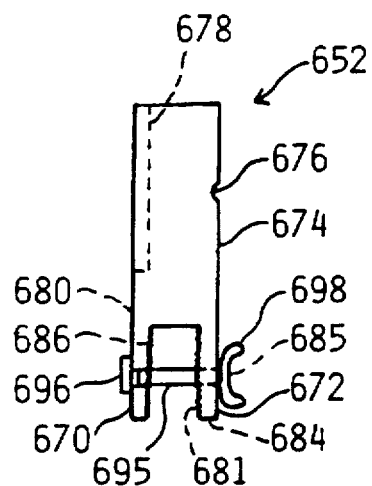
FIG. 37 is a side elevational view of the proximate clevis member illustrated in the attachable multi-positionable document holder shown in FIG. 36, constructed in accordance with one form of the present invention.

As individually shown in FIG. 37, the first member, attachable proximate clevis 652 consists of: a fitting having a shape somewhat like that of a cylindrical tube having two prong-like leg sections at one end when viewed from the side. The attachable proximate clevis member 652 has a pair of similarly formed extending leg members 670 and 672; a short tube-like member 674 projecting in a direction opposite to that of legs 670 and 672. The tube-like member 674 is provided with a snap fastener opening 676 and longitudinal concave depression 678 which is provided to releasably cooperate with a protruding snap fastener 186 and internalized convex protrusion 206 previously described at the distal end of a support arm such as arm 8. Each leg 670, 672 has an outer planar side 680 opposite an inner planar side 681 with the inner side of leg 670 in face-to-face relationship with the inner side of opposite leg 672 and being separated from each other by a distance equal to the thickness of cylindrical surface 682 of proximate disk 683 to be described below. Curved edge 684 is semi-circular with its radius of curvature located at openings 685, which is provided near the distal end of each leg member. Since each leg is similarly formed and positioned, the pair of openings 685, are in alignment with each other at the center point and may be considered to reside along the y-axis once the present multi-positionable holder is assembled and mounted on a support member. Furthermore, each inner side 681 is formed with a series of gradually emerging, tapered triangular prisms 686 projecting radially, in a spoke-like formation, away from the center openings 685. The aforementioned provides for the engagement and cooperation of attachable proximate clevis 652 with the next member to be described.

Figure 38:
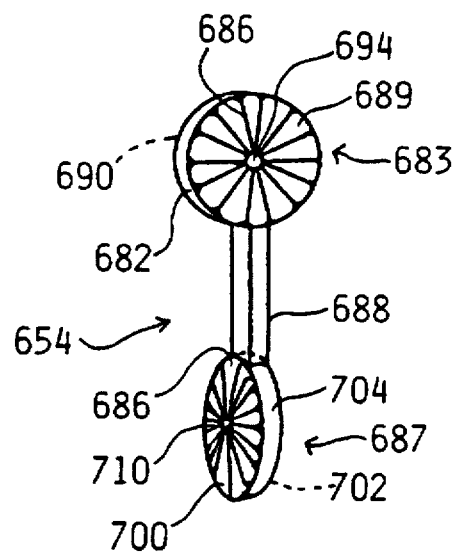
FIG. 38 is a front perspective view of the biaxial positioning fitting illustrated in the attachable multi-positionable document holder shown FIG. 36, constructed in accordance with one form of the present invention.
Figure 39:
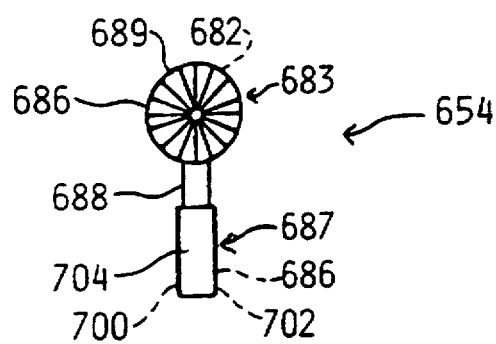
FIG. 39 is top elevational view of the biaxial positioning fitting shown in FIG. 38.

Upon referring jointly to FIGS. 38 and 39 the second essential member of attachable multi-positionable document holding device 650, biaxial positioning fitting 654, is observed. Biaxial positioning fitting 654 consists of two separate and distinct joined disks, proximate disk 683, and distal disk 687 which are attached to each other by means of connecting bar 688. As more specifically observed in the illustrations, proximate disk 683 consists of an upper circular side 689, opposite a lower circular side 690, with sides 689 and 690 separated by the thickness of cylindrical surface 682 of the disk member. Disk 683 is also fitted with an aperture 694 passing completely through its thickness along its central axis. As suggested by FIG. 37, in association with FIG. 38, aperture 694 of biaxial positioning fitting 654 cooperates with openings 685 of proximate clevis 652 and a connecting means, such as shaft 695, having retaining head 696 cooperating with retaining wing nut 698, in allowing disk 683 to be insertably mountable and retained between legs 670 and 672 of attachable proximate clevis 652. As is realized from FIGS. 38 and 39, in association with FIGS. 36, distal disk 687 is formed similarly to proximate disk 683 having upper circular side 700, lower circular side 702, with the thickness of its cylindrical surface 704 being equivalent to the distance between legs 718 and 719 (FIG. 36) of pivotable distal clevis 656 and with aperture 710 passing completely through its thickness along its central axis. Additionally, in order to cooperate with the tapered triangular prisms 686 of inner sides 681 of previously described legs 670, 672 (and sides 717 of legs 718 and 719) each disk 683 and 687 is also fitted with a series of tapered prisms 686 projecting radially, also being gradually formed, in a spoke-like formation, away from their respective center apertures 694, 710 on each side 689, 690, 700 and 702, respectively. The juxtaposed tapered prisms 686 assist in the frictional engagement of members while still permitting their repositioning when desired. As mentioned previously, proximate disk 683 and distal disk 687 are attached to each other through the agency of connecting bar 688. Connecting bar 688 is square shaped and has sides equal in size to the thickness of cylindrical surfaces 682 and 704 of the disk members.

Upon referring to FIGS. 36, 38 and 39, once again, it is observed that the plane of upper circular side 700 of distal disk 687 is offset ninety degrees from the plane of upper circular side 689 of proximate disk 683 thereby perpendicularly orienting the central axis of distal disk 687 in relation to the central axis of proximate disk 683. Thus it is realized that the central axis of distal disk 687 is considered to be coaxial with the x-axis and perpendicular to the central axis of proximate disk 683 which is considered to be coaxial with the y-axis. Biaxial positioning fitting 654 functions as a connecting member which allows for the positioning of, the fourth essential member, rotatable document holder 658 about an independent y-axis of rotation and/or about an independent x-axis of rotation through the mutual cooperation of the first and third essential members, proximate clevis 652 and pivoting distal clevis 656, respectively.

Figure 40:
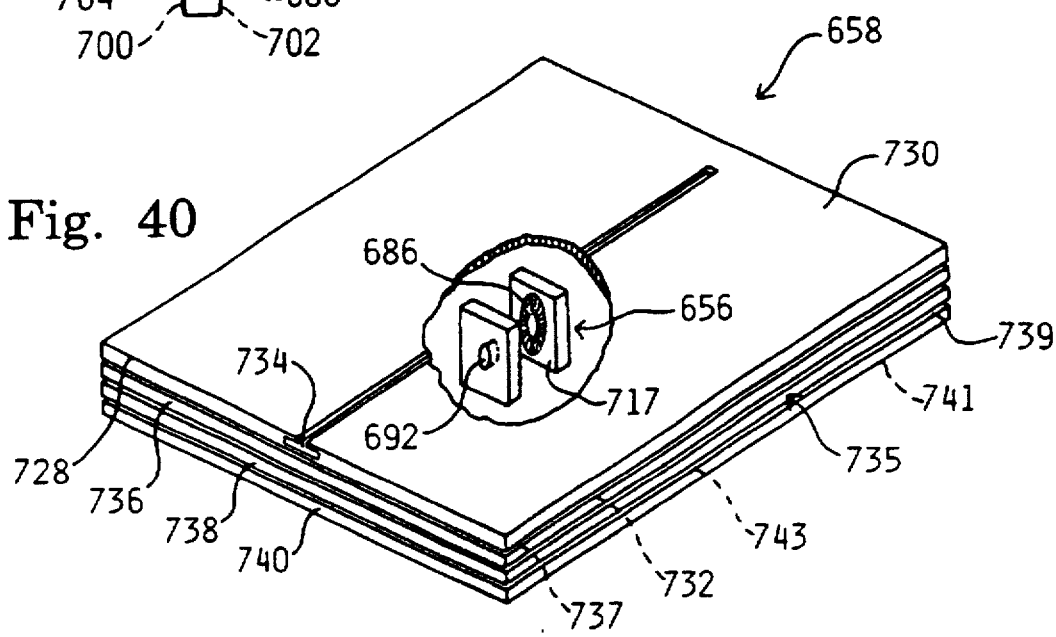
FIG. 40 is a front perspective view, partially broken away, of the rotatable document holder member illustrated in the attachable multi-positionable document holder shown FIG. 36, constructed in accordance with one form of the present invention.
Figure 41:
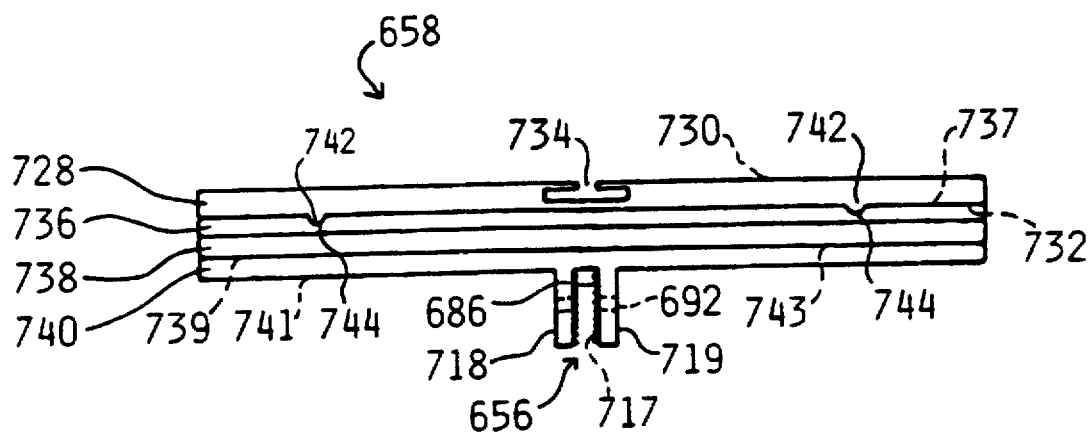
FIG. 41 is a side elevational view of the rotatable document holder member shown in FIG. 40, and illustrating its protrusion and stop detent members.

FIGS. 40 and 41, in association with FIG. 36, shows the third essential member, of multi-positionable document holder device 650, pivotable distal clevis member 656. As shown in FIG. 36, pivotable distal clevis 656, is similar, in part, to the structure of the previously described first essential member, attachable proximate clevis member 652. Pivotable distal clevis member 656 is integrally formed with the bottom side 741 of support plate 740 of the fourth member, rotatable document holder 658. Pivotable distal clevis 656 includes two legs, 718 and 719, which project normally from the bottom side 741 of support plate 740. Legs 718 and 719 are formed similarly to legs 670 and 672 having openings 692 and sharing similar prisms 686. However, it is of importance to note that the final mounting of the leg members of pivotable distal clevis 656 offsets the alignment of the parallel leg members 718 and 719 ninety degrees in relation to the mounting of parallel legs 670 and 672 of attachable proximate clevis 652 in order to provide for the attachment of distal disk 687 of the biaxial positioning fitting 654. Thus, as is realized from the previous description, and specifically from FIG. 36, biaxial positioning fitting 654 is provided with a structure which allows it, once it is assembled, to directly engage and cooperate with the first and third members of attachable multi-positionable document holder 650.

The fourth and final essential member, of attachable multi-positionable document holder 650, rotatable document holder member 658 will now be described. As also shown in FIGS. 40 and 41, in association with FIG. 36, rotatable document holder 658 may be considered to include four basic members: 1) a plate-like body 728 having a front side 730, constituting the viewing side of the attachable multi-positionable document holder 650, and an opposite rear side 732; 2) a turntable assembly 735, the turntable having relatively rotatable top and bottom portions 36, 738 and being mounted by the upper side 737 of top portion 36 to the rear side 732 of the plate-like body 728; 3) a support plate 740 having a top side 739 opposite a bottom side 741; 4) and pivotable distal clevis member 656 integrally formed in the bottom side 741 of support plate 740. The top side 739 of support plate 740 is attached to the lower side 743 of bottom portion 738 of turntable 735 by an adhesive means or through self-tapping screws. Additionally, the front or viewing side 730, has a T-slot 734 formed in its top surface. The T-slot 734 is similar in form to that which is illustrated in FIG. 4A.

Additionally, as illustrated in FIG. 41, the present rotatable document holder 658 includes a means to encourage the front viewing side 730 to be maintained in one rotatable position when being rotated about the z-axis. Rear side 732, of body 728, may be fitted with at least one bullet-like protrusion 742 (although more could be provided) which is positioned and aligned to engage one of a series of four stop detents 744 with each quarter revolution of the viewing side 730 of body 728. The stop detents are located at each corner of the top portion 736 of the square shaped turntable assembly 735.

It is also envisioned to provide an alternative form of rotatable document holder for the fourth essential member. FIGS. 42, 42A, 42B and 42C illustrate basic rotatable document holder 746 which is simpler in construction than the prior disclosed embodiment 658 and is more economical to produce using an all plastic fabrication. As shown in FIG. 42, rotatable document holder 746 consists of only three members: a plate-like body 748, a plate-like semi-rigid support plate 750, and a rotational coupling member 752. Body 748 has a front side 754, which constitutes the viewing side of the attachable multi-positionable document holder device, and an opposite rear side 755. The front side 754 has a T-slot 756 formed in its top surface for mounting a mutually engagable document holder 850 (to be discussed further below). Additionally, as shown in FIG. 42A, the front side has opening 760, located at its center, which passes completely through body 748 and which has a recessed shoulder 762 formed flush with back plate 764 of T-slot 756. Rear side 755 of body 748 is provided with a circular groove 766 having opening 760 at its center. Circular groove 766 is also provided with a series of four detents 768 along its trough-like bottom which are spaced apart in ninety degrees intervals. With particular reference to FIG. 42B, it is realized that body 748 of FIG. 42A is provided to cooperate with semi-rigid support plate 750 having frontward side 770 and rearward side 772. Support plate 750 is square in shape and dimensioned to be larger than the diameter of circular groove 766 formed in the rear side 755 of plate-like body 748. Support plate 750 is also provided with an opening, opening 774, which passes completely through its center.

Support member 750 is fitted with a series of four protrusions 776 on its frontward side 770 which are also spaced apart in ninety degree intervals and placed along a circular path that has a common center and diameter equal to the diameter of circular groove 766 of rear side 755 and thus capable of being in direct alignment with circular groove 766 when body 748 and support plate 750 are attached by rotational coupling 752, to be discussed shortly. The present embodiment, being envisioned to be of a plastic material, provides, as shown in FIG. 42C protrusions 776 with a length which will, once the members are assembled, slightly flex support plate 750 when residing at the trough-like bottom of groove 766 of rear side 755. As shown in FIG. 42C, the rearward side 772 of support plate 750 is also fitted with a recessed shoulder 778 at opening 774. Additionally, the rearward side 772 has, integrally formed with it, pivotable distal clevis member 657 with legs 721, 723 protruding normally from its side on each side of opening 774. The next and final member of the present embodiment is rotational coupling 752. As shown in FIG. 42 rotational coupling 752 consists of two cooperating fasteners: shouldered screw 780 and shouldered coupling sleeve 782. Screw 780 is insertable at the front side 754 of body 748 through opening 760 located at the back plate 764 of T-slot 756. It should be noted that the T-slot 756 may be provided, at its center, with an enlargement (not shown) in direct vertical alignment with opening 760 in order to allow for the insertion of screw 780. Alternatively, screw 780 could be integrally formed in the body 748 projecting from rear side 755. Screw 780 cooperates with internally threaded shouldered coupling sleeve 782 which is insertable through opening 774 at the rearward side 772 of support plate 750. Upon the complete engagement of screw 780 and sleeve 782, body 748 is drawn in a face-to-face and slightly flexed relationship with support plate 750. The mutually facing members 748 and 750 are permitted to rotate relative to one another through the cooperation of smooth exterior side 786 of coupling sleeve 782 with smooth side wall 786 of openings 760 and 774 provided in body 748 and support plate 750, respectively. Additionally, through the further cooperative engagement of protrusions 776 with detents 768 located at the bottom of groove 766 the rotatable document holder 746 is encouraged to be fixedly positionable with each quarter turn of viewing side 754. The ability of being fixedly positionable is created through the mutual cooperation of the rotating flexed state of support plate 750 (and its protrusions 776) and the position of detents 768 formed in the rear side of body 748.

Thus the rotatable document holder member 746 shown in FIGS. 42 through 42C may be described as being rotatable about a z-axis of rotation running through the plate-like member 748, with the front or viewing side 754 residing in an x-y coordinate plane that is perpendicular to the z-axis of rotation so that the viewing side 754 of the document holder correspondingly turns within the x-y coordinate plane and is adjusted in position within the x-y coordinate plane.

Upon referring back to the aforesaid description of the essential members of attachable multi-positionable document holder 650, as seen in FIG. 36, it is realized that the assembly of the members is accomplished in the following manner. Basically all that is required is for the first and third members to be connected by the second member, biaxial positioning fitting 654. The first member 652 is attached by inserting proximate disk 683 of biaxial positioning fitting 654 between legs 670 and 672 of proximate clevis 652, and securing the same through the mutual retaining cooperation of openings 685, aperture 694, shaft 695, having retaining head 696 and wingnut 698 previously described. The retaining means, head 696 and wingnut 698 provide for the attachment of members while concurrently permitting proximate disk 683 to pivot about a y-axis of rotation. Alternatively, the retaining means for securing the members could be rivet-like with a sleeve type fitting having crimped ends. Other retaining means may be used as well. The aforementioned retaining means incorporates the frictional position holding assistance of tapered triangular prisms 686 of each inner side 681 of legs 670 and 672 and mutually cooperating tapered prisms 686 located on both sides 689 and 690 of proximate disk 683. It should be noted that the frictional cooperation of tapered leg and disk prisms 686 is just one of many means available for achieving the desired resistance between members. Alternatively, the mutually facing surfaces of the leg and disk members could be provided with other means known in the art, such as: roughened opposing surfaces; a Teflon (TM) washer housed between the opposing surfaces, a circular washer having a cylindrical shape in cross-section housed in, and slightly protruding from, a matched pair of receiving circular grooves; or, as disclosed in U.S. Pat. No. 2,744,498, the upper and lower sides of each disk, 683, 687 may be formed with a series of radial notches that are capable of being indexed with equally spaced radially arranged ribs projecting inwardly from the inner facing planar sides 681, 717 of legs 670, 672 and 718,719, respectively. The just mentioned alternative frictional engagement methods are also envisioned to be improved further through their application with devices which are manufactured using resilient plastic materials.

From the previous description, and upon referring to FIG. 36 once again, it is realized that the final assembly of attachable multi-positionable document holder device 650 is achieved simply by inserting and attaching distal disk 687 of biaxial positioning fitting 654 between legs 718 and 719 of pivotable distal clevis 56 (or legs 721, 723 of rotatable document holder 746 of FIG. 42C). The present assembly, sharing likeness to that previously described for attaching proximate disk 683 of biaxial positioning fitting 654 to attachable proximate clevis 652, incorporates similar retaining and frictional engagement means, namely, shaft 720 having, mutually retaining means, head 724 and wingnut 726. The retaining means, head 724 and wingnut 726 provide for the attachment of members while concurrently permitting body 728 and consequently viewing side 730 of rotatable document holder 658 to pivot about an x-axis of rotation. Consequently, upon joining these final members the assembly of attachable multi-positionable document holder 650 is complete thereby allowing for its attachment to any suitable support member such as multi-positionable document support stand 2 of FIG. 2, the combination of which is shown in FIG. 35.

Upon considering the just mentioned feature which provides for the viewing side 730 to pivot about the x-axis it is desirable to provide a means which will allow for the fixed pivotal positioning of the viewing side at a specific position about the x-axis while still allowing for the additional selective positioning of the viewing side about both the y and z axes. A multi-positionable document holder which incorporates this feature is illustrated in FIG. 43. FIG. 43 illustrates multi-positionable and pivotally fixable document holder 800. A new embodiment, which is formed as an integral part of document holder 800, provides for the ability to easily secure, without tightening, the viewing side at a fixed position about the x-axis and is referred to as rotatable and pivotally fixable document holder member 801. Rotatable and pivotally fixable document holder member 801 includes a modified semi-rigid support member 808 having rack and pinion platform 802. Rack and pinion platform 802 incorporates and adds to the features of two previously discussed support members of rotatable document holder 746, namely, semi-rigid support member 750 having pivotable distal clevis 657 integrally formed therein and projecting from its rearward side 772 as illustrated in FIGS. 42 and 42C.

Figure 43A:
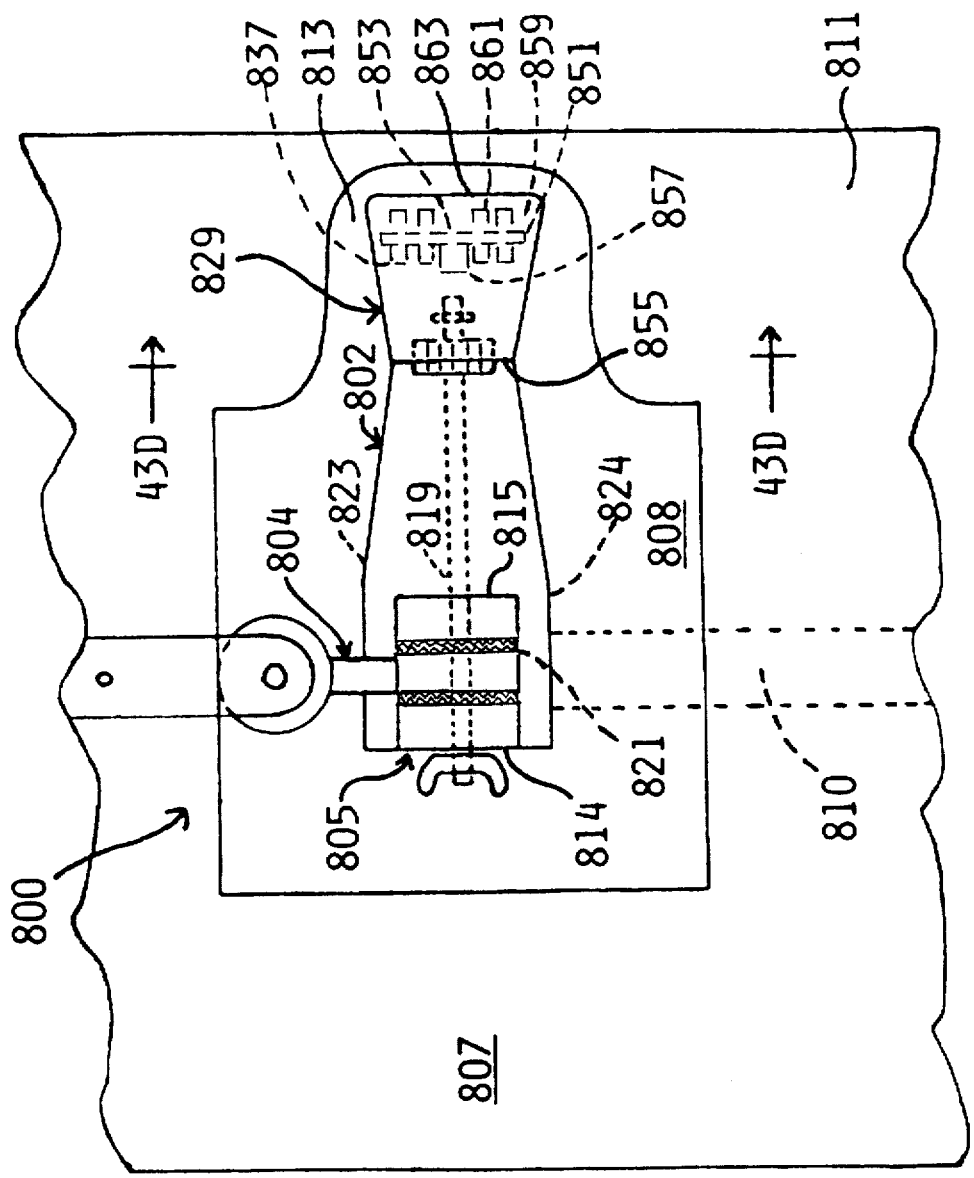
FIG. 43A is a fragmented rear elevational view of the multi-positionable and pivotally fixable document holder shown in FIG. 43.

As shown in FIGS. 43 and 43A multi-positionable and pivotally fixable document holder 800 is a new combination of elements which incorporates many of the features of two previously discussed embodiments, namely, attachable multi-positionable document holder 650 and rotatable document holder member 658 illustrated in FIG. 36. Thus the present embodiment may be considered to have similarly identifiable elements which may be referred to as: attachable proximate clevis 803, biaxial positioning fitting 804, pivotable distal clevis 805, and rotatable and pivotally fixable document holder member 801. Rotatable and pivotally fixable document holder member 801 includes plate-like body 807 and semi-rigid support member 808. Body 807 is formed similarly to previously discussed plate-like body 748 having a viewing side 809 with T-slot 810 integrally formed therein. Similarly, rear side 811 of body 807 and frontward side 812 of semi-rigid support plate 808 are formed as described previously for rear side 755 and frontward side 770 of rotatable holder 756 as illustrated in FIGS. 42A and 42B. The present improved feature is initially observed in FIG. 43 and is identifiable as rack and pinion platform 802. Rack and pinion platform 802 is formed as an integral member of semi-rigid support member 808. For the present discussion, and as shown in FIG. 43A, rack and pinion platform 802 may be considered to be a solid mounted on the rearward side 813 of semi-rigid support member 808. Rearward side 813 is fitted with pivotable distal clevis 805 which includes a pair of legs 814 and 815, with leg 814 being integrally formed with, and projecting normally from, rearward side 813. Leg 815 also projects normally from rearward side 813 being formed as an integral member of rack and pinion platform 802 which in turn is integrally formed with rearward side 813. Being similar, in part, to the previously discussed leg members of distal clevis 657 of rotatable holder 746, legs 14 and 815 may also be fitted with tapered triangular prisms 816 to encourage the frictional engagement of face-to-face members. Legs 814 and 815 also have openings to allow for the attachment of a shaft member. However, the present opening, as realized from FIG. 43C, in association with FIG. 43B, modified opening 817, of leg 814, is formed differently from previously discussed opening 692 of clevis 657. Additionally, modified aperture 818 of modified distal disk 806, is formed differently from previously discussed aperture 710 of distal disk 687. Modified opening 817 and modified aperture 818 are provided to accommodate winged shaft 819 the description of which will be provided shortly.

Figure 43B:
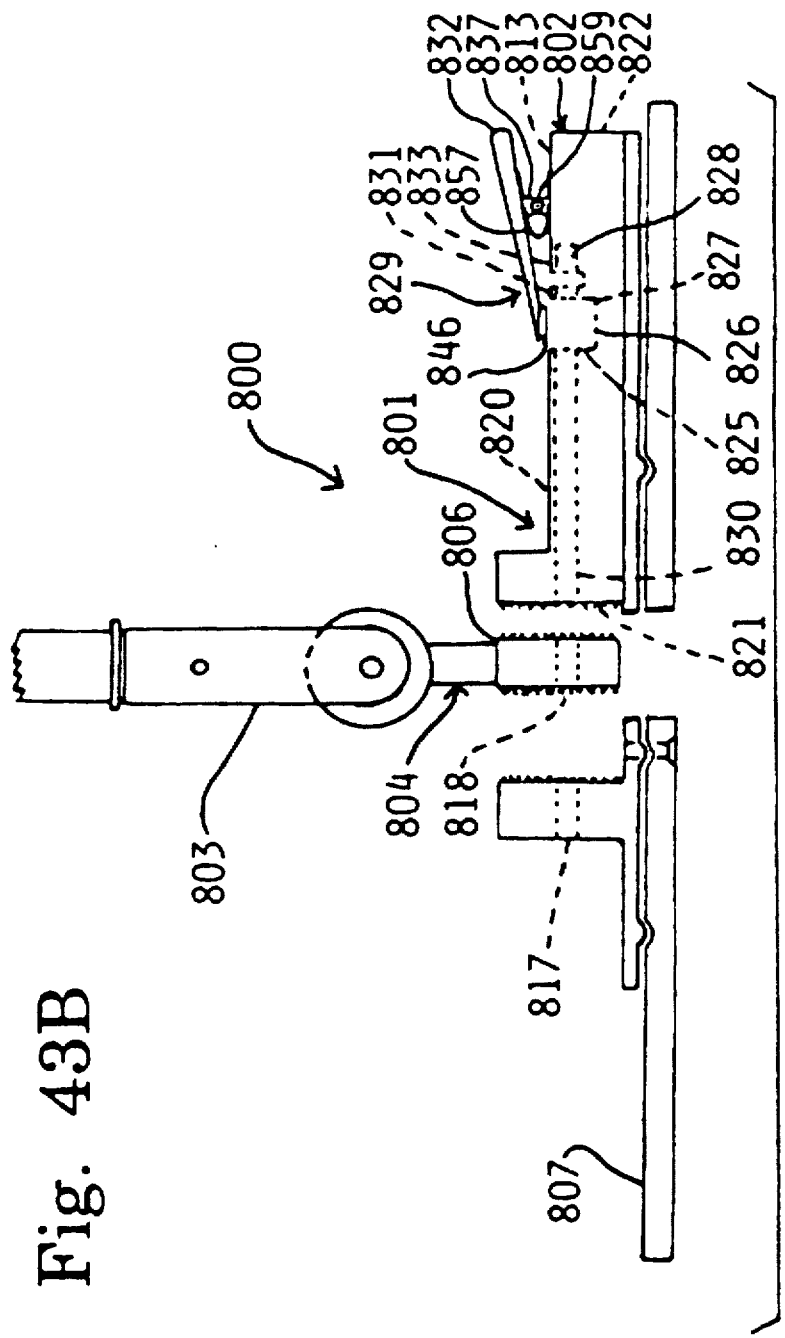
FIG. 43B is an exploded top elevational view of the multi-positionable and pivotally fixable document holder shown in FIG. 43 having its shaft and cooperating fixating means removed from it rack and pinion platform.
Figure 43C:
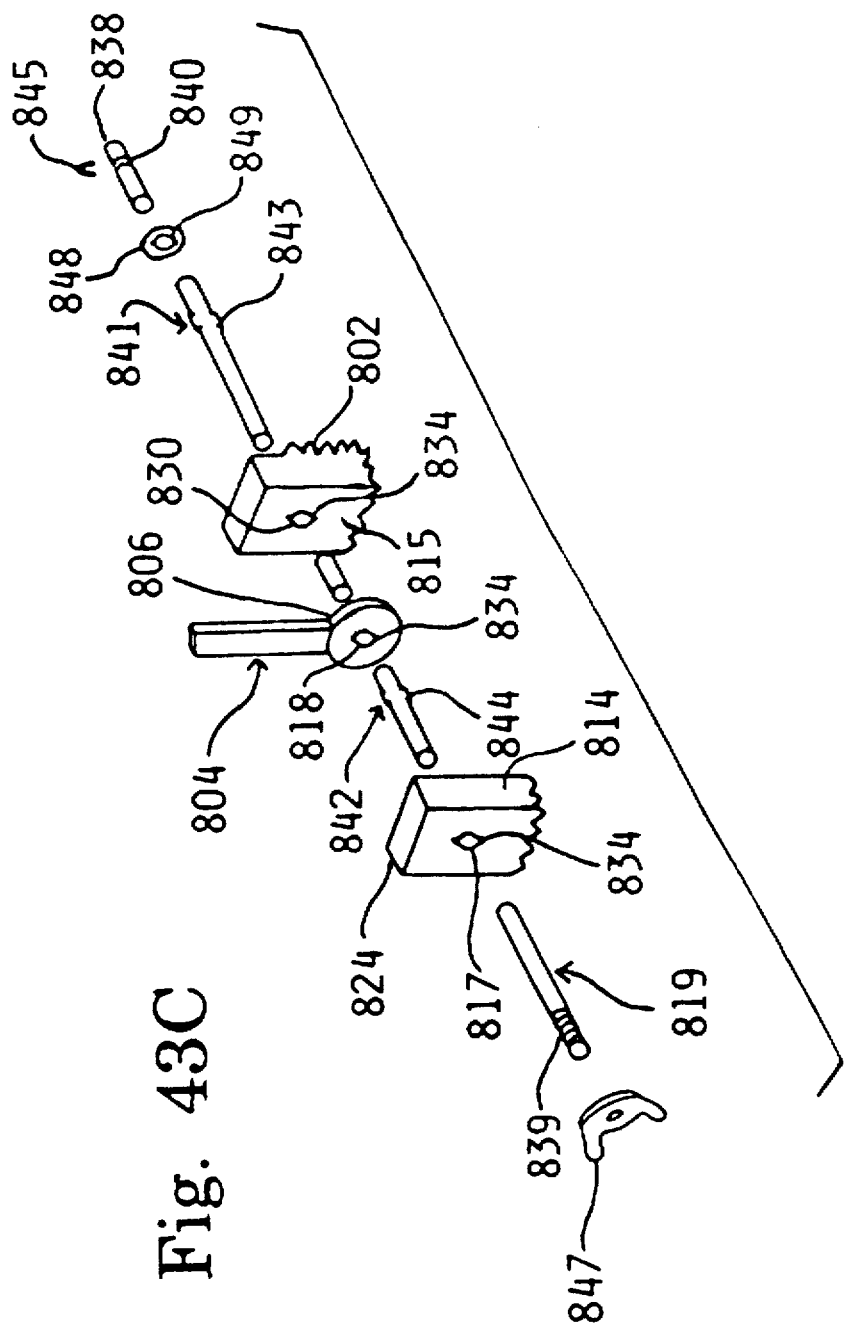
FIG. 43C is a fragmentary exploded perspective view of the winged shaft of the multi-positionable and pivotally fixable document holder shown in FIG. 43, illustrating the engagement of the shaft with its cooperating members, in accordance with a further improved form of the present invention.
Figure 43D:
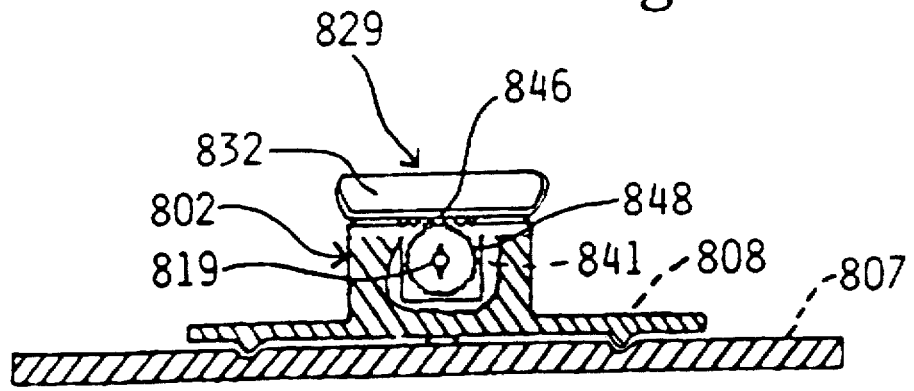
FIG. 43D is a cross-sectional view of the rack and pinion platform shown in FIG. 43A, taken along line 43D—43D of FIG. 43A.

FIG. 43B illustrates an exploded view of multi-positionable and pivotally fixable document holder 800 with both winged shaft 819, and its, yet to be described, cooperating fixating means, removed. FIG. 43B, in association with FIGS. 43A and 43D, presents the features of rack and pinion platform 802. The following description of the present embodiment will be presented in two parts. The first part will describe the main elements of rack and pinion platform 802, except for the form and operation of control lever 829 which will follow in the second part.

Rack and pinion platform 802 is formed from a solid having a reclining L-shape when viewed from the side as shown jointly in FIGS. 43 and 43B. Platform 802 has a raised back side 820. Additionally, platform 802 has a disk facing legged side 821 opposite an outer facing control side 822, and, as seen in FIG. 43A, a pair of opposing tapered longitudinal sides 823 and 824 which intersect oppositely positioned sides 821 and 822. As best shown in FIG. 43B, rack and pinion platform 802 has two separate and distinct trough-like cutouts, gear well 826 and retaining niche 828 formed in the surface of back side 820, being setback slightly from outer facing control side 822. Additionally, rack and pinion platform 802 includes a longitudinal modified bore 830 which travels in a line parallel to, and slightly below, back side 820 from the center of disk facing legged side 821 to a point past retaining niche 828 which is positioned beyond gear well 826. The term "modified" when used with the words opening, bore or aperture describes a circular opening which has a receiving keyway 834 projecting from its circumference in order to accommodate the insertion of the projecting keyed engagement sections of winged shaft 819 as shown in FIG. 43C. Modified bore 830 is aligned to emerge at the approximate center of sides 825, 827 (of gear well 826) and retaining walls 831, 833 (of retaining niche 828). Additionally, as is realized from FIG. 43C, modified opening 817 of leg 824, modified aperture 818 of modified disk 806, and modified bore 830 of platform 802 are each formed with a pair of oppositely disposed keyways 834. Keyways 834 are provided to allow for the insertion and engagement of two separate paired wing-like keyed engagement sections 841 and 842 which protrude from the surface of winged shaft 819. As shown in FIG. 43C, winged shaft 819 may be considered to be a modified version of previously discussed shaft 720. Winged shaft 819 is formed from a cylindrical bar having a retaining end 838 opposite a threaded end 839. As is realized upon referring to FIG. 43C, winged shaft 819 may be considered to have the following integrally formed separate sections: circumferential retaining channel 840, first engagement section 841, second engagement section 842 and threaded end 839 with each section separated by a smooth cylindrical segment of shaft 819. First engagement section 841 includes a pair of similarly formed keys 7 keys 843 which are integrally formed with winged shaft 819 and project from its cylindrical surface in a direction opposite to one another. Likewise, second engagement section 842 also includes a pair of oppositely projecting keys 844. Keys 843 and 844 are in alignment with one another when viewed along the length of the shaft as illustrated in FIG. 43C. The additional members that provide for the insertion and mounting of shaft 819 on rotatable and pivotally fixable holder 801 are: retaining split ring 845, modified pinion 846 and threaded wingnut 847. The participation of modified pinion 846 in providing for the fixable positioning of the instant invention, rotatable and pivotablly fixable document holder 801, about the x-axis will be described shortly.

At this point in the description, and upon referring to FIGS. 43B and 43C, the present embodiment is ready for its initial assembly. The initial assembly of multi-positionable and pivotally fixable document holder 800 is similar to the aforementioned embodiments in connecting attachable proximate clevis 803 to biaxial positioning fitting 808. However, as is realized from the justmentioned, modified distal disk 806 of biaxial fitting 804 is attached to the rotatable and pivotally fixable document holder member 801 through the cooperation and engagement of winged shaft 819. Winged shaft 819 is inserted in modified opening 817 of leg 814 aligning keys 843, 844 with receiving keyway 834. Likewise, shaft 819 passes through modified disk 806t and modified bore 830 aligning keys 843, 844 with keyway 834. As the retaining end 838 of shaft 819 enters gear well 826 it travels through modified pinion opening 849 and continues through walls 827 and 831 with retaining end 838 of shaft 819 being finally housed unrestrained in retaining niche 828.

As is realized upon jointly viewing FIGS. 43B and 43C, once again, upon its complete insertion in bore 830, shaft 819 is retained in the bore through the cooperation of retaining split ring 845. Retaining ring 845 is fitted to circumferential channel 840 of shaft 819 through the cooperation of retaining niche 828 which is accessible at rearward side 813 of rack and pinion platform 802. Accordingly, once shaft 819 is properly seated in the body of platform 802 the first and second engagement sections of shaft 819 are cooperatingly engaged with their receiving members, namely, pinion 846 and distal disk 806, respectively. As realized from FIG. 43, in association with FIG. 43C, the final assembly of shaft 819 on rotatable and pivotally fixable document holder member 801 is achieved through the threadable engagement of threaded end 839 with wingnut 847. Once the members are drawn together, through the tightening of wingnut 847, shaft 819 and pinion 846 are fixedly positioned, with the remaining structure of rotatable holder 801 being frictionally encouraged to cooperate and to be maintained in a specific position about the shaft (the x-axis) unless deliberately pivoted by the operator. This specific frictional positioning ability, however, is improved dramatically by the addition of a final component, control lever 829, to rack and pinion platform 802.

Referring to FIG. 43, in association with FIGS. 43A and 43D, the final component of rack and pinion platform 802, control lever 829 is observed. Control lever 829 is mounted on platform 802 in order to allow for the engagement of rack 846 and pinion 848, the engagement of which will provide for securing a selected pivotal position of rotatable holder 801 about the x-axis. Control lever 829 includes a planar, trapeziodally shaped handle 832, having a top surface 835, opposite a bottom surface 836. As best seen in FIGS. 43 and 43A, bottom surface 836 has a pair of aligned pivotable ears 837, rigidly formed with, and disposed normally from, its surface 836. Each ear 837 has an aperture 851 for the insertion of pintle 853 to be described shortly. Control lever 829 further includes, at bottom surface 836, a rectangularly shaped, toothed rack member 846 parallely mounted on the shorter trapeziodal side 855 and a semi-rigid, planar, U-shaped spring 857 also attached to bottom surface 836. Rack 846 and spring 857 may be attached by such means as glue or screws. Alternatively, rack 846 and spring 857 may be integrally formed in the bottom surface of handle 832. Toothed rack 846 is provided to mesh with the teeth of pinion 848 by means of the following additional structure. As illustrated jointly in FIGS. 43 and 43A, the raised back side 820 of platform 802 is also provided with an aligned pair of rigidly formed, normally disposed ears 859 having apertures 861. Both pairs of ears 837 and 859 are aligned parallel to, and set back from, the longer parallel side 863 of handle 832. Ears 837 and 859 are positioned to allow for their mutual attachment upon insertion of pintle 853 thru apertures 851 and 861. In order to mount handle 832 on platform 802 one simply places paired ears 837 and 859 in alignment with each other, compresses spring 857 against raised back side 820, inserts pintle 853 in apertures 851 and 861, and crimps each end of pintle 853. As is realized from FIGS. 43 and 43D, once rotatable and pivotally fixable document holder 801 is completely assembled, rack 846 constantly engages pinion 848 of fixed winged shaft 819, through the agency of spring 857, thereby securing the pivotal position of viewing side 809 about the x-axis.

Accordingly, viewing side 809 will remain fixed in its pivotal position about the x-axis while still being capable of being rotatable about both the y and z axes unless deliberately disengaged and repositioned by the operator. Such repositioning is accomplished simply by grasping handle 832 and body 807 with one hand and pivoting the viewing side 809 to the desired position about the x-axis. Additionally, the operator has the option of fixating, or preventing, rotation about the y-axis by tightening wingnut 698 of proximate disk 683 discussed earlier. It is also understood that rotation about the z-axis is also capable of being limited through the cooperation of previously discussed detents 768 and protrusions 776. It should be noted that the present embodiment provides for a rotational range of more than 180 degrees in fixing the position of the present holders about the x-axis. The justmentioned ability allows for the viewing side to be secured firmly in a horizontal position whether it be below or above the operator. Consequently, the present device is quite useful for the attachment of an accessory device such as a tray or, alternatively, for being fixed in an overhead position, as called for when viewing documents from a reclining position.

Accordingly, it is can be appreciated that in considering rotatable and pivotally fixable document holder 801 (and, consequently, multi-positionable and pivotally fixable document holder 800,) the rack and pinion feature of the present invention allows for the selective frictional rotation of the viewing side of holders 800 and 801 about both the y and z axes although the pivotal positioning about the x-axis is fixed.

At this point in the disclosure it is important to review some particular elemental relationships of a previously discussed embodiment. In summarizing some important features of attachable multi-positionable document holder 650 it is realized that the holder may be described as having a multiple positioning ability about three axes of rotation even when mounted on a fixed support member. The positioning ability of the attachable multi-positionable document holder 650 when attached to a stationary, fixed support may be described as allowing its viewing side 730 to be independently positionable about three separate, perpendicularly intersecting, axes of rotation. The multi-positionable document holder 650 may be described as permitting its viewing side, which resides in an x-y coordinate plane, to be: independently, and fixedly, positionable in space about a y-axis of rotation; independently, and fixedly, positionable in space about an x-axis of rotation; and independently, and restrainably, positionable about a z-axis of rotation running through the plate-like body 728, (with the front or viewing side 730 residing in an x-y coordinate plane that is perpendicular to the z-axis of rotation) so that the viewing side 730 of the document holder correspondingly turns and is fixedly positionable within the x-y coordinate plane and is extendible in space along the z axis. Consequently, the multi-positionable document holder 650 of the present invention may be described as being positionably adjustable within three planes, namely, the x-y, y-z, and x-z coordinate planes.

It is of further importance to note that the relative position of the axes of rotation, and the immediate supportive location and function of the cooperating members, contribute significantly to the unique positioning capabilities of the present invention. Namely, the support means for the y-axis of rotation (proximate clevis 652) also supports the support means for the x-axis of rotation (distal clevis 656, with the cooperation of biaxial positioning fitting 654) which, in turn, supports the support means for the z-axis of rotation (support plate 740). Additionally, it is of importance to note that since the initial support axis is about the y-axis the additional dependent structure (which is suspended from, and in the immediacy of, proximate clevis 652) is encouraged to remain at its location about the y-axis through the mutual cooperation of the horizontally disposed legs 670 and 672 of proximate clevis 652 and the force of gravity. The just mentioned structure requires little, if any, adjustment to remain in place about the y-axis when supporting the additional axes of rotation of the present invention.

The following characteristics also apply to either one of the previously discussed multi-positionable holders (holder 650, or holder 800) when mounted at a fixed, stationary, location: the distance between the y-axis of rotation and the x-axis of rotation remains the same, or constant, for an infinite number of supporting positions; the distance between the z-axis of rotation and the x-axis of rotation also remains the same, or constant, for an infinite number of supporting positions.

It naturally follows from the aforementioned that the positioning ability of the multi-positionable document holders of the instant invention will be increased even further upon attachment to a movable, spatially projecting support arm like those disclosed earlier in the multi-positionable stands of the present invention.

It is of further interest to note that a holder such as attachable multi-positionable document holder 650 is capable of cooperating with an assortment of various document holders of the type disclosed by applicant in various pending and previously issued patents. The following patents (Hegarty), which are herein incorporated by reference, disclose various types of document holders which are capable of cooperating with attachable multi-positionable document holder 650: U.S. Pat. Nos. 4,787,595; 4,925,145; and 4,925,146.

Figure 44:
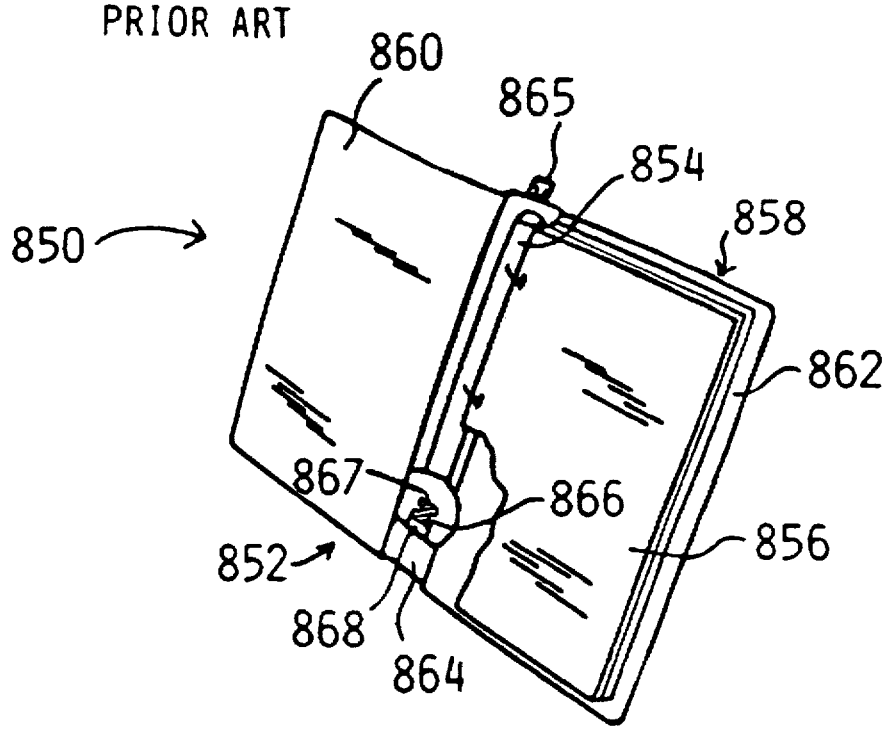
FIG. 44 is a front perspective of a prior art mountable loose-leaf binder type document holder which engagably cooperates with the attachable multi-positionable document holder of the present invention shown in FIG. 36.

FIG. 44 illustrates an example of a previously disclosed prior art document holder 850. A conventional loose-leaf binder 852, having a binder mechanism 854 to hold pages or document 856, and a jacket 858 having a front and back cover 860, 862 with the binder mechanism 854 mounted on the inside surface of the jacket at its spine 864, is modified to further include an elongated rail 865 mounted on the outside surface of the jacket 858 at or near the spine 864. The elongated rail 865 has a T-shape in cross-section with narrowed and widened portions 866, 867 that correspond in dimensions to the widened and narrowed portions 56, 54 (FIG. 4A) of the T-slot formed in the viewing side 730 of multi-positionable holder 650 which is illustrated in FIG. 36. The T-rail 865 may include a back plate 868 mounted on the narrowed portion 866 and spaced from its widened portion 867 for mounting the rail on the loose-leaf binder jacket, such as by gluing, fasteners or other means. Alternatively, the elongated T-rail 865 may be integrally formed with the jacket 858 when the document holder is made.

As disclosed in the aforementioned patents the looseleaf binder type document holder 850 of FIG. 44 is removably mountable on the viewing side of a document holder, like that of multi-positionable holder 650 illustrated in FIGS. 36 and 40, by sliding its T-rail 865 through the exposed end of T-slot 734 until the document holder is centered on the viewing side 730 or abuts the terminated end of the T-slot 734. Thus the mounted document holder 850 may be repositioned by the reader to different viewing dispositions simply by rotating and/or repositioning multi-positionable document holder 650.

Figure 45A:
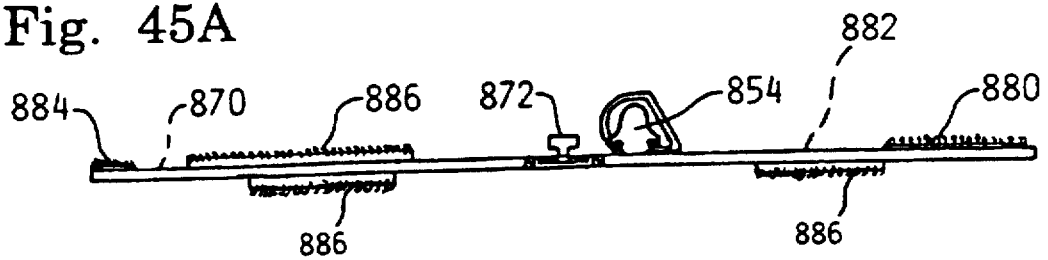
FIG. 45A is a side elevational view of the interiorly modified document holder shown in FIG. 45.
Figure 45B:
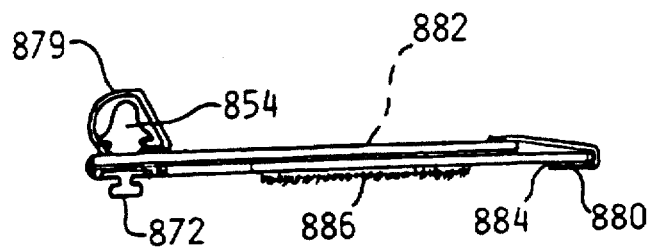
FIG. 45B is a view, like that of FIG. 45A, illustrating the folded position of the modified document holder's cover which provides for the cooperative engagement of the modified holder with the attachable multi-positionable document holder shown in FIG. 36.

In yet another form of the present invention an improved type of document holder is provided. The present document holder 869 is an improvement over document holder 850 of FIG. 44. The improved embodiment provides for a mountable loose-leaf binder which is not only fitted with a cooperating engaging member but also allows for a conventional surface on the cover's exterior. FIG. 45 illustrates an interiorly modified document holder 869 of the loose-leaf binder type which is provided with a cooperating engagement member fitted on the inside of the holder's cover. As shown in FIGS. 45 and 45A, the document holder is of the type which has its binder mechanism 854 mounted on the inner back side 882 of the holder's cover 871. Consequently, it is desirable to affix a segmented T-rail 872 on the inner front side 870 of the holder's cover along its spine 874. The T-rail 872 is divided into two sections 876 and 877 with a common back plate 878. The two sections are positioned so that their respective ends are in a line which lies between a pair of the binder rings 879. Consequently, the sections 876 and 877 are not aligned with the binder's rings 879 and allow the cover to close without interfering with the rings 879. In order to maintain the cover in an open position a Velcro (TM) dual faced fastener 880 is attached to the inside of the back cover 882 with a mating hook and loop fastener 884 on the inside of the front cover 870. As shown in FIG. 45B, the fastener holds the cover open, and positions the segmented T-rail 872 for mounting on any of the previously disclosed stands having a slotted viewing side which cooperates with mutually engagable document holders. Additionally, it is understood that the present embodiment may include a latching means which allows for the further engagement of the cooperating members. The details for such latching means are disclosed in previous and pending applications of a present applicant, the disclosures of which have been previously referred to, and which are herein incorporated by reference to U.S. Pat. No. 4,925,146. Alternatively, the document holder 869 may be provided with an attachable Velcro (TM) 886 type cooperative engaging means on the inside of its front cover as also illustrated in FIG. 45. The attachable Velcro (TM) hook and loop fastener 886 engaging means cooperates with a viewing side fitted with a receiving Velcro (TM) hook an loop fastener 932 engaging means for mounting a supporting document holder, such as multipurpose and multi-positionable document holder 4 illustrated in FIG. 1.

At this time, an even further improved document support device is herein disclosed. The incorporation of many of the features of the present multi-purpose document support stand 890 with the above mentioned forms of the present invention provides for an assortment of various document support devices which are extremely versatile and unique.

Figure 46C:
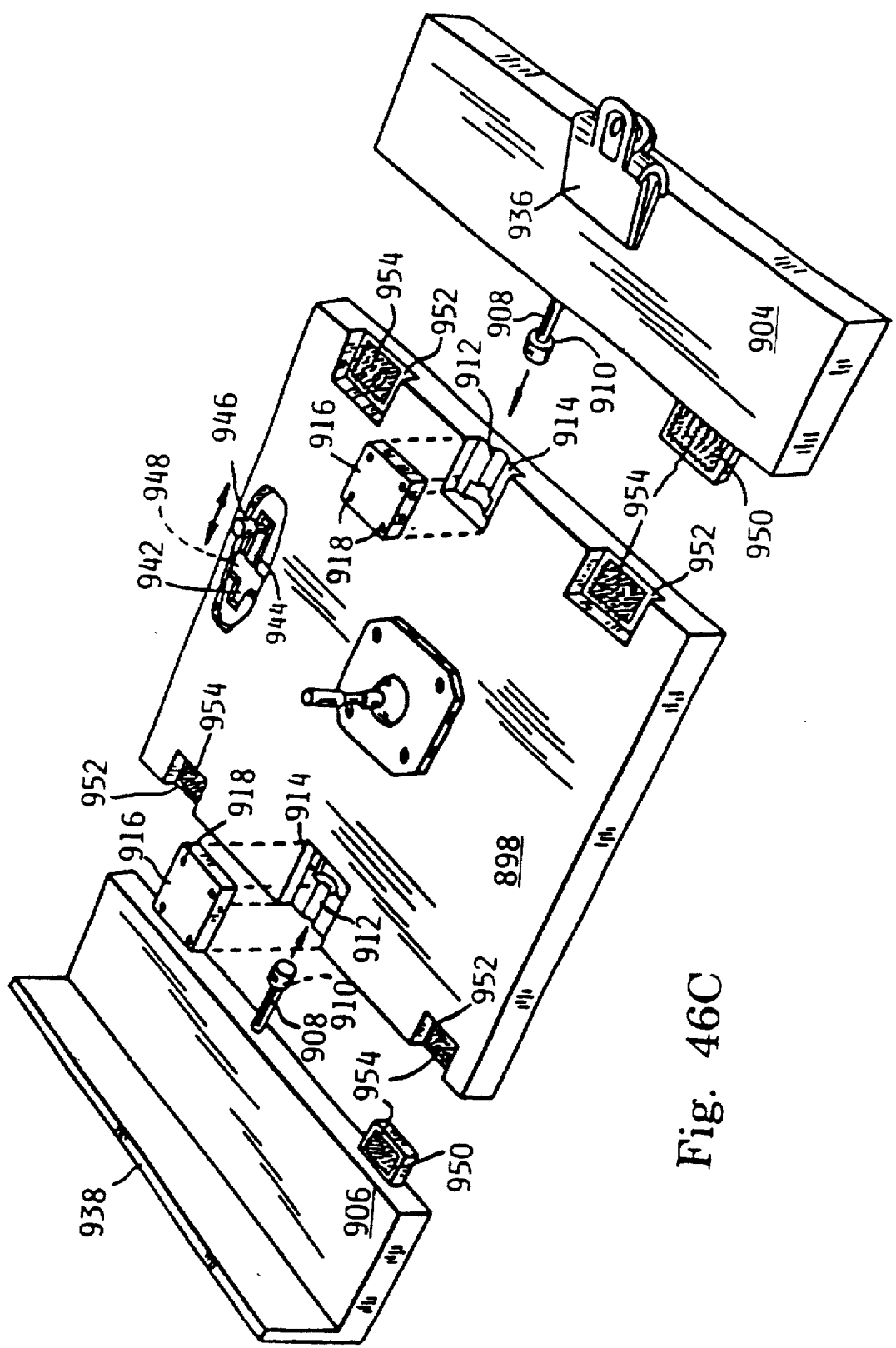
FIG. 46C is a partially exploded view, in perspective and partially broken away, of a portion of the document support stand of the present invention shown in FIG. 46.

Referring to FIG. 46, in association with FIGS. 46A, 46B and 46C, of the drawings, it will be seen that a multi-purpose document support stand 890, constructed in accordance with another form of the present invention, includes a planar, plate-like body 892 which is rectangular in form. The planar, plate-like body 892 includes a front viewing side 894 and a rear side 896 opposite the front viewing side. The plate-like body 892 of the multi-purpose stand is formed in a plurality of sections, including a main section 898 having opposite first and second lateral sides 900, 902 and at least one side section. Preferably, the plate-like body includes first and second side sections 904, 906. The first side section 904 is mounted on the first lateral side 900 of the main section 898 and is rotatable with respect to the main section. Similarly, the second side section 906 is mounted on the second lateral side 902 of the main section and is rotatable with respect to the main section. Each of the main section 898, first side section 904, and second side section 906, includes a front side and a rear side opposite the front side.

Any mechanism which allows the side sections 904, 906 to be rotatably mounted on the main section 898 is suitable for use. For example, as shown in FIG. 46C, each side section may include a pin 908 extending from its lateral side adjacent to the respective first and second lateral sides of the main section 898. The pins 908 may include an enlarged free end 910 so that they may be press fitted into and captively received by a bore 912 formed in the lateral edges of the main section. Alternatively, the receiving bores 912 may be at least partially formed in a recessed portion 914 of the rear side of the main section. The pins 908 are at least partially received by the bores 912 and held in place by blocks 916 mounted in recesses defined by portions 914 and secured to the main section by screws 918 or the like.

As shown in FIGS. 1, the body 892 of the present embodiment may be adapted to be supported by previously described stand 2, as well as other support devices described herein. Alternatively, the body may be supported by a wide selection of currently available support devices including that which is described in copending application entitled Multi-Purpose Document Support Stand, filed Jan. 17, 1991, and which is herein incorporated by reference. The detailed description which is disclosed in the forenamed copending application is herein included in, for the most part, and may be identified as that which is disclosed in relation to the present embodiment being described in FIGS. 46, 46A, 46B, and 46C.

As shown in FIGS. 46 and 46A, the document support stand includes a conventional, double-arm multi-function support bracket 920. Such brackets are typically used for supporting a swing arm type lamp aver a desk top, drafting table or the like, and are usually mounted at the edge of the desk or table. Such a support bracket 920 is used on the swing-arm lamp Model No. 173-7500, manufactured by Electrix, Inc. Such a support arm is disclosed in U.S. Pat. No. 4,925,146, mentioned previously.

As is realized from FIG. 46A, the planar, plate-like body 892 is mounted on the support bracket 920, preferably at the center of the rear side 896 of the main section, in the manner disclosed in the aforementioned patent. In this manner, a document holder, such as the loose-leaf binder type document holders 850, or 869, previously discussed and illustrated in FIGS. 44 and 45, respectively, or the like, secured to the document support stand may be suspended above the workplace and may be adjusted both in viewing angle and in its rotation. The support bracket 920 allows the plate-like body 892 to be rotated and positioned in a selectable angular disposition about a z-axis of rotation in order to position the viewing side 894 and a document holder, such as holder 850, mounted on the viewing side in one of a number of selectable viewing positions. The viewing side of the plate-like body 892 resides in an x-y coordinate plane, which is perpendicular to the z-axis of rotation. The support bracket 920 allows the plate-like body to be rotated about the z-axis of rotation so that the viewing side of the body may be correspondingly turned within the x-y coordinate plane and adjusted in position within the x-y coordinate plane.

Alternatively, as illustrated by FIG. 46B of the drawings, the document support stand may include a supporting device in the form of a triangular or pyramidal block 922 or an L-shaped bracket (not shown), to allow the document support stand to be mounted on a desk top, drafting table or the like. In such a case, the document support stand would include a pinion 924 and a flange 926 mounted on an end of the pinion to which the rear side 896 of the main section 898 of the plate-like body is mounted. The pinion 924 is rotatably received in a bore 928 formed in the desk top supporting device 922 to allow the plate-like body 892 to be rotated with respect to the supporting device.

Each of the first side section 904, main section 898 and second side section 906 includes various types of mounting mechanisms for removably mounting a document holder 850, such as a loose-leaf binder or the like, on the plate-like body. For example, the first side section 904 includes one or more Velcro (TM) hook and loop fastening strips 932 disposed on its front side. Similarly, the main section 898 and the second side section 906 includes such fasteners 932 mounted on their front sides. Accordingly, when the first and second side sections 904, 906 are positioned in relation to the main section 898 such that the front sides of all three sections constitute the front viewing side 894 of the plate-like body, a series of spaced apart, parallel hook and loop fastening strips 932 are disposed across the viewing side of the plate-like body as shown in FIG. 46.

The hook and loop fasteners 932 will allow a document holder 850, such as a loose-leaf binder or the like, having correspondingly mating hook and loop fasteners 934 mounted on the front or rear jacket or spine of the document holder to be removably mounted on the front viewing side 894 of the document support stand and held in place on the front side in various dispositions that the plate-like body 892 is placed for viewing by the user. Alternatively, mating hook and loop fasteners may be mounted on the inside of the holder, such as fasteners 886 being placed on the inside front cover 870 of modified holder 869, as previously discussed and as illustrated in FIG. 45. The plurality of hook and loop fastening strips 932 disposed across the front viewing side of the plate-like body will allow various sized document holders to be mounted on the document support stand.

Upon viewing FIG. 46, in association with FIG. 46C, it is observed that a second type of mounting device is secured to the rear side of the first side section 904. This second type of mounting device may be a resilient or spring biased clip 936 or the like. The first side section 904 may be rotated such that its rear side constitutes part of the front viewing side 894 of the plate-like body 892 so that the spring clip 936 is exposed and situated on the front viewing side of the plate-like body. Accordingly, a user may attach a document, or document holder, to the front viewing side of the plate-like body by using the spring clip.

Similarly, the second side section 906 may be rotated with respect to the main section 898 of the plate-like body such that another form of a mounting device, such as a support ledge 938 for a document holder formed as a plate mounted on and protruding normally from the rear side of the second side section, constitutes part of the front viewing side 894 of the plate-like body 892. Accordingly, the user of the document stand may rest a document holder on the support ledge 938, if desired.

The main section 898 of the plate-like body preferably includes another form of a mounting device for removably mounting a document holder, for example, document holder 850 of FIG. 44, on the body. Such a mounting device is in the form of an elongated bracket which is C-shaped in cross-section, as also previously referred to and illustrated in FIG. 4, which bracket defines a T-shaped slot having at least one exposed open end. The C-bracket is mounted on the front side of the main section. Alternatively, and as shown in FIG. 46, the main section 898 may itself define a slot 939 by forming the same directly in the thickness of the main section 898 on the front side of the main section. The slots and slot defining structures such as the C-bracket are disclosed in the before mentioned of the present application and in the aforementioned U.S. Pat. No. 4,925,146.

The C-bracket or other structure which defines the T-slot may include mutually diverging sides 940 near the open end of the slot to facilitate the insertion of a cooperating elongated rail member 865 formed with a T-shape in cross-section. The T-rail 865 constitutes part of the document holder, and may be mounted on the spine or jacket of the document holder, such as the loose-leaf binder-type document holder 850 shown in FIG. 44. Alternatively, as shown in FIG. 45, a segmented T-rail 872 may be placed on the inner side of the holder's cover as shown in document holder 869. The T-rail engaging means of document holder 850, or 869, is received by the T-slot 939 of the plate-like body 892 so that the document holder may be removably mounted on the front viewing side 894 of the plate-like body and positioned in various angular dispositions by the user.

To ensure that a document holder 850, or 869, having a T-rail and mounted on the main section of the plate-like body 892 in the T-slot 939 remains secured to the document support stand, that is, to help prevent the document holder from being removed from the stand or inadvertently sliding out of the open end of the slot 939, the document support stand may include a latch for selectively opening and closing the open end of the slot. More specifically, as shown in FIG. 46C, in association with FIG. 46, a channel 942 is formed in the main section 898 of the plate-like body and extends transversely with respect to the T-slot 939 formed in the main section. The channel 942 may extend across the slot, and houses an elongated bar 944 which slides in the channel and which may be selectively positioned across the slot 939 near its open end. A knob 946 mounted on the elongated bar 944 extends through a slotted opening 948 formed in the rear side 896 of the main section. The user may grasp the knob to slide the latch bar 944 to close off the open end of the T-slot 939. The latch mechanism, which may be frictionally fitted, will prevent the T-rail 865 of a document holder from inadvertently sliding out of the open end of the T-slot formed in the plate-like body 892. The justmentioned latching mechanism is an alternative to the previously referred to latching cooperating means disclosed in U.S. Pat. No. 4,925, 146 (Hegarty) which may also be incorporated in the justmentioned embodiment.

To prevent each of the first and second side sections 904, 906 from rotating 360 degrees with respect to the main body section 898, each side section includes a tab 950 extending outwardly from a lateral side thereof which is adjacent to the respective first and second lateral sides 900, 902 of the main section, and the main section includes recessed portions 952 of its rear side surface to define recesses that are dimensioned and positioned with respect to the tabs 950 of the first and second side sections 904, 906 so as to receive the tabs as the side sections are rotated with respect to the main section of the plate-like body. The tabs 950 and cooperating recessed portions 952 of the main section allow the side sections 904, 906 to be rotated 180 degrees with respect to the main section 898 so that either the front or rear side of each side section may be positioned with respect to the main section so as to constitute a portion of the front viewing side 894 of the plate-like body 892. Each tab 950 and each recessed portion 952 may further include Velcro (TM) hook and loop fasteners 954 mounted thereon to ensure that the first and second side sections 904, 906 are held in a desired position with respect to the main section 898.

As is evident from the structures described above and shown in the drawings, the multi-purpose document support stand 890 is mechanically simple, with few components, and is easily manufactured. The stand is readily available to hold a document, or a wide assortment of cooperating document holders, such as conventional or modified loose-leaf binders, books, or the like, in a variety of ways. Each of the various types of mounting mechanisms provided on the document support stand may be individually utilized and repositioned so as not to interfere with use of another mounting device on the stand. As can be seen from the drawings, six mounting mechanisms, four of which are different in type, are provided on the multi-purpose document support stand.

The features of the aforementioned multi-purpose stand 890 may be incorporated in many of the stands of the present invention. As shown in FIGS. 47 and 47A, when the features of the body 892 of multi-purpose stand 890 are incorporated in the structure of the herein and previously described relocatable copyholder 522 of FIG. 28, a new embodiment, symmetrically functional, relocatable multi-purpose copyholder 956 is created. By providing top and bottom rotatable side sections 905 and 907 respectively, with suitable mounting means, such as bias clip 936 and support ledge 938, symmetrically relocatable multi-purpose copyholder 956 is created having (like previously disclosed symmetrical copyholder 549 illustrated in FIG. 29) front, first mounting side 957 opposite rear, second mounting side 959. As is realized from FIGS. 47 and 47A the bias clip 936 and/or the support ledge 938 may be repositioned from either of the first or second mounting sides 957 or 959 respectively to the other of the second or first mounting sides 957 or 959 respectively. Relocatable multi-purpose copyholder 956, being somewhat similar to previously described relocatable copyholder 522, may incorporate a T-slot 958 within each of its mounting sides. The displacement of the mounting means 936 and 938 to either mounting side 957 or 959 relative to the fixed position of the support flange 960 allows for the use of the device when placed to the left or to the right of the viewer.

Figure 48:
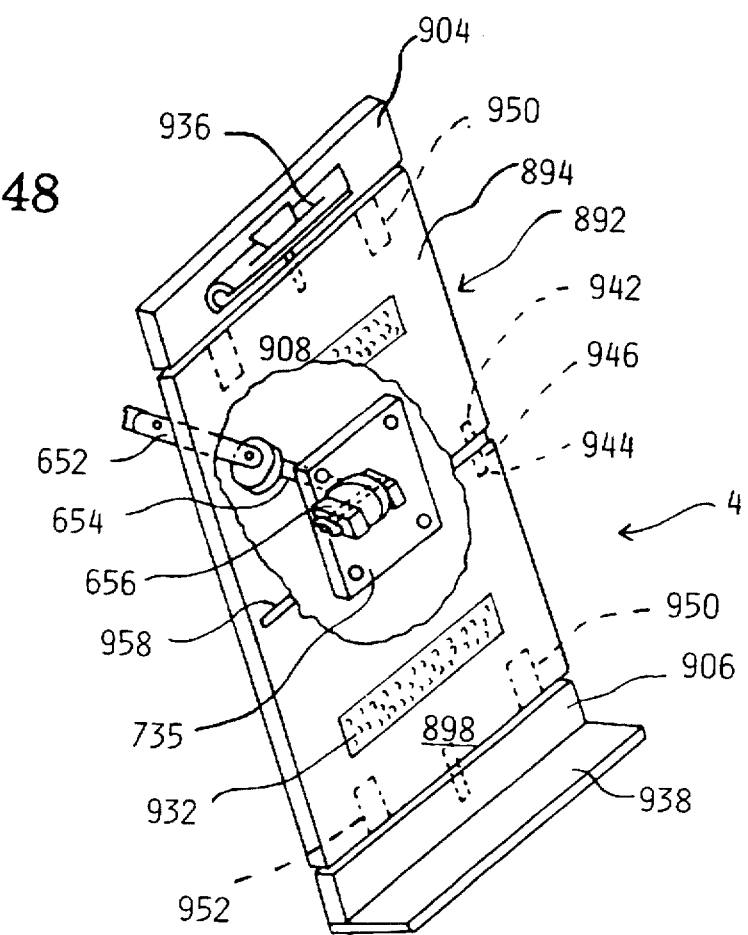
FIG. 48 is a perspective view of the attachable multi-purpose and multi-positionable document holder illustrated in FIG. 1.

Additionally, as shown in FIG. 48, when much of the structure of body 892 of multi-purpose stand 890 is combined with many of the features and structure of the herein and previously described attachable multi-positionable document holder 650, another new embodiment, attachable multi-purpose and multi-positionable document holder 4 is created. FIG. 48 utilizes the same reference numerals as those previously discussed in embodiments 650 and 890 in order to illustrate the fact that the present embodiment, attachable multi-purpose and multi-positionable document holder 4 incorporates these features in creating a new combination of elements that provides for a rather versatile support device. It is realized from the aforementioned, and in association with FIG. 1, that the present embodiment not only provides for the symmetrical spatial positioning of documents but also provides for the rotatable mounting and positioning of a wide variety for cooperatingly engagable document holders as well.

In consideration of the aforementioned it is realized that the present invention allows for the creation of a wide variety of document support stands and document holders having means of support and positioning ability which are significant improvements over the current state of the art for supporting documents. The symmetrical features which have been disclosed herein provide for document support stands which may be described as being: symmetrically formed, symmetrically positionable, and, symmetrically functional.

As is evident from the structures described and shown in the drawings, the document support stands are mechanically simple, with few components, and capable of being easily manufactured, with each adapted to receive and hold a document, or document holder in a number of viewing positions. Though the document support stands of the present invention are envisioned to be highly suitable for an all plastic fabrication they may be also be formed from other materials such as sheet metal or wood.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. In combination:
    a support body, the support body having a mounting side, means for supporting the mounting side;
    a slidably engageable document holder, the document holder including a support arm;
    means for removably mounting and slidably engaging the document holder or the support body, the document holder mounting means being situated at the body at the mounting side thereof;
    the document holder including means for engageably cooperating with the document holder mounting means of the support body;
    wherein one of the document holder mounting means of the body and the body engaging means of the document holder includes a rail member having a widened portion and a narrowed portion; and wherein the other of the document holder mounting means of the body and the body engaging means of the document holder includes means defining an elongated slot, the slot being slidably engageable with the rail member when mounting the document holder on the support body;
    the document holder including means for supporting a document, means for positioning the document support means about three axes of rotation, the three axes being an x-axis, a y-axis, and a z-axis of rotation;
    whereby the combination is adapted to provide for the support and selective positioning of a document for viewing.

2. A combination as defined by claim 1, which further includes means for extending and retracting the location of the means for supporting a document.

3. A combination as defined by claim 1, wherein the support arm has a distal end, and wherein the means for positioning the document support means includes distal positioning means for rotating the means for supporting a document about at least two axes of rotation, proximate positioning means for rotating the distal positioning means about at least one axis of rotation, the distal positioning means being connected to the proximate positioning means, the proximate positioning means being supported by proximate support means, said proximate support means being attached to the distal end of the support arm.

4. A combination as defined by claim 1, wherein the means for removably mounting and slidably engaging the document holder on the support body includes a plurality of different locations for mounting the document holder on the body.

5. A combination as defined by claim 1, wherein at least one of the widened and narrowed portions of the rail member is circular in shape.

6. A combination as defined by claim 1, wherein the support body includes a vertically disposed panel, the panel having a bottom edge, the mounting side residing in a front side of the vertical panel, and a horizontally disposed panel normally attached to the bottom edge of the vertical panel; and wherein further the means for removably mounting and slidably engaging the document holder on the support body includes a plurality of different locations for mounting the document holder on the body; and wherein each of the widened and narrowed portions of the rail member is circular in shape.

7. A combination as defined by claim 1, wherein the mounting side has a parallel opposite rear side, the rear side including means for adhering to a vertically disposed surface.

8. A document support stand for mounting a document holder at a plurality of different locations through the cooperation of oppositely disposed mounting means, which comprises:

a support body, the support body having a first mounting side, the first mounting side disposed in a first direction, a second mounting side, the second mounting side disposed in a second direction, the first and second directions being opposite to one another, means for supporting the first and second mounting sides; and a document holder, the document holder including a slidably engageable support arm; and first means for removably mounting and slidably engaging the support arm on the support body at a first location, the first support arm mounting means being situated at the body at the first mounting side thereof to allow the support arm to be mounted on the first mounting side; and second means for removably mounting and slidably engaging the support arm on the support body at a second location, the second support arm mounting means being situated at the body at the second mounting side thereof to allow the support arm to be mounted on the second mounting side; and the support arm including means for engageably cooperating with the first and second support arm mounting means of the support body; and the document holder including means for supporting a document;

whereby the document support stand is adapted to allow for the slidable mounting of the support arm at a plurality of oppositely disposed locations on the support body so that the document holder may be selectively mounted on either side of the support body.

9. A document support stand as defined by claim 8, wherein one of the arm mounting means of the body and the body engaging means of the arm includes a rail member having a widened portion and a narrowed portion; and wherein the other of the arm mounting means of the body and the body engaging means of the arm includes means defining an elongated slot, the slot being slidably engageable with the rail member when mounting the support arm on the support body.

10. A document support stand as defined by claim 9, wherein the document holder further includes means for positioning the document support means about a plurality of axes of rotation.

11. A document support stand as defined by claim 10, which further includes means for extending and retracting the location of the means for supporting a document.

12. A document support stand as defined by claim 10, wherein the support arm has a distal end, and wherein further the means for positioning the document support means includes distal positioning means for rotating the means for supporting a document about at least two axes of rotation and proximate positioning means for rotating the distal positioning means about at least one axis of rotation, the distal positioning means being connected to the proximate positioning means, the proximate positioning means being supported by proximate support means, said proximate support means being attached to the distal end of the support arm.

13. A document support stand as defined by claim 12, which further includes means for extending and retracting the location of the means for supporting a document.

14. A document support stand as defined by claim 13, wherein at least one of the widened and narrowed portions of the rail member is circular in shape.

15. A document support stand having two oppositely disposed mounting means for selectively mounting the location of a document holder support arm, and including means for selectively extending or retracting the projectable location of an attached document holder, which comprises:

a support body, the support body having a first mounting side, the first mounting side disposed in a first direction, a second mounting side, the second mounting side disposed in a second direction, the first and second directions being opposite to one another, means for supporting the first and second mounting sides; and a slidably engageable support arm, the support arm including means for attaching a document holder; and first means for removably mounting and slidably engaging the support arm on the support body at a first location, the first support arm mounting means being situated at the body at the first mounting side thereof; and second means for removably mounting and slidably engaging the support arm on the support body at a second location, the second support arm mounting means being situated at the body at the second mounting side thereof; and the support arm including means for engageably cooperating with the first and second support arm mounting means of the body; and wherein the combination further includes means for extending and retracting the document holder attaching means to a plurality of projectable locations; and an attachable document holder, the document holder including means for supporting a document, means for engaging the document holder attaching means of the support arm;

whereby the document support stand is adapted to allow not only for the selective mounting of a document holder to either side of a support body having two oppositely disposed mounting sides but to also allow for its selective positioning to a plurality of projected locations.

16. A document support stand as defined by claim 15, wherein one of the arm mounting means of the body and the body engaging means of the arm includes a rail member having a widened portion and a narrowed portion; and wherein the other of the arm mounting means of the body and the body engaging means of the arm includes means defining an elongated slot, the slot being slidably engageable with the rail member when mounting the support arm on the support body.

17. A document support stand as defined by claim 16, wherein the means for supporting a document includes means for positioning the document support means about three axes of rotation, the three axes being an x-axis, a y-axis, and a z-axis of rotation.

18. A document support stand as defined by claim 17, wherein at least one of the widened and narrowed portions of the rail member is circular in shape.

19. In combination:
   a support body, the body having a vertically disposed panel member, the panel member having a first vertical edge, a second vertical edge, a bottom horizontal edge, a mounting side, the mounting side residing at a front side of the panel member, the front side including a substantially planar surface, means for supporting the panel member;
   a joined support arm, the support arm including a rigid joining member, the joining member including a base member, the base member having a front side, a support bracket, the support bracket projecting outwardly from the front side of the base member;
   means for removably mounting and slidably engaging the joined support arm on the body, the arm mounting means being situated on the support body at the mounting side thereof;
   the arm mounting means including a plurality of support locations, said support locations residing along a transversal, said transversal intersecting the first and second vertical edges of the vertically disposed panel member;
   the joined support arm having means residing at the base member for slidably engaging the joined arm mounting means of the support body;
   the joined support arm further including means for attaching a document holder;
   an attachable document holder, the document holder including means for supporting a document, means for engaging the document holder attaching means of the joined support arm, thereby allowing the joined support arm and attached document holder to cooperate with the support body in positioning a document for viewing.

20. A combination as defined by claim 19, which further comprises means for extending and retracting the document holder attaching means of the joined support arm.

21. A combination as defined by claim 20, wherein the document holder further includes means for positioning the document support means about three axes of rotation, the three axes being an x-axis, a y-axis, and a z-axis of rotation.

22. A combination as defined by claim 21, wherein one of the arm mounting means of the body and the body engaging means of the arm includes a rail member having a widened portion and a narrowed portion; and wherein the other of the arm mounting means of the body and the body engaging means of the arm includes means defining an elongated slot, the slot being slidably engageable with the rail member when mounting the support arm on the support body.

23. A combination as defined by claim 22, wherein at least one of the widened and narrowed portions of the rail member is circular in shape.

24. A combination as defined by claim 23, wherein the mounting side has a parallel opposite rear side, the rear side including means for adhering to a vertically disposed surface.

25. A symmetrically functional document support stand, which comprises:
   a support body, the body having a first mounting side, means for supporting the mounting side, the mounting side disposed in a first, outer facing direction; and
   a slidably engageable support arm, the support arm having a distal end, means for attaching a document holder to the distal end of the support arm; and
   means for removably mounting and slidably engaging the support arm on the support body, the support arm mounting means being situated on the body at the first mounting side thereof to allow the support arm to be mounted on the mounting side and to dispose the distal end of the arm in a first, forward facing direction;
   the support arm including means for engageably cooperating with the mounting means of the support body; and
   an attachable document holder, the document holder including means for supporting documents, means for engaging the document holder attaching means of the support arm; and
   wherein the documents support stand further comprises means for disposing the distal end of the support arm in a second, forward facing direction when the support arm is selectively mounted on the support body in a second position with the second position of the support arm being in mirror image to the first position, the first and second forward facing directions being essentially normal to the first, outer facing direction of the mounting side, said first and second positions demonstrating symmetrical functionability.

26. A document support stand, which comprises:
   a support body; and
   a slidably engageable support arm, the support arm having means for attaching a document holder; and
   means for removably mounting and slidably engaging the support arm on the support body, the support arm mounting means being situated at the body to allow the support arm to be mounted thereon;
   the support arm including means for engageably cooperating with the arm mounting means of the body; and
   a document holder, the document holder including means for supporting a document, means for engaging the document holder attaching means of the support arm; and
   wherein the stand further includes means for extending and retracting the spatial location of the engaged document holder along a z-axis.

27. A document support stand as defined by claim 26, wherein the document support means includes a planar, plate-like body having a front viewing side and a rear side opposite the front side; and means for removably mounting a document on the body, the document mounting means being situated on the body at the viewing side thereof; and means for rotatably supporting the plate-like body about a plurality of axes of rotation, the body being mounted on the body supporting means on the rear side thereof; wherein the means for rotatably supporting the plate-like body includes means for positioning the body about both a third, x-axis, and a second, y-axis of rotation.

28. A document support stand as defined by claim 27, wherein the means for rotatably supporting the plate-like body further includes means for positioning the body about a first, z-axis of rotation.

29. A document support stand as defined by claim 28, wherein the means for rotatably supporting the plate-like body includes a positioning fitting, the positioning fitting connecting the second and the third axes of rotation.

30. A document support stand as defined by claim 29, which further includes means for removably mounting a document holder on the plate-like body of the document holder; and a modified document holder, said holder having means for engaging the means for removably mounting a document holder on the plate-like body.

31. A document support stand as defined by claim 26, wherein the means for mounting a support arm at the support body includes means for selectively mounting said support arm at a first and or second location on the body with the first location being in mirror image to the second location.

32. A document support stand as defined by claim 31, wherein the document support means includes a planar, plate-like body having a front viewing side and a rear side opposite the front side; and means for removably mounting a document on the body, the document mounting means being situated on the body at the viewing side thereof; and means for rotatably supporting the plate-like body about a plurality of axes of rotation, the body being mounted on the body supporting means on the rear side thereof; wherein the means for rotatably supporting the plate-like body includes means for positioning the body about both a third, x-axis, and a second, y-axis of rotation.

33. A document support stand as defined by claim 32, wherein the means for rotatably supporting the plate-like body further includes means for positioning the body about a first, z-axis of rotation.

34. A document support stand as defined by claim 33, wherein the means for rotatably supporting the plate-like body includes a positioning fitting, the positioning fitting connecting the second and the third axes of rotation.

35. A document support stand as defined by claim 34, which further includes means for removably mounting a document holder on the plate-like body of the document holder; and a modified document holder, said holder having means for engaging the means for removably mounting a document holder on the plate-like body.

36. A symmetrically functional document support stand, which comprises:

a support body;

a slidably engageable support arm, the support arm having means for attaching a document holder; and means for removably mounting and slidably engaging the support arm on the support body, the support arm mounting means residing at the support body to allow the support arm to be both mounted on the body in a first position and to dispose the means for attaching a document holder in a first, forward facing direction;

the support arm including means for engageably cooperating with the mounting means of the support body; and an attachable document holder, the document holder including means for supporting documents, means for engaging the document holder attaching means of the support arm; and wherein the document support stand further includes means for disposing the means for attaching a document holder in a second, forward facing direction when the support arm is selectively mounted on the support body in a second position with the second position of the support arm being in mirror image to the first position.

* * * * *